US012580847B2

(12) United States Patent
Mishra et al.

(10) Patent No.: US 12,580,847 B2
(45) Date of Patent: Mar. 17, 2026

(54) INCREASED RADIO FREQUENCY FRONT-END (RFFE) THROUGHPUT USING PORT AGGREGATION

(71) Applicant: QUALCOMM Incorporated, San Diego, CA (US)

(72) Inventors: Lalan Jee Mishra, Escondido, CA (US); Umesh Srikantiah, San Diego, CA (US); Richard Dominic Wietfeldt, San Diego, CA (US); Radu Pitigoi-Aron, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 602 days.

(21) Appl. No.: 17/943,565

(22) Filed: Sep. 13, 2022

(65) Prior Publication Data

US 2024/0089195 A1 Mar. 14, 2024

(51) Int. Cl.
*H04L 45/24* (2022.01)
*H04L 12/40* (2006.01)

(52) U.S. Cl.
CPC ............ *H04L 45/245* (2013.01); *H04L 12/40* (2013.01)

(58) Field of Classification Search
None
See application file for complete search history.

(56) References Cited

U.S. PATENT DOCUMENTS

| | | | |
|---|---|---|---|
| 10,474,622 B1 | 11/2019 | Wietfeldt et al. | |
| 2006/0277346 A1* | 12/2006 | Doak ................... | G06F 13/387 |
| | | | 710/305 |

| | | | |
|---|---|---|---|
| 2008/0307154 A1 | 12/2008 | Naderi et al. | |
| 2009/0086558 A1* | 4/2009 | Do .......................... | G11C 29/32 |
| | | | 365/201 |
| 2010/0023665 A1* | 1/2010 | Horikawa ........... | G06F 11/0724 |
| | | | 710/115 |
| 2010/0169583 A1* | 7/2010 | Chung ................... | G11C 7/222 |
| | | | 711/149 |
| 2012/0278646 A1* | 11/2012 | Gruber ................ | G06F 13/4291 |
| | | | 713/400 |
| 2017/0097912 A1* | 4/2017 | Takahashi ............. | G06F 13/404 |
| 2017/0127550 A1* | 5/2017 | Heinrichs ........... | H05K 7/1438 |

(Continued)

OTHER PUBLICATIONS

International Search Report and Written Opinion—PCT/US2023/071539—ISA/EPO—Oct. 20, 2023.

*Primary Examiner* — Wutchung Chu
*Assistant Examiner* — Berhanu D Belete
(74) *Attorney, Agent, or Firm* — Loza & Loza, LLP

(57) ABSTRACT

A multi-port data communication apparatus includes a first port having a first physical interface circuit configured to couple the multi-port data communication apparatus to a first serial bus that has a first line and a second line, a second port having a second physical interface circuit configured to couple the multi-port data communication apparatus to a second serial bus that has a first line and a second line, and a controller. The controller is configured to use the first port during a first transaction restricted to transmissions over the first serial bus and use the first port and the second port in a second transaction in which data is transmitted over the second line of the first serial bus and the second line of the second serial bus in accordance with timing provided by a clock signal transmitted over the first line of the first serial bus.

29 Claims, 22 Drawing Sheets

(56)          References Cited

U.S. PATENT DOCUMENTS

| | | | |
|---|---|---|---|
| 2017/0160321 A1* | 6/2017 | Held | G01R 15/12 |
| 2018/0225251 A1* | 8/2018 | Sthoeger | G06F 13/4291 |
| 2018/0232324 A1* | 8/2018 | Mishra | G06F 13/404 |
| 2019/0146939 A1* | 5/2019 | Lee | H04L 69/28 |
| | | | 710/110 |
| 2019/0171589 A1* | 6/2019 | Mishra | G06F 13/4291 |
| 2019/0171595 A1* | 6/2019 | Mishra | G06F 13/4291 |
| 2019/0266122 A1* | 8/2019 | Pitigoi-Aron | G06F 13/4291 |
| 2019/0354505 A1* | 11/2019 | Pitigoi-Aron | G06F 13/4291 |
| 2020/0081859 A1* | 3/2020 | Mishra | G06F 13/4054 |
| 2020/0097434 A1* | 3/2020 | Mishra | G06F 13/4282 |
| 2021/0081348 A1* | 3/2021 | Rodd | G06F 13/4291 |

* cited by examiner

700
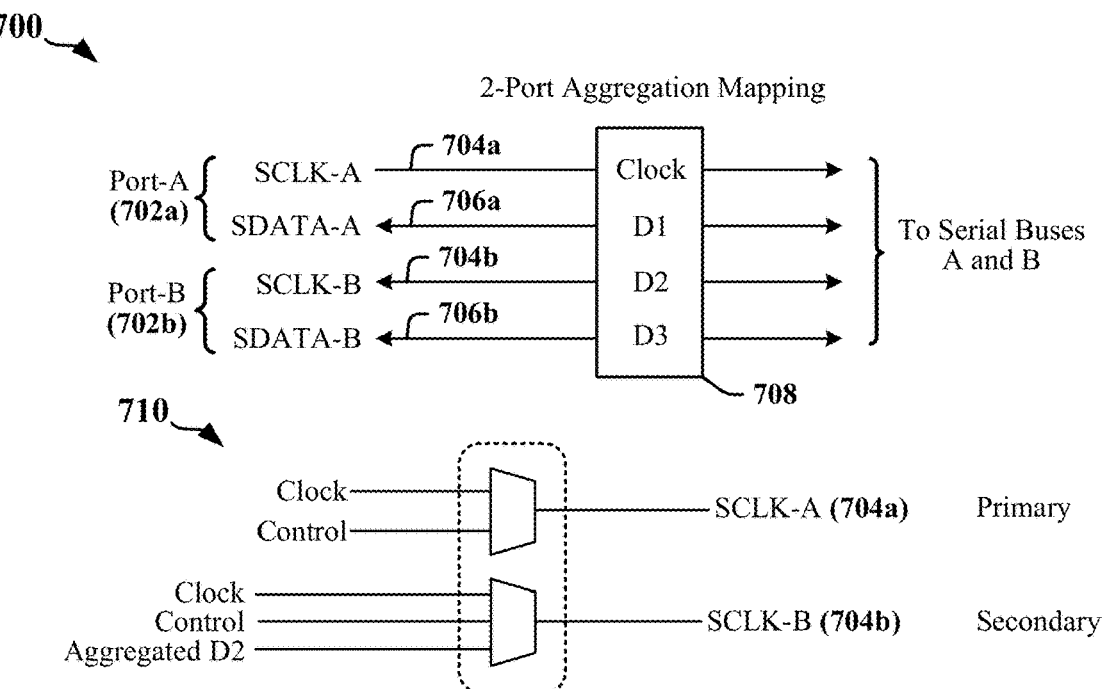
710
720
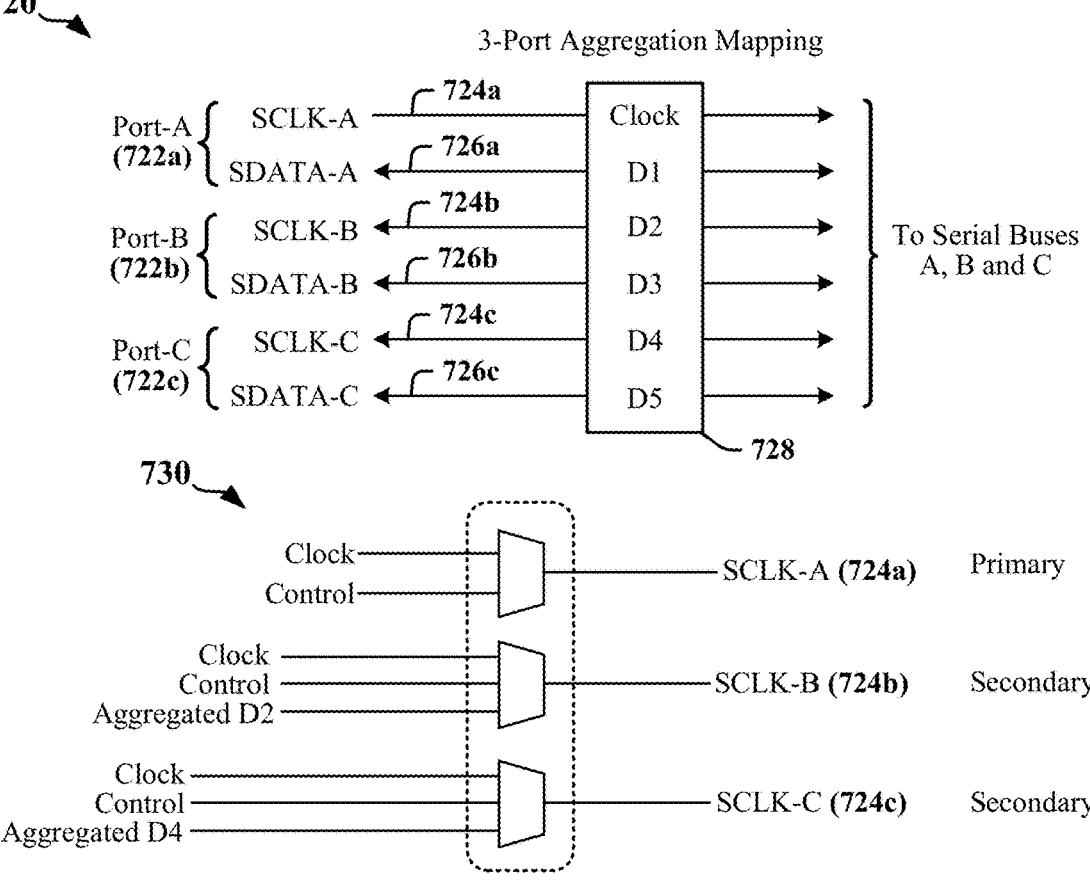
730
FIG. 7

900

Non-Interleaved Write, No Port Aggregation

| T$_{Command}$ (906) | T$_{1P\text{-}Payload}$ (908) | | | | | | | | |
|---|---|---|---|---|---|---|---|---|---|
| Address & Command (902) | 9 Byte Payload (904) | | | | | | | | |
| | Byte1 | Byte2 | Byte3 | Byte4 | Byte5 | Byte6 | Byte7 | Byte8 | Byte9 |

920

2-Port Byte-Interleaved Write

| T$_{Command}$ (926) | T$_{2P\text{-}Payload}$ (928) | | |
|---|---|---|---|
| Address & Command (922) | 3-Slot Payload (924) | | |
| | Slot-1 | Slot-2 | Slot-3 |
| Aggregated D1 → | Byte-1 | Byte-4 | Byte-7 |
| Aggregated D2 → | Byte-2 | Byte-5 | Byte-8 |
| Aggregated D3 → | Byte-3 | Byte-6 | Byte-9 |

SDATA-A (932)

SCLK-B (934)

SDATA-B (936)

940

3-Port Byte-Interleaved Write

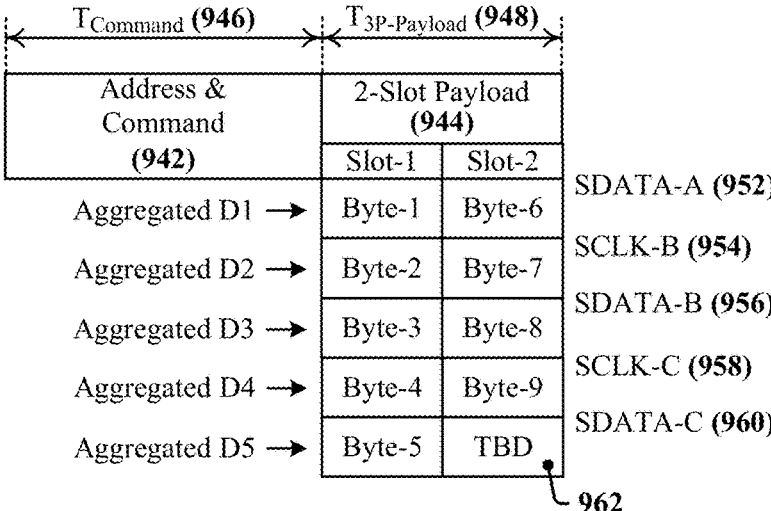

| T$_{Command}$ (946) | T$_{3P\text{-}Payload}$ (948) | |
|---|---|---|
| Address & Command (942) | 2-Slot Payload (944) | |
| | Slot-1 | Slot-2 |
| Aggregated D1 → | Byte-1 | Byte-6 |
| Aggregated D2 → | Byte-2 | Byte-7 |
| Aggregated D3 → | Byte-3 | Byte-8 |
| Aggregated D4 → | Byte-4 | Byte-9 |
| Aggregated D5 → | Byte-5 | TBD |

SDATA-A (952)

SCLK-B (954)

SDATA-B (956)

SCLK-C (958)

SDATA-C (960)

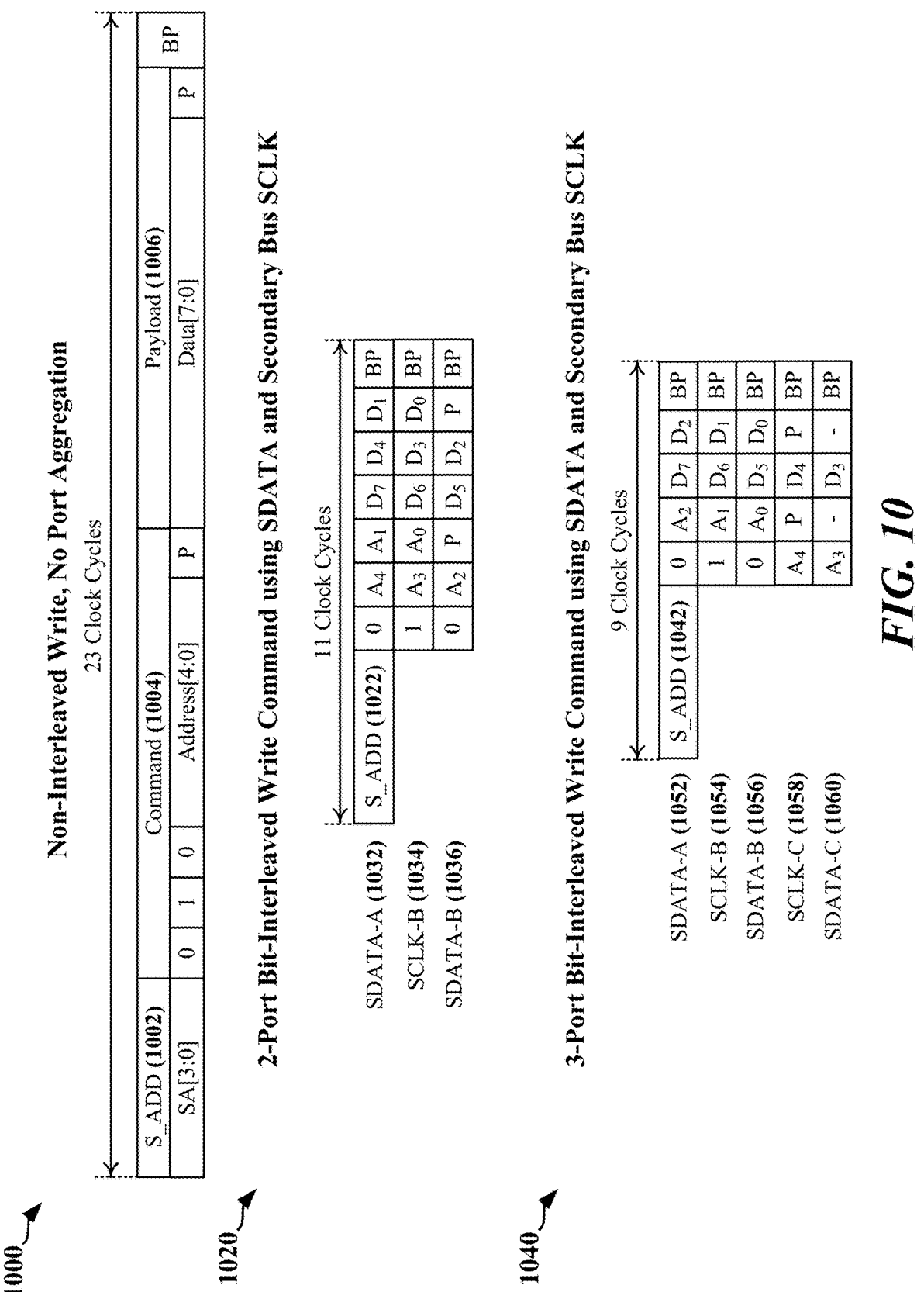

Non-Interleaved Write, No Port Aggregation

23 Clock Cycles

| S_ADD (1002) | Command (1004) | | | Payload (1006) | |
|---|---|---|---|---|---|
| | | Address[4:0] | P | Data[7:0] | BP |
| SA[3:0] | 0 | 1 | 0 | P | |

2-Port Bit-Interleaved Write Command using SDATA and Secondary Bus SCLK

11 Clock Cycles

| SDATA-A (1032) | S_ADD (1022) | 0 | $A_4$ | $A_1$ | $D_7$ | $D_4$ | $D_1$ | BP |
|---|---|---|---|---|---|---|---|---|
| SCLK-B (1034) | | 1 | $A_3$ | $A_0$ | $D_6$ | $D_3$ | $D_0$ | BP |
| SDATA-B (1036) | | 0 | $A_2$ | P | $D_5$ | $D_2$ | P | BP |

3-Port Bit-Interleaved Write Command using SDATA and Secondary Bus SCLK

9 Clock Cycles

| SDATA-A (1052) | S_ADD (1042) | 0 | $A_2$ | $D_7$ | $D_2$ | BP |
|---|---|---|---|---|---|---|
| SCLK-B (1054) | | 1 | $A_1$ | $D_6$ | $D_1$ | BP |
| SDATA-B (1056) | | 0 | $A_0$ | $D_5$ | $D_0$ | BP |
| SCLK-C (1058) | | $A_4$ | P | $D_4$ | P | BP |
| SDATA-C (1060) | | $A_3$ | - | $D_3$ | - | BP |

Non-Interleaved Read, No Port Aggregation

24 Clock Cycles

| S_ADD (1102) | Command (1104) | | | | Payload (1106) | | |
|---|---|---|---|---|---|---|---|
| SA[3:0] | 0 | 1 | 1 | Address[4:0] | P | BP | Data[7:0] | P | BP |

1100

2-Port Bit-Interleave Read Command using SDATA and Secondary Bus SCLK

12 Clock Cycles

| | S_ADD (1122) | | | | | | | |
|---|---|---|---|---|---|---|---|---|
| SDATA-A (1132) | 0 | A4 | A1 | BP | D7 | D4 | D1 | BP |
| SCLK-B (1134) | 1 | A3 | A0 | BP | D6 | D3 | D0 | BP |
| SDATA-B (1136) | 1 | A2 | P | BP | D5 | D2 | P | BP |

1120

3-Port Bit-Interleave Read Command using SDATA and Secondary Bus SCLK

10 Clock Cycles

| | S_ADD (1142) | | | | | |
|---|---|---|---|---|---|---|
| SDATA-A (1152) | 0 | A2 | BP | D7 | D2 | BP |
| SCLK-B (1154) | 1 | A1 | BP | D6 | D1 | BP |
| SDATA-B (1156) | 1 | A0 | BP | D5 | D0 | BP |
| SCLK-C (1158) | A4 | P | BP | D4 | P | BP |
| SDATA-C (1160) | A3 | - | BP | D3 | - | BP |

1140

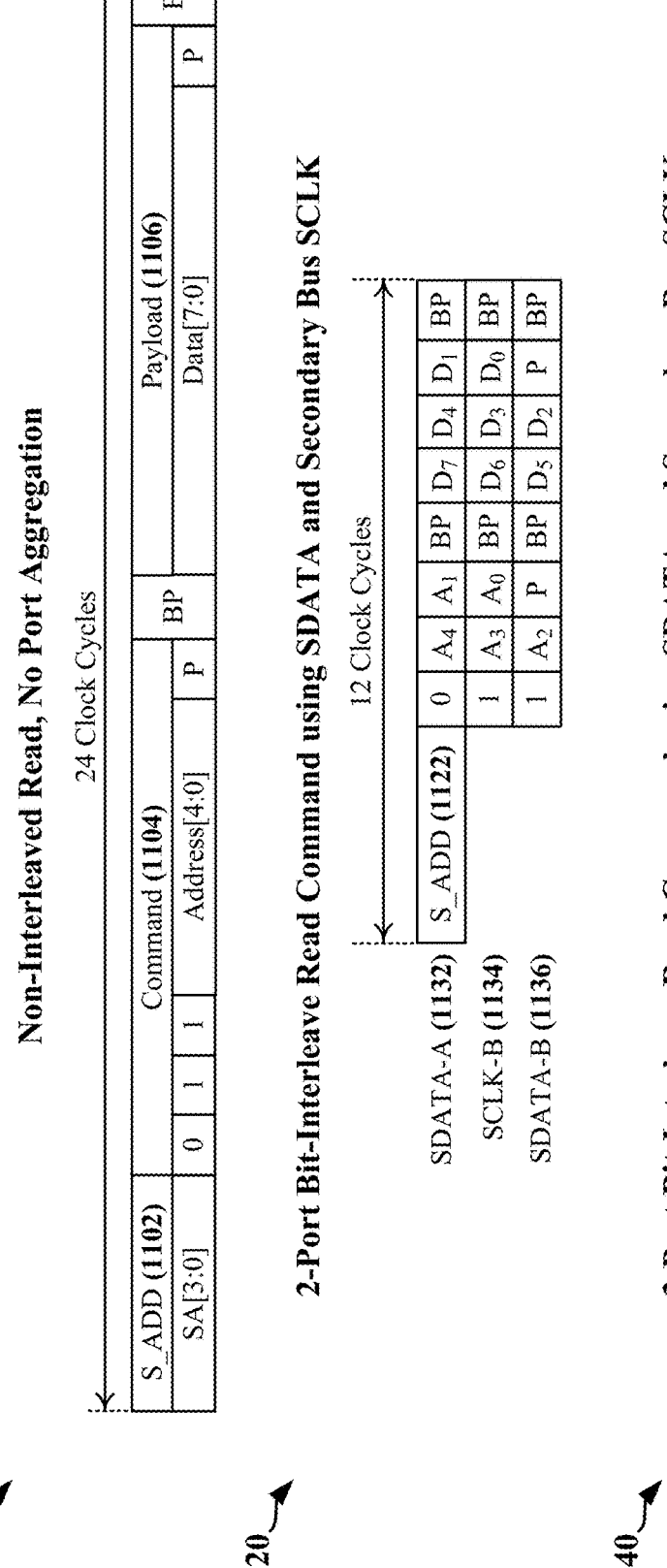

Figure 12:
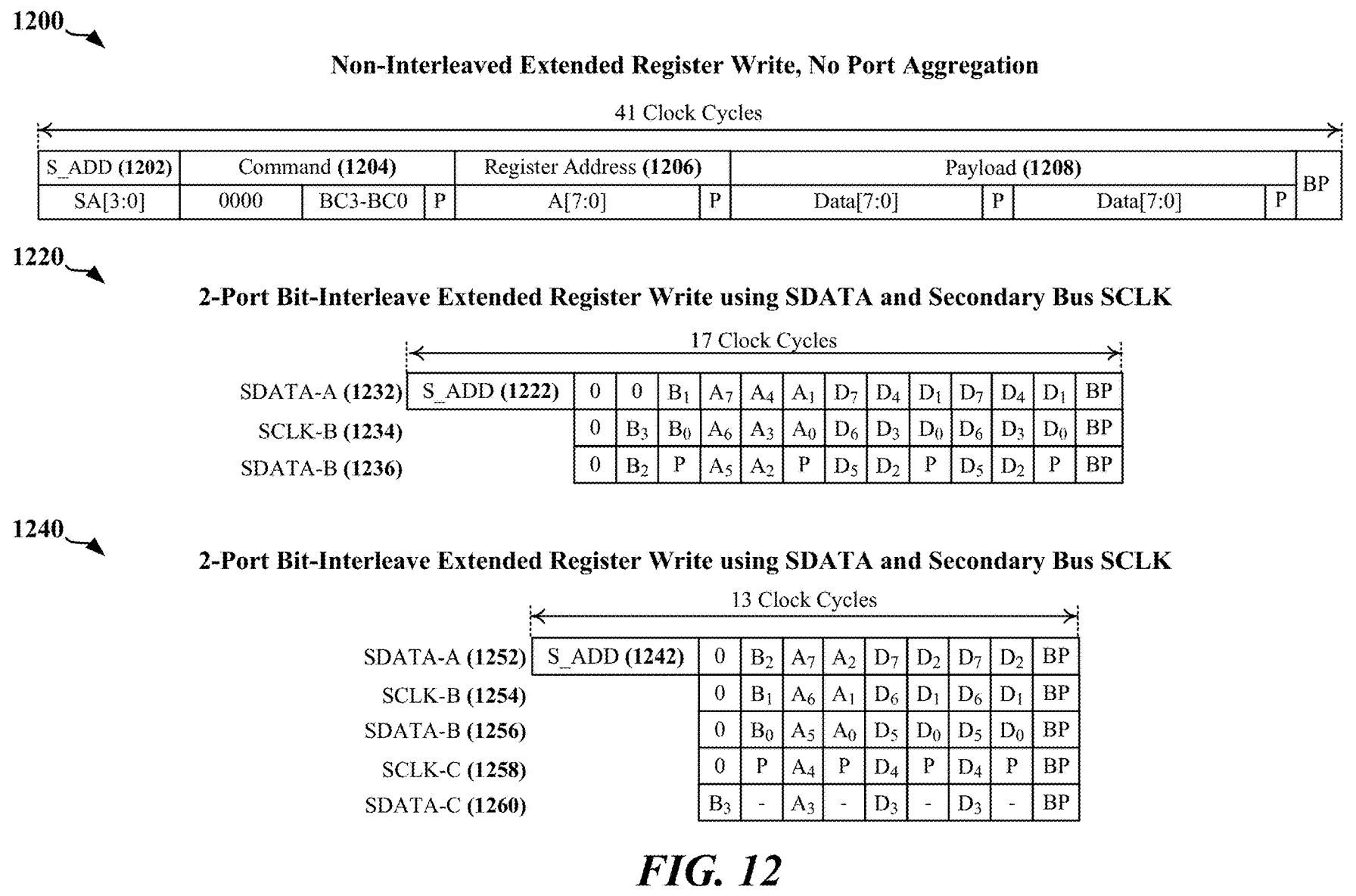

Non-Interleaved Extended Register Write, No Port Aggregation

41 Clock Cycles

| S_ADD (1202) | | Command (1204) | | Register Address (1206) | | Payload (1208) | | | |
|---|---|---|---|---|---|---|---|---|---|
| SA[3:0] | 0000 | BC3-BC0 | P | A[7:0] | P | Data[7:0] | P | Data[7:0] | BP |

1220

2-Port Bit-Interleave Extended Register Write using SDATA and Secondary Bus SCLK 17 Clock Cycles

| | S_ADD (1222) | | | | | | | | |
|---|---|---|---|---|---|---|---|---|---|
| SDATA-A (1232) | 0 | 0 | B1 | A7 | A4 | A1 | D7 | D4 | D1 | BP |
| SCLK-B (1234) | 0 | B3 | B0 | A6 | A3 | A0 | D6 | D3 | D0 | BP |
| SDATA-B (1236) | 0 | B2 | P | A5 | A2 | P | D5 | D2 | P | BP |

1240

2-Port Bit-Interleave Extended Register Write using SDATA and Secondary Bus SCLK 13 Clock Cycles

| | S_ADD (1242) | | | | | | |
|---|---|---|---|---|---|---|---|
| SDATA-A (1252) | 0 | B2 | A7 | A2 | D7 | D2 | BP |
| SCLK-B (1254) | 0 | B1 | A6 | A1 | D6 | D1 | BP |
| SDATA-B (1256) | 0 | B0 | A5 | A0 | D5 | D0 | BP |
| SCLK-C (1258) | 0 | P | A4 | P | D4 | P | BP |
| SDATA-C (1260) | B3 | - | A3 | - | D3 | - | BP |

Non-Interleaved Extended Register Read, No Port Aggregation

42 Clock Cycles

| S_ADD (1302) | Command (1304) | | | Register Address (1306) | BP | Payload (1308) | | | | BP |
|---|---|---|---|---|---|---|---|---|---|---|
| SA[3:0] | 0010 | BC3-BC0 | P | A[7:0] | P | Data[7:0] | P | Data[7:0] | P | P |

1320

2-Port Bit-Interleave Extended Register Read Command using SDATA and Secondary Bus SCLK

18 Clock Cycles

| | S_ADD (1322) | | | | | | | | | |
|---|---|---|---|---|---|---|---|---|---|---|
| SDATA-A (1332) | 0 | B1 | A7 | A4 | A1 | BP | D7 | D4 | D1 | BP |
| SCLK-B (1334) | 0 | B3 | B0 | A6 | A3 | A0 | BP | D6 | D3 | D0 | BP |
| SDATA-B (1336) | 1 | B2 | P | A5 | A2 | P | BP | D5 | D2 | P | BP |

1340

3-Port Bit-Interleave Extended Register Read Command using SDATA and Secondary Bus SCLK

14 Clock Cycles

| | S_ADD (1342) | | | | | | | |
|---|---|---|---|---|---|---|---|---|
| SDATA-A (1352) | 0 | B2 | A7 | A2 | BP | D7 | D2 | BP |
| SCLK-B (1354) | 0 | B1 | A6 | A1 | BP | D6 | D1 | BP |
| SDATA-B (1356) | 1 | B0 | A5 | A0 | BP | D5 | D0 | BP |
| SCLK-C (1358) | 0 | P | A4 | P | BP | D4 | P | BP |
| SDATA-C (1360) | B3 | - | A3 | - | BP | D3 | - | BP |

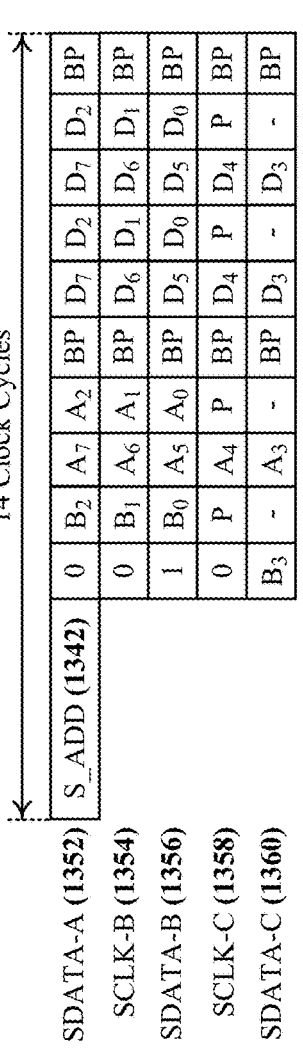

*FIG. 13*

2-Port Aggregation Enhancement Comparison

| RFFE Command | Single Lane Cycles | BYLA Cycles | BYLA Improvement | BILA Cycles | BILA Improvement | BILA:BYLA Improvement |
|---|---|---|---|---|---|---|
| Register Write | 23 | 23 | 0% | 14 | 39.10% | 39.10% |
| Register Read | 24 | 24 | 0% | 16 | 39.10% | 39.10% |
| Register-0 Write | 14 | 14 | 0% | 14 | 0% | 0% |
| Extended Register Write | 41 | 32 | 22% | 23 | 44% | 28% |
| Extended Register Read | 42 | 32 | 22% | 24 | 43% | 25% |

BYLA: 2-port Byte interleaved Aggregation
BILA: 2-port Bit interleaved Aggregation

1800

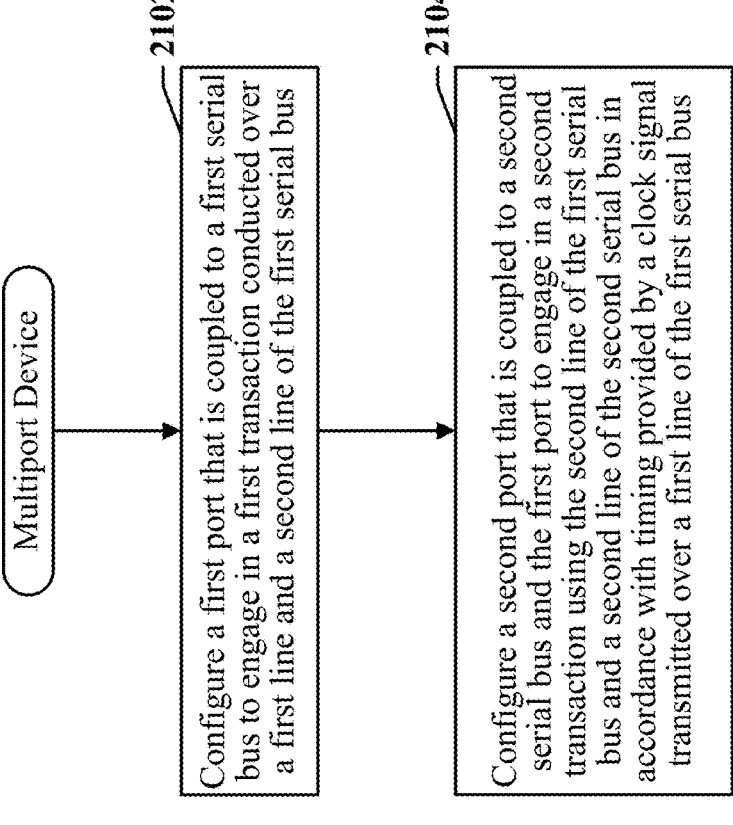

2100

2102

Multiport Device

Configure a first port that is coupled to a first serial bus to engage in a first transaction conducted over a first line and a second line of the first serial bus

2104

Configure a second port that is coupled to a second serial bus and the first port to engage in a second transaction using the second line of the first serial bus and a second line of the second serial bus in accordance with timing provided by a clock signal transmitted over a first line of the first serial bus

*FIG. 21*

INCREASED RADIO FREQUENCY FRONT-END (RFFE) THROUGHPUT USING PORT AGGREGATION

TECHNICAL FIELD

The present disclosure relates generally to serial communication and, more particularly, to increasing data throughput by aggregating multiple serial buses.

BACKGROUND

Mobile communication devices may include a variety of components including circuit boards, integrated circuit (IC) devices and/or System-on-Chip (SoC) devices. The components may include processing circuits, user interface components, storage and other peripheral components that communicate through a serial bus. The serial bus may be operated in accordance with a standardized or proprietary protocol. In one example, a serial bus is operated in accordance with an Inter-Integrated Circuit (I2C bus or I²C) protocol. The I2C bus was developed to connect low-speed peripherals to a processor, where the I2C bus is configured as a multi-drop bus. A two-wire I2C bus includes a Serial Data Line (SDA) that carries a data signal, and a Serial Clock Line (SCL) that carries a clock signal. In another example, the Improved Inter-Integrated Circuit (I3C) protocols defined by the Mobile Industry Processor Interface (MIPI) Alliance derive certain implementation aspects from the I2C protocol including separate clock and data lines.

The MIPI Alliance defines standards for the Improved Inter-Integrated Circuit (I3C) serial interface, the Radio Frequency Front-End (RFFE) interface, the System Power Management Interface (SPMI) and other interfaces. These interface standards may be used to configure serial buses that can connect processors, sensors and other peripherals, for example. The RFFE interface standard provides a communication interface for controlling various radio frequency (RF) front-end devices, including power amplifiers (PAs), low-noise amplifiers (LNAs), antenna tuners, filters, sensors, power management devices, switches, etc. These devices may be collocated in a single IC device or provided in multiple IC devices. In another example, the system power management interface (SPMI) defined by the MIPI Alliance provides a hardware interface that may be implemented between baseband or application processors and peripheral components. In some implementations, the SPMI is deployed to support power management operations within a device.

High-speed MIPI-defined serial buses often replace parallel buses. However, there is a need for increased throughput to meet increasing demand as device complexity increases.

SUMMARY

Certain aspects of the disclosure relate to systems, apparatus, methods and techniques that enable a transaction to be conducted using multiple serial buses. The content of a data payload may be spread or distributed for transmission across the data line of a primary port and the clock and data lines of one or more secondary ports. In various examples, the transaction may be conducted in accordance with an I3C Radio Frequency Front-End (RFFE) protocol, I3C protocol, SPMI protocol or another standards-defined protocol.

In various aspects of the disclosure, a multi-port data communication apparatus, includes a first port having a first physical interface circuit configured to couple the multi-port data communication apparatus to a first serial bus that has a first line and a second line; a second port having a second physical interface circuit configured to couple the multi-port data communication apparatus to a second serial bus that has a first line and a second line; and a controller configured to: use the first port to engage in a first transaction restricted to transmissions over the first serial bus; and use the first port and the second port to engage in a second transaction in which data is transmitted over the second line of the first serial bus and the second line of the second serial bus in accordance with timing provided by a clock signal transmitted over the first line of the first serial bus. In one example, the multi-port data communication apparatus is configured to operate as a host device that provides the clock signal transmitted over the first line of the first serial bus. In another example aspect, the multi-port data communication apparatus is configured to operate as a subordinate device that engages in the second transaction in response to a command received over the first serial bus.

In various aspects of the disclosure, a system configured for data communication includes a host device coupled to a first serial bus that has a first line and a second line and a second serial bus that has a first line and a second line; and a first subordinate device coupled to the first serial bus and the second serial bus. In a first mode of operation, a transaction conducted by the host device may be restricted to transmissions over the first serial bus, and in a second mode of operation, data may be transmitted between the host device and the first subordinate device over the second line of the first serial bus and the second line of the second serial bus in accordance with timing provided by a clock signal transmitted over the first line of the first serial bus.

In various aspects of the disclosure, a method of data communication includes configuring a first port that is coupled to a first serial bus to engage in a first transaction conducted over a first line and a second line of the first serial bus; and configuring a second port that is coupled to a second serial bus and the first port to engage in a second transaction using the second line of the first serial bus and a second line of the second serial bus in accordance with timing provided by a clock signal transmitted over the first line of the first serial bus.

In certain aspects, the second transaction includes transmission or reception of a data payload. The controller may be further configured to: cause a first data byte of the data payload to be transmitted or received over the second line of the first serial bus; and cause a second data byte of the data payload to be transmitted or received over the second line of the second serial bus concurrently with transmission of the first data byte. The controller may be further configured to suppress transmittal of clock information over the first line of the second serial bus, and cause a third data byte of the data payload to be transmitted or received over the first line of the second serial bus concurrently with transmission of the first data byte. The multi-port data communication apparatus may include a third port with a third physical interface circuit configured to couple the multi-port data communication apparatus to a third serial bus that has a first line and a second line. The controller may be further configured to cause a fourth data byte of the data payload to be transmitted or received over the second line of the third serial bus concurrently with transmission of the first data byte and in accordance with the timing provided by the clock signal transmitted over the first line of the first serial bus. The controller may be further configured to suppress transmittal of a clock signal over the first line of the third serial bus and cause a fifth data byte of the data payload to be transmitted or received over the first line of the third serial bus concurrently with transmission of the first data byte.

In certain aspects, the second transaction includes a data payload, and the controller is further configured to cause a first bit in a first data byte of the data payload to be transmitted or received over the second line of the first serial bus and to cause a second bit in the first data byte of the data payload to be transmitted or received over the second line of the second serial bus concurrently with transmission of the first bit in the first data byte. The controller may be further configured to suppress transmittal of a clock signal over the first line of the second serial bus and to cause a third bit in the first data byte of the data payload to be transmitted or received over the first line of the second serial bus concurrently with transmission of the first bit in the first data byte. The multi-port data communication apparatus may include a third port having a third physical interface circuit configured to couple the multi-port data communication apparatus to a third serial bus that has a first line and a second line. The controller may be further configured to cause a fourth bit in the first data byte of the data payload to be transmitted or received over the second line of the third serial bus concurrently with transmission of the first bit in the first data byte. The controller may be further configured to suppress transmittal of a clock signal over the first line of the third serial bus and to cause a fifth bit in the first data byte of the data payload to be transmitted or received over the first line of the third serial bus concurrently with transmission of the first bit in the first data byte.

In one aspect, transmissions associated with the first transaction are limited to the first serial bus when the first transaction is initiated with a command directed to a first device address. Portions of a data payload may be transmitted or received over the first serial bus and the second serial bus when the second transaction is initiated with a command directed to a second device address.

BRIEF DESCRIPTION OF THE DRAWINGS

FIG. 7 illustrates examples of mapping of the physical lines of multiple serial buses coupled to multi-port devices that are capable of operating in port aggregation modes.

FIG. 9 illustrates byte-level interleaving in a system configured for port aggregation in accordance with certain aspects of this disclosure.

FIG. 10 illustrates first examples of bit-level interleaved write transactions in a system configured for port aggregation in accordance with certain aspects of this disclosure.

FIG. 11 illustrates first examples of bit-level interleaved read transactions in a system configured for port aggregation in accordance with certain aspects of this disclosure.

FIG. 12 illustrates second examples of bit-level interleaved write transactions in a system configured for port aggregation in accordance with certain aspects of this disclosure.

FIG. 13 illustrates second examples of bit-level interleaved read transactions in a system configured for port aggregation in accordance with certain aspects of this disclosure.

FIG. 21 is a flowchart that illustrates a method for data communication at a host device in accordance with certain aspects disclosed herein.

DETAILED DESCRIPTION

Figure 1:
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Certain aspects of the disclosure relate to serial bus configurations in which multiple devices can communicate at various times. The described serial buses are typically operated in a hierarchical manner, in that one device controls communication during a transaction. The controlling device may be referred to as a host device, a bus master device, a managing device or another term favored by standards defining the protocols implemented by the controlling device. In some serial bus configurations, a single controlling device manages or controls communication during all transactions conducted over the serial bus. In other serial bus configurations, multiple devices can operate as the controlling device and one device serves as the controlling device for each transaction conducted over the serial bus. The controlling device may provide a common clock signal that is transmitted over a conventional two-wire serial bus. The controlling device may provide control signaling that identifies a type of transaction to be conducted over a conventional two-wire serial bus. During certain transactions, a controlling device may transmit commands directed to one or more receiving devices using address information provided in or with the commands. The receiving devices may be referred to as a client device, a slave device, a subordinate device, a peripheral device or another term favored by standards defining the protocols implemented by the controlling device. For the purposes of this disclosure, a controlling device may be referred to as a host device and associated receiving devices may be referred to as subordinate devices.

Overview

Mobile computing device architectures have grown in complexity, and now commonly include multiple processor cores, SoCs, co-processors, functional modules including dedicated processors (e.g., communication modem chips, GPS receivers, etc.), complex memory systems, intricate electrical interconnections (e.g., buses and/or fabrics), and numerous other resources that execute complex and power intensive software applications (e.g., video streaming applications, etc.). Devices that include multiple SoC and other IC devices often employ a shared communication interface that may include a serial bus or other data communication link to connect processors with modems and other peripherals. The serial bus or other data communication link may be operated in accordance with multiple standards or protocols. For example, the serial bus may be operated in accordance with an I2C, I3C, SPMI, and/or RFFE protocol, or another protocol that may be configured for half-duplex operation. Increased functionality and complexity of operations involving devices coupled to serial buses, together with the imposition of more stringent timing constraints in support of applications, peripherals and sensors can result in greater demand on GPIO pins and communication link throughput.

Certain aspects of the disclosure relate to techniques for boosting the throughput provided by serial data links without increasing the frequency of serial bus clock signals and without adding physical lines to the serial bus. In radio frequency front end (RFFE) circuits, for example, increasing the complexity of RFFE devices can lead to demands for increased bus throughput. In many instances, it has become difficult to meet these demands for increased bus throughput when the serial bus signaling rate is limited by a maximum serial bus clock frequency of 52 MHz and when there are limited or no viable solutions for increasing the clock frequency. For example, increasing serial bus clock frequency would preclude the use of many RFFE peripheral devices that are based on much older process nodes (65 nm to 180 nm). Increases in clock frequency can narrow timing tolerances and can cause signal integrity issues, especially for older process node-based designs.

Certain aspects disclosed herein address the need for higher data throughputs by coupling certain subordinate devices to multiple serial buses such that data to be transmitted can be distributed over the lines of multiple, aggregated serial buses. In many RFFE applications, host devices already support multiple bus interfaces in order to reduce the number or types of RFFE peripheral devices coupled to any single serial bus. A multi-port subordinate device may be ported to multiple serial buses and can be configured to enter a port-aggregation mode in response to certain commands or commands addressed to certain device addresses. The multi-port subordinate device can benefit from significantly higher data throughputs when needed or desired while legacy single-port (single physical interface) devices are unaffected by the enhanced modes of operation disclosed herein.

In accordance with certain aspects of this disclosure, port aggregation may be provided in devices that are associated with demands for high data throughput over serial buses. Various modes of port aggregation are disclosed, including full and partial port aggregation modes, byte-level interleaved port aggregation, bit-level interleaved port aggregation, dynamic configuration of aggregation modes and automatic scaling of port aggregation. In byte-level interleaved port aggregation modes, data is transmitted in complete bytes over each data line. In bit-level interleaved port aggregation modes, data is transmitted in bits over each data line such that a byte may be spread over multiple lines during transmission. Aggregation modes may be configured in response to commands directed to device addresses that are associated with port aggregation. Automatic scaling is used in some port aggregation modes when a command is directed to a group address, for example, and when devices that respond to the group address are coupled to different numbers of serial buses. In some implementations, a primary or default port may be designated in devices configured for port aggregation.

In accordance with certain aspects of this disclosure, a multi-port data communication apparatus, includes a first port having a first physical interface circuit configured to couple the multi-port data communication apparatus to a first serial bus that has a first line and a second line, a second port having a second physical interface circuit configured to couple the multi-port data communication apparatus to a second serial bus that has a first line and a second line, and a controller. The controller may be configured to use the first port to engage in a first transaction restricted to transmissions over the first serial bus and to use the first port and the second port to engage in a second transaction in which data is transmitted over the second line of the first serial bus and the second line of the second serial bus in accordance with timing provided by a clock signal transmitted over the first line of the first serial bus. In one example, the multi-port data communication apparatus is configured to operate as a host device that provides the clock signal transmitted over the first line of the first serial bus. In another example aspect, the multi-port data communication apparatus is configured to operate as a subordinate device that engages in the second transaction in response to a command received over the first serial bus. In some implementations, the first line of the first serial bus may be designated as a nominal or default clock line and the second line of the first serial bus may be defined as a nominal or default data line. The first line of the second serial bus may be designated as a nominal or default clock line and the second line of the second serial bus may be defined as a nominal or default data line.

Certain aspects disclosed herein provide protocols that may replace or supplement a serial bus protocol, such as an I2C, I3C, SPMI, and/or RFFE protocol. Certain aspects are applicable to a serial bus operated in half-duplex mode or full-duplex mode.

Examples of Apparatus that Employ Serial Data Links

According to certain aspects of the disclosure, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
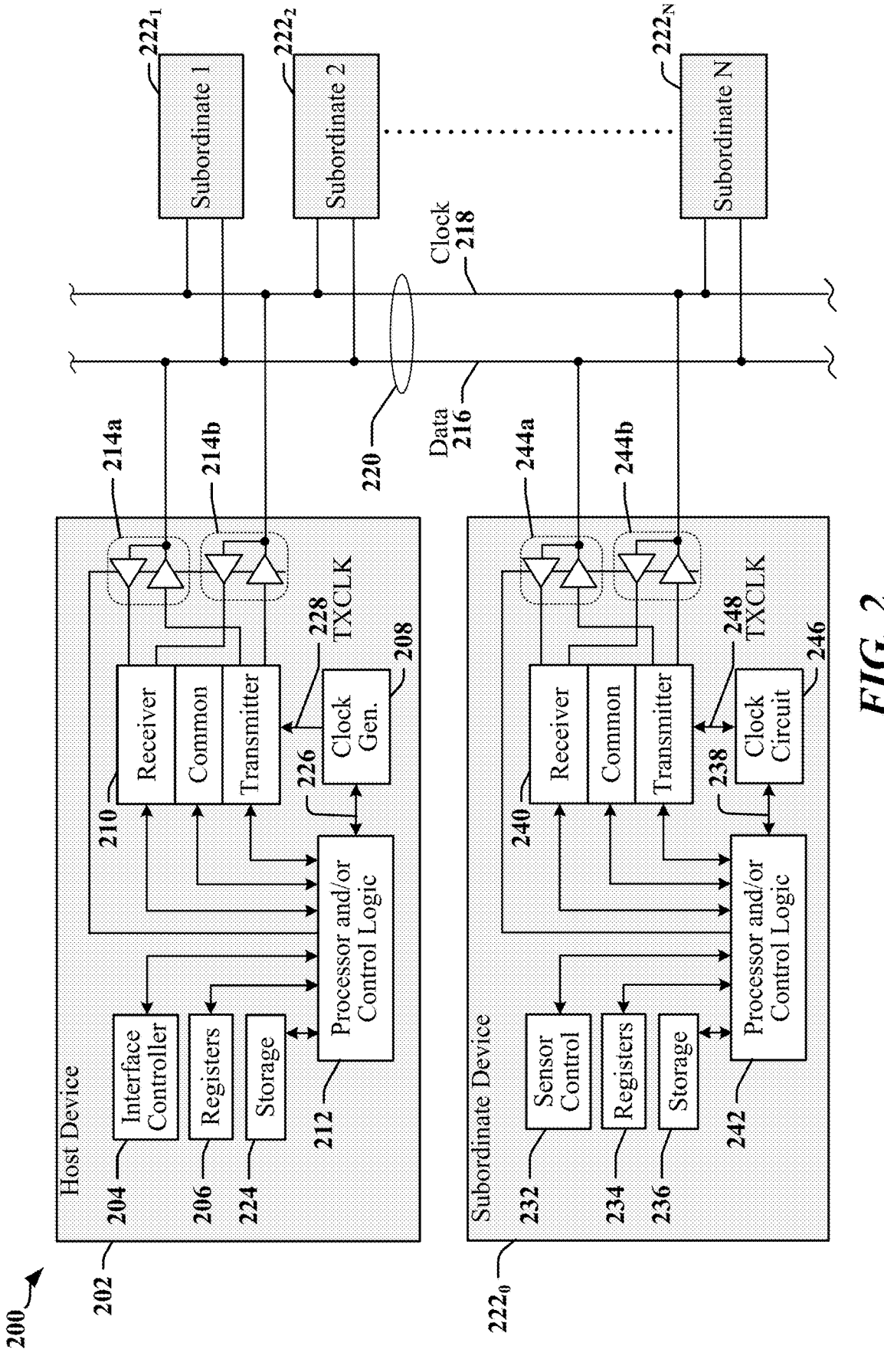
FIG. 2 illustrates a first example of an apparatus employing a data link that may be used to communicatively couple two or more devices.

FIG. 2 illustrates a first example of an apparatus 200 employing a data link that may be used to communicatively couple two or more devices. Here, the apparatus 200 includes multiple devices 202, and $222_0$-$222_N$ coupled to a two-wire serial bus 220. The devices 202 and $222_0$-$222_N$ may be implemented in one or more semiconductor IC devices, such as an application processor, SoC or ASIC. In various implementations certain of the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more devices $222_0$-$222_N$ may be used to control, manage or monitor a sensor device. Communication between devices 202 and $222_0$-$222_N$ over the serial bus 220 is controlled by a host device 202. Certain types of bus can support multiple host devices 202.

In one example, a host device 202 may include an interface controller 204 that may manage access to the serial bus, configure dynamic addresses for subordinate devices and/or generate a clock signal 228 to be transmitted on a clock line 218 of the serial bus 220. The host device 202 may include configuration registers 206 or other storage 224, and other control logic 212 configured to handle protocols and/or higher-level functions. The control logic 212 may include a processing circuit such as a state machine, sequencer, signal processor or general-purpose processor. The host device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

One or more devices $222_0$-$222_N$ may be configured to operate as a subordinate device. In some examples, a subordinate device may include circuits and modules that support a display, an image sensor, and/or circuits and modules that control and communicate with one or more sensors that measure environmental conditions. In one example, a device $222_0$ configured to operate as a subordinate device may provide a control function, module or circuit 232 that includes circuits and modules to support a display, an image sensor, and/or circuits and modules that control and communicate with one or more sensors that measure environmental conditions. In this example, the device $222_0$ can include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 240 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. In some instances, the clock signal 248 may be derived from a signal received from the clock line 218. Other timing clocks 238 may be used by the control logic 242 and other functions, circuits or modules.

The serial bus 220 may be operated in accordance with RFFE, I2C, I3C, SPMI, or other protocols. At least one of the devices 202 and $222_0$-$222_N$ may be configured to operate as a host device and a subordinate device on the serial bus 220. Two or more of the devices 202 and $222_0$-$222_N$ may be configured to operate as a host device on the serial bus 220. The protocol selected to control operation of the serial bus 220 may define direct current (DC) characteristics affecting certain signal levels associated with the serial bus 220, and/or alternating current (AC) characteristics affecting certain timing aspects of signals transmitted on the serial bus 220. In various examples, a 2-wire serial bus 220 transmits data on a data line 216 and a clock signal on the clock line 218. In some instances, data may be encoded in the signaling state, or transitions in signaling state of the data line 216 and the clock line 218.

Figure 3:
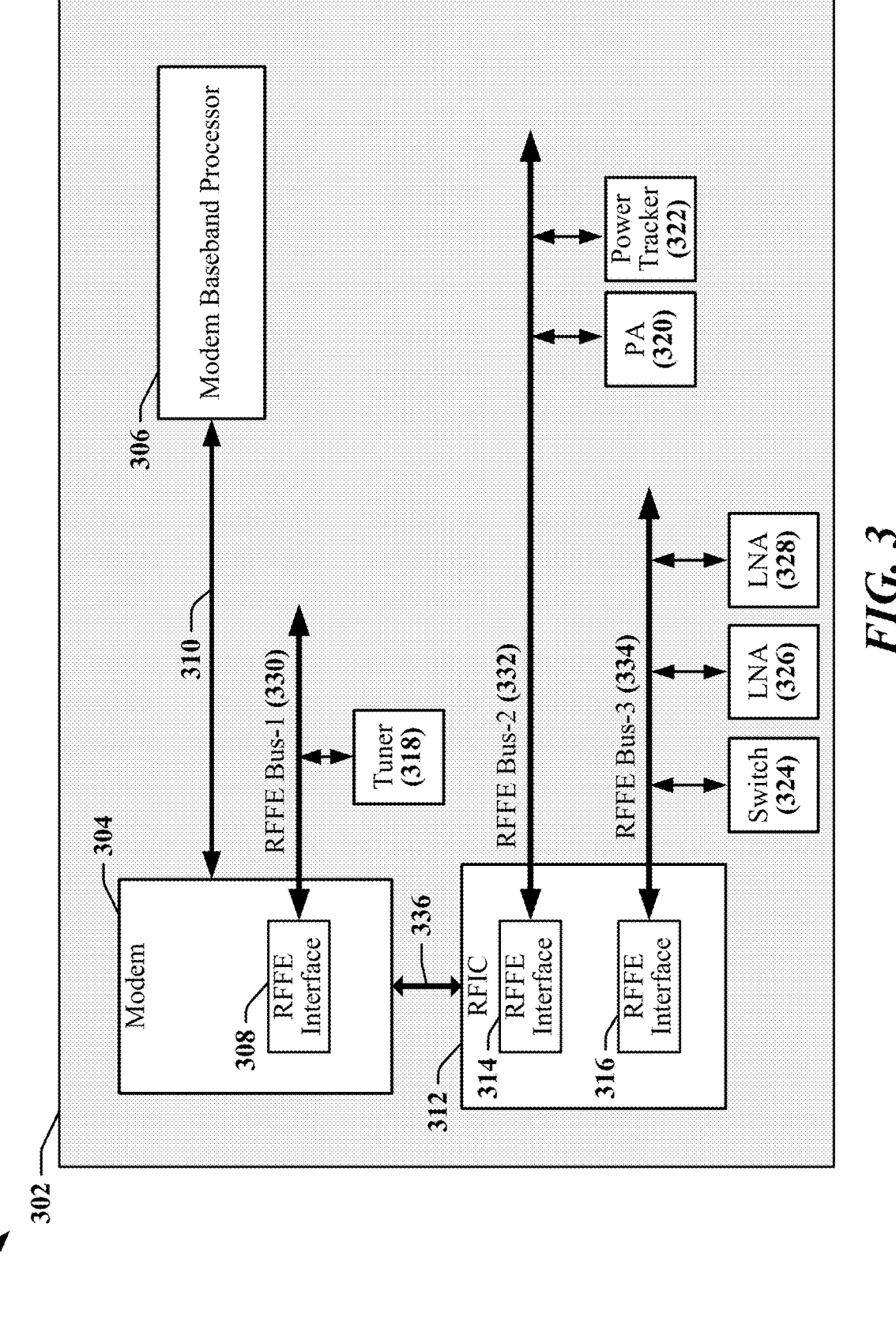
FIG. 3 illustrates a second example of an apparatus employing data links that may be used to communicatively couple two or more devices, including various radio frequency front-end devices.

FIG. 3 illustrates a second example of an apparatus 300 employing data links that may be used to communicatively couple two or more devices. In this example, a chipset or device 302 employs multiple RFFE buses 330, 332, 334 to couple various RF front-end devices 318, 320, 322, 324, 326, 328. A modem 304 includes an RFFE interface 308 that couples the modem 304 to a first RFFE bus 330. The modem 304 may communicate with a baseband processor 306 and a Radio-Frequency IC (RFIC 312) through one or more communication links 310, 336. The illustrated device 302 may be embodied in one or more of a mobile communication device, a mobile telephone, a mobile computing system, a notebook computer, a tablet computing device, a media player, a gaming device, a wearable computing and/or communication device, an appliance, or the like.

In various examples, the device 302 may be implemented with one or more baseband processors 306, modems 304, RFICs 312, multiple communication links 310, 336, multiple RFFE buses 330, 332, 334 and/or other types of buses. The device 302 may include other processors, circuits, modules and may be configured for various operations and/or different functionalities. In the example illustrated in FIG. 3, the Modem is coupled to an RF tuner 318 through its RFFE interface 308 and the first RFFE bus 330. The RFIC 312 may include one or more RFFE interfaces 314, 316, controllers, state machines and/or processors that configure and control certain aspects of the RF front-end. The RFIC 312 may communicate with a PA 320 and a power tracking module 322 through a first of its RFFE interfaces 314 and a second RFFE bus 332. The RFIC 312 may communicate with a switch 324 and one or more LNAs 326, 328 through a second of its RFFE interfaces 316 and a third RFFE bus 334.

Bus latency can affect the ability of a serial bus to handle high-priority, real-time and/or other time-constrained messages. Low-latency messages, or messages requiring low bus latency, may relate to sensor status, device-generated real-time events and virtualized GPIO state. In one example, bus latency may be measured as the time elapsed between a message becoming available for transmission and the delivery of the message or, in some instances, commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

In certain examples, latency-sensitive messages may include coexistence messages. Coexistence messages are transmitted in a multisystem platform to prevent or reduce instances of certain device types impinging on each other, including for example, switches 324, LNAs 326, 328, PAs 320 and other types of device that operate concurrently in a manner that can generate inter-device interference, or that could potentially cause damage to one or more devices. Devices that may interfere with one another may exchange coexistence management (CxM) messages to permit each device to signal imminent actions that may result in interference or conflict. CxM messages may be used to manage operation of shared components including a switch 324, LNA 326, 328, PA 320 and/or an antenna.

In response to continual demands for increased performance and capabilities, wireless communication devices continue to provide greater functionality using increasing numbers of RF interfaces, which has led to increasing complexity of circuits. Demands for higher data throughput for high-priority communications can be met to some degree by providing dedicated data communication links that couple sources and sinks of high-priority traffic, for example. The RFIC 312 illustrated in FIG. 3 provides an example in which a designer provides an IC device with multiple RFFE buses 332, 334 for purposes such as balancing overall data communication load, improving bus latency for certain devices, concentrating functionally related devices 320, 322 or 326, 328 on an RFFE bus 332 or 334 such that bus requests for data exchanges between different pairs of devices are less likely to conflict.

Implementations that employ multiple serial buses are ultimately limited by the throughput limits of the individual buses, and reduced throughput capability during periods of contention where different pairs of devices are competing for bus access to transmit high volume or low-latency traffic.

Certain aspects of this disclosure relate to IC devices that can be configured to use multiple serial data links concurrently in order to transmit or receive high volume or low-latency traffic. A block of data can be separated into multiple data streams where each data stream is transmitted over one of the multiple serial data links. The data streams are aggregated at the receiver in order to obtain a copy of the original block of data. Various implementations employ protocols that define a datagram structure used to transmit command, control and data payloads. Datagram structures for different protocols define certain common features, including addressing used to select devices to receive or transmit data, clock generation and management, interrupt processing and device priorities. In this disclosure, the example of RFFE protocols may be employed to illustrate certain aspects disclosed herein. However, the concepts disclosed herein are applicable to other serial bus protocols and standards, including SPMI, SPI, I3C, etc.

For the purposes of this description, and to more easily convey certain concepts disclosed herein, the example of a serial bus that has a nominal clock line and a nominal data line is described. In this example, a host device generates a clock signal that controls the timing of a data signal transmitted over the data line and the clock signal is transmitted over the clock line to enable a receiving device to reliably capture and decode data from the data signal. This mode of operation is supported by many serial bus control protocols, and can include single data rate (SDR) transmissions where one data bit is transmitted per clock cycle, and double data rate (DDR) transmissions where two data bits are transmitted per clock cycle using rising and falling edges in the clock signal for timing purposes. In some instances, a serial bus control protocol that defines a default clock line and at least one data line may support communication modes in which transmission of a clock signal is entirely suppressed or in which the clock signal is modulated in order to carry both clock information and data on the default clock line. In one example, transmission of a clock signal is entirely suppressed when data is encoded in multibit symbols transmitted using all lines of the serial bus. In these symbol-based encoding schemes, clock information can be encoded in a stream of symbols, including at each boundary between bit transmission intervals. For example, symbol encoding can ensure that signaling state of at least one line (nominal clock or data lines) transitions at the boundary between a pair of successively transmitted symbols. In another example, symbol encoding can ensure that signaling state of at least one line (nominal clock or data lines) transitions within each bit transmission interval. In some implementations, a clock signal transmitted over a clock line may be encoded with data using a pulse amplitude modulation (PAM), whereby data can be encoded in the voltage level of the pulses in a clock signal transmitted over a clock line.

Figure 4:
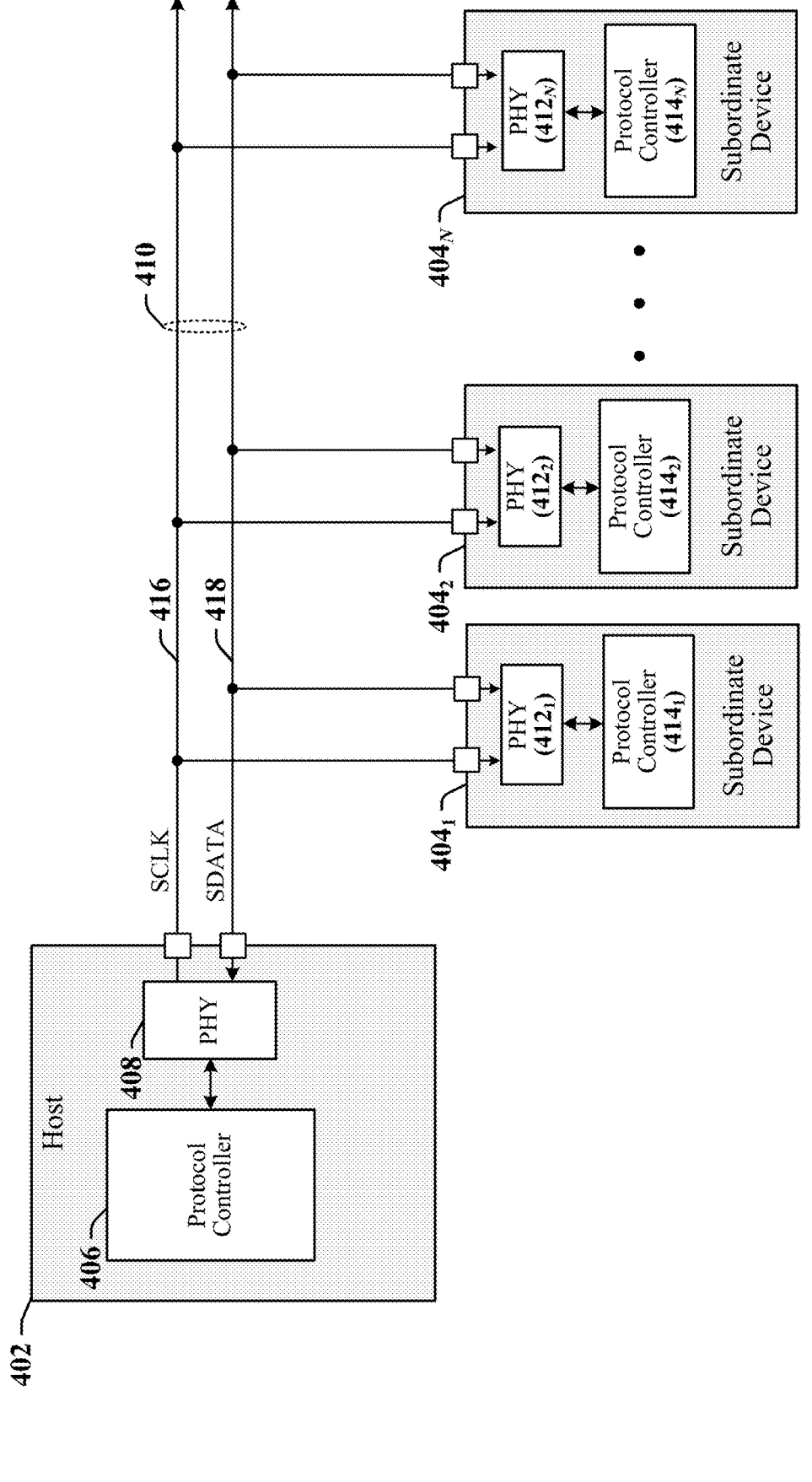
FIG. 4 illustrates a system in which a host device communicates with one or more subordinate devices in accordance with certain aspects disclosed herein.

FIG. 4 illustrates a system 400 that may be adapted or configured for use in accordance with certain aspects disclosed herein. The system 400 includes a host device 402 that communicates with one or more subordinate devices $404_1$-$404_N$ over a serial bus 410. Data may be transmitted over a data line (SDATA 418) of the serial bus 410 in accordance with timing provided by a clock line (SCLK 416). The host device 402 may be provided in an RFIC, modem, application processor or another type of device. The host device 402 may be adapted to encode data in a signal transmitted over SDATA 418 in bit intervals defined by a clock signal transmitted over SCLK 416.

The host device 402 and the subordinate devices $404_1$-$404_N$ are coupled to the serial bus 410 through physical layer circuits (PHY 408 and PHY $412_1$-$412_N$, respectively) that include circuits, drivers and receivers that enable signals to be transmitted and received over the serial bus 410. The PHY 408 in the host device 402 may be configured to transmit control signaling over the serial bus 410, to monitor operations on the serial bus 410 and to detect and recover from error conditions detected in transactions conducted over the serial bus 410. The PHY 408 and the PHY $412_1$-$412_N$ may be configured to communicate with higher layer functions and components of their respective devices 402, $404_1$-$404_N$ is accordance with a programming interface. In various implementations, the programming interface abstracts the physical aspects of the serial bus 410 and enables the higher layer functions and components to address the data link as a set of services associated with a port. In this disclosure, a port may refer to the interface to the serial bus 410 provided to a protocol controller 406 or $414_1$-$414_N$ by a corresponding PHY 408 or PHY $412_1$-$412_N$.

The host device 402 and the subordinate devices $404_1$-$404_N$ typically include respective protocol controllers 406, $414_1$-$414_N$. The protocol controllers 406, $414_1$-$414_N$ may include a processor, controller, state machine or other logic circuits configured to support one or more protocols. The protocol controller 406 in the host device 402 may be further configured to manage communication over the serial bus 410. In some instances, the protocol controller 406 performs some of the functions of a host. In some implementations, the protocol controller 406 in the host device 402 may be used to configure one or more of the subordinate devices $404_1$-$404_N$. The host device 402 may determine a configuration of a subordinate device $404_1$-$404_N$ that is a designated recipient of data to be transmitted over the serial bus 410, and may cause the protocol controller 406 to generate commands and encode data intended for the recipient subordinate device $404_1$-$404_N$ in a signal to be transmitted over SDATA 418 and addressed to the subordinate device $404_1$-$404_N$.

According to certain aspects of this disclosure, one or more subordinate devices can be configured to communicate with a host device when a datagram or other block of commands and data is spread over two or more ports. Each port is associated with a serial bus that couples the host device with one or more subordinate devices. A transmitting device may use multiple ports to interleave portions of a data payload in a transaction. The receiver is configured to reassemble the data payload. The use of multiple ports to conduct a transaction may be referred to herein as port aggregation. Port aggregation can be extended for use with serial buses that operate in SDR, DDR, PAM or symbol-based encoding schemes.

Figure 5:
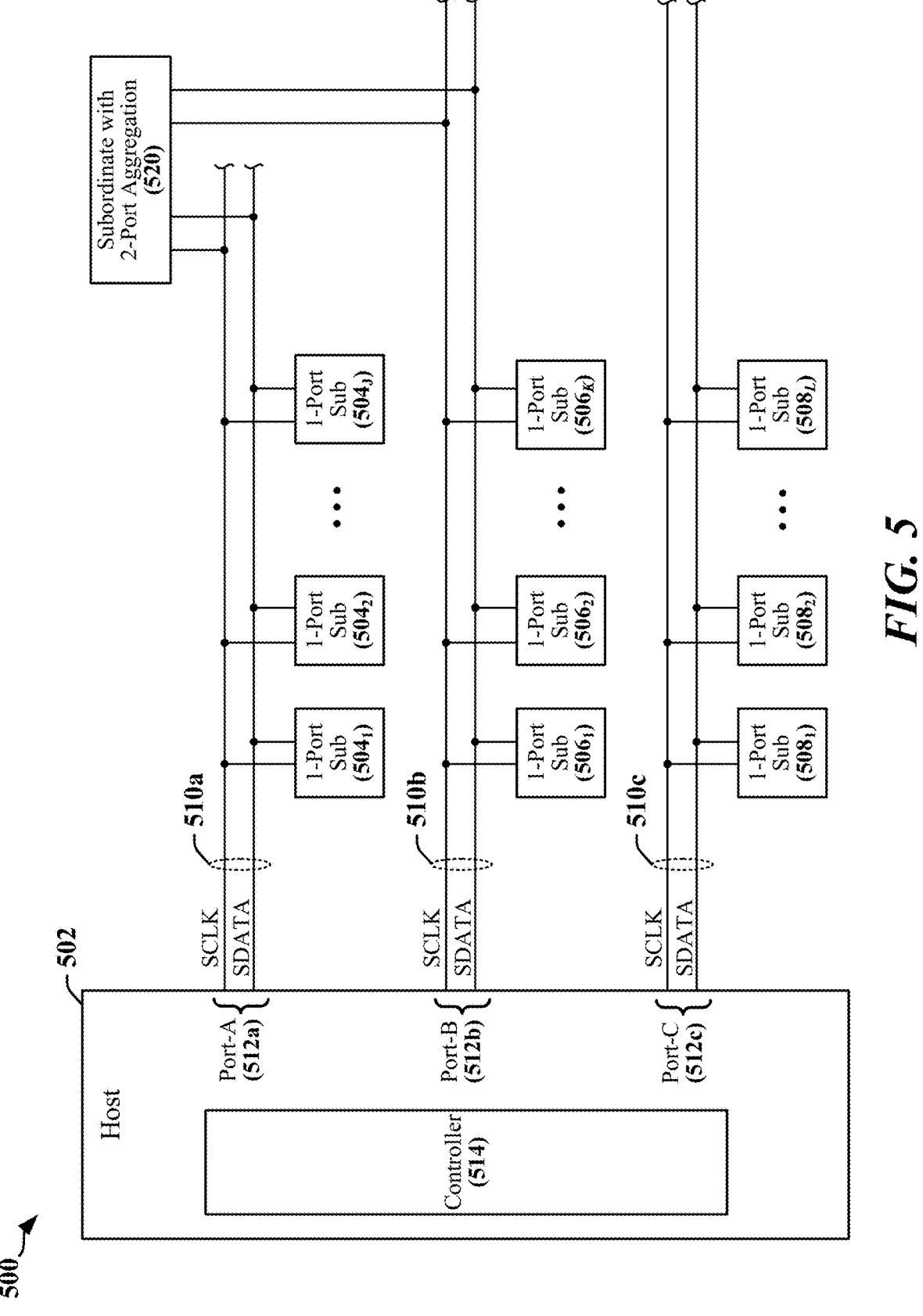
FIG. 5 illustrates a first example of a system configured for port aggregation in accordance with certain aspects disclosed herein.

FIG. 5 illustrates a first example of a system 500 configured for port aggregation in accordance with certain aspects disclosed herein. The system 500 includes a 3-port host device 502 that is coupled to three serial buses 510a, 510b, 510c. A number (J) of 1-port subordinate devices $504_1$-$504_J$ are equipped with, or are configured to use a single serial interface to communicate with the host device 502 over a first serial bus 510a, a number (K) of 1-port subordinate devices $506_1$-$506_K$ are equipped with, or are configured to use a single serial interface to communicate with the host device 502 over a second serial bus 510b, and a number (L) of 1-port subordinate devices $508_1$-$508_L$ are equipped with, or are configured to use a single serial interface to communicate with the host device 502 over a third serial bus 510c. The system 500 also includes a 2-port subordinate device 520 that is coupled to two serial buses 510a and 510b through two serial interfaces and may be configured to communicate with the host device 502 using 2-port aggregation in accordance with certain aspects of this disclosure. In some instances, the 2-port subordinate device 520 may operate its two serial interfaces independently and may maintain two independent communication links using the two serial buses 510a and 510b. In some implementations, one or more of the other subordinate devices $504_1$-$504_J$, $506_1$-$506_K$, $508_1$-$508_L$ may be equipped with additional serial interfaces and may be configurable for multi-port aggregation.

The host device 502 may include a controller 514 that configures and manages the three ports 512a, 512b and 512c used to couple the host device 502 to the three serial buses 510a, 510b, 510c. Each port 512a, 512b and 512c may represent or include the physical layer circuits, state machines or other control logic that enables data to be transmitted over a corresponding serial bus 510a, 510b, 510c. In some examples, the controller 514 may configure each port 512a, 512b for multi-port aggregation when the host device 502 is communicating with the 2-port subordinate device 520. In accordance with some aspects of this disclosure, the controller 514 may reconfigure the function of one or more lines in at least one of the serial buses 510a and 510b used to support multi-port aggregation.

According to one aspect, the controller 514 may initiate or configure port aggregation mode by transmitting commands or configuration information. According to certain aspects of the disclosure, port aggregation may be activated when the host addresses the 2-port subordinate device 520 using an address associated with multi-port communication. In some instances, each port in the 2-port subordinate device 520 may be directly addressed using first and second device addresses, and multi-port mode may be initiated using a third device address.

The controller 514 may interleave portions of a data payload by allocating different portions of the data payload among the ports 512a and 512b when the host device 502 is transmitting the data payload to the 2-port subordinate device 520 in a port aggregation mode. The 2-port subordinate device 520 may reassemble the data payload from data received through its two ports while operating in a port aggregation mode. The 2-port subordinate device 520 may interleave portions of a data payload by allocating different portions of the data payload among the ports 512a and 512b when the 2-port subordinate device 520 is transmitting the data payload to the host device 502 in a port aggregation mode. A controller in the 2-port subordinate device 520 may reassemble the data payload from data received from the host device 502 through its two ports while operating in a port aggregation mode.

Figure 6:
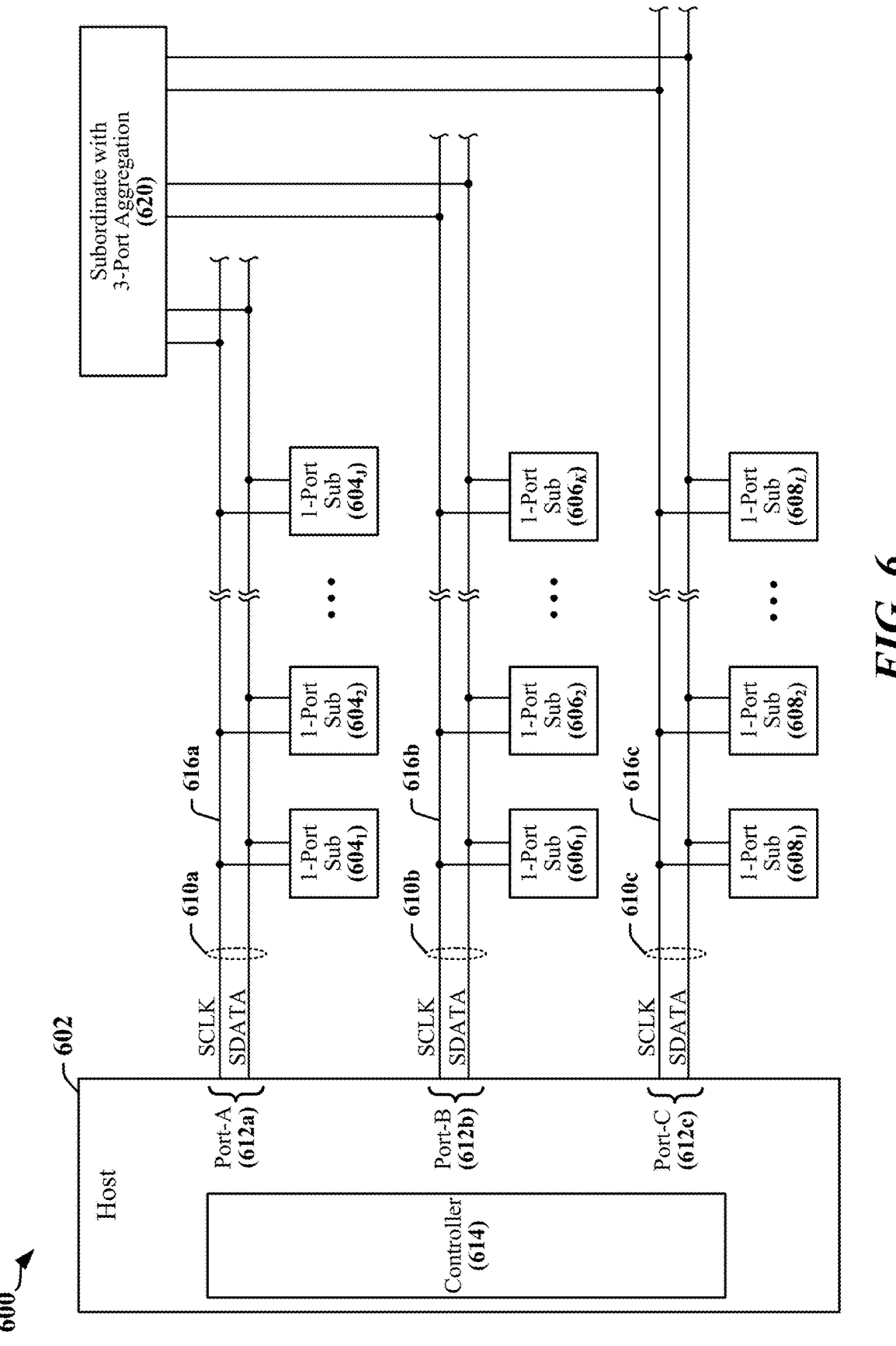
FIG. 6 illustrates a second example of a system configured for port aggregation in accordance with certain aspects disclosed herein.

FIG. 6 illustrates a second example of a system 600 configured for port aggregation in accordance with certain aspects disclosed herein. The system 600 includes a 3-port host device 602 that is coupled to three serial buses 610a, 610b, 610c. A number (J) of 1-port subordinate devices 604₁-604ⱼ are equipped with, or are configured to use a single serial interface to communicate with the host device 602 over a first serial bus 610a, a number (K) of 1-port subordinate devices 606₁-606ₖ are equipped with, or are configured to use a single serial interface to communicate with the host device 602 over a second serial bus 610b, and a number (L) of 1-port subordinate devices 608₁-608ₗ are equipped with, or are configured to use a single serial interface to communicate with the host device 602 over a third serial bus 610c. The system 600 also includes a 3-port subordinate device 620 that is coupled to the three serial buses 610a, 610b, 610c through three serial interfaces and that may be configured to communicate with the host device 602 using 3-port aggregation in accordance with certain aspects of this disclosure. In some instances, the 3-port subordinate device 620 may operate its three serial interfaces independently and may maintain two or more independent communication links using the three serial buses 610a, 610b, 610c. In some implementations, one or more of the other subordinate devices 604₁-604ⱼ, 606₁-606ₖ, 608₁-608ₗ may be equipped with additional serial interfaces and may be configurable for multi-port aggregation.

The host device 602 may include a controller 614 that configures and manages the three ports 612a, 612b and 612c used to couple the host device 602 to the three serial buses 610a, 610b, 610c. Each port 612a, 612b and 612c may represent or include the physical layer circuits, state machines or other control logic that enables data to be transmitted over a corresponding serial bus 610a, 610b, 610c. In some examples, the controller 614 may configure each port 612a, 612b, 612c for multi-port aggregation when the host device 602 is communicating with the 3-port subordinate device 620. In accordance with some aspects of this disclosure, the controller 614 may reconfigure configure the function of one or more lines in at least one serial bus 610a, 610b, 610c when operating in multi-port aggregation modes.

According to one aspect, the controller 614 may initiate or configure port aggregation mode by transmitting commands or configuration information. According to certain aspects of the disclosure, port aggregation may be activated when the host addresses the 3-port subordinate device 620 using an address associated with multi-port communication. In some instances, each port in the 3-port subordinate device 620 may be directly addressed using three different device addresses, and multi-port mode may be initiated using a fourth device address.

The controller 614 may interleave portions of a data payload by allocating different portions of the data payload among the ports 612a, 612b, 612c when the host device 602 is transmitting the data payload to the 3-port subordinate device 620 in a port aggregation mode. The 3-port subordinate device 620 may reassemble the data payload from data received through at least two ports while operating in a port aggregation mode. The 3-port subordinate device 620 may interleave portions of a data payload by allocating different portions of the data payload among the ports 612a and 612b when the 3-port subordinate device 620 is transmitting the data payload to the host device 602 in a port aggregation mode. A controller in the 3-port subordinate device 620 may reassemble the data payload from data received from the host device 602 through at least two ports while operating in a port aggregation mode.

According to certain aspects of this disclosure, data may be transmitted over some SCLK lines when multi-port devices are operated in a port aggregation mode. One of the serial buses may be designated as the primary serial bus that provides a clock signal on SCLK and the other serial buses may be designated as secondary buses. For example, in the system 600 illustrated in FIG. 6, serial bus 610a may be designated, negotiated or selected to be the primary port while serial buses 610b, 610c are operated as secondary ports. In this example, a clock signal is transmitted over SCLK 616a of serial bus 610a in port aggregation modes and transmission of clock signals over SCLK 616b and SCLK 616c are discontinued when a port aggregation mode is initiated. Data signals can be transmitted over SCLK 616b and SCLK 616c in port aggregation modes.

FIG. 7 illustrates examples of mappings for the physical lines of multiple serial buses coupled to multi-port devices that are capable of operating in port aggregation modes. A two-port mapping 700 illustrates an example in which a primary serial bus (serial bus A) is coupled to a multi-port transmitter through a first port (Port-A 702a) and a secondary serial bus (serial bus B) is coupled to the multi-port transmitter through a second port (Port-B 702b). A clock signal transmitted over SCLK-A 704a controls the timing of all bit transmissions in port aggregation modes. Data signals are transmitted over SDATA-A 706a, SCLK-B 704b and SDATA-B 706b. The 2-port mapping 708 employed in this example effectively provides a 3-line data channel in which data transmissions are controlled by timing provided using a 1-line clock channel. Bidirectional data transfer is supported.

The generation of signaling provided as SCLK-A 704a and SCLK-B 704b is illustrated in the conceptual logic diagram 710. RFFE, SPMI, I3C and other bus control protocols define a clock line that carries a clock signal and that is also operated in a control mode to initiate and terminate activities conducted over the serial bus. These activities can include data write transactions, data read transactions, bus arbitration, in-band interrupt procedures, and other operations. The clock line may carry a signal that oscillates at a defined frequency during data transmission and may be driven or held at a constant state during other operations. In some instances, the clock line may be in a high impedance state or operated bidirectionally during some operations. As illustrated in the conceptual logic diagram 710, a signal transmitted over SCLK-A 704a of the primary serial bus can be a clock signal or a control signal and the signal transmitted over SCLK-B 704b of the secondary serial bus can be a clock signal, a control signal or a data signal.

A three-port mapping 720 illustrates an example in which a primary serial bus (serial bus A) is coupled to a multi-port transmitter through a first port (Port-A 722a) and secondary serial buses (serial bus B and serial bus C) are respectively coupled to the multi-port transmitter through a second port (Port-B 722b) and a third port (Port-C 722c). A clock signal transmitted over SCLK-A 724a controls the timing of all bit transmissions in port aggregation modes. Data signals are transmitted over SDATA-A 726a, SCLK-B 724b, SDATA-B 726b, SCLK-C 724c and SDATA-B 726c. The 3-port mapping 728 employed in this example effectively provides a 5-line data channel in which data transmissions are controlled by timing provided using a one-line clock channel. Bidirectional data transfer is supported.

The generation of signaling provided as SCLK-A 724a, SCLK-B 724b and SCLK-C 724c is illustrated in the conceptual logic diagram 730. A signal transmitted over SCLK-A 724a of the primary serial bus can be a clock signal or a control signal and the signals transmitted over SCLK-B 724b and SCLK-C 724c of the secondary serial buses can be clock signals, control signals or data signals.

Figure 8:
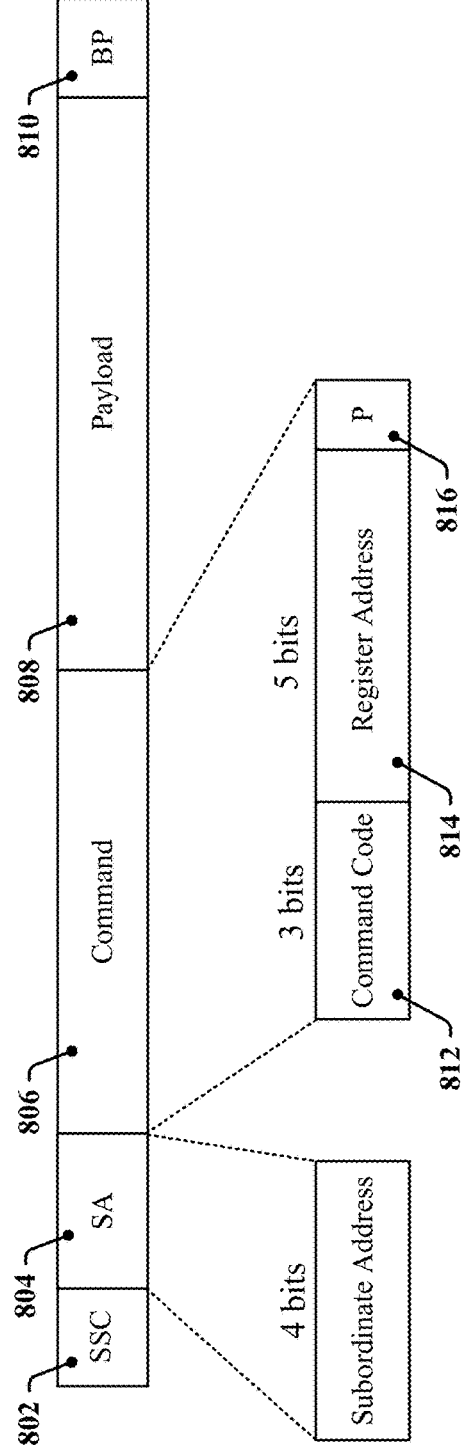
FIG. 8 illustrates a write transaction that may be adapted or supported during port aggregation in accordance with certain aspects disclosed herein.

FIG. 8 illustrates an example of a transaction 800 that may be executed over a serial bus configured in accordance with certain bus control protocols. The example relates generally to an RFFE transaction, and may also be representative of an SPMI transaction. The illustrated transaction 800 is consistent with a write transaction in which a host device writes data to a register space in a subordinate device. The transaction 800 commences with transmission of control signaling, which in this example includes an SSC 802 that is defined by timing of transitions in signaling state of the serial bus. In the illustrated example, the SSC 802 can have a duration of three transmit clock cycles. In some instances, an arbitration procedure may optionally follow the SSC 802.

The write transaction 800 continues with transmission of a command frame that includes a four-bit device address 804 and a command field 806 followed by a payload 808. The device address 804 identifies the subordinate device that is to receive the payload 808. The transaction 800 is terminated by bus park control signaling (BP 810). The command field 806 may have a structure and content compatible or compliant with one or more commands defined by RFFE protocols. In the illustrated example, the command field 806 includes a three-bit command code 812, a five-bit address field 814 and a parity bit 816.

According to certain aspects of this disclosure, a transaction executed between two multi-port devices may split data at a byte level or at a bit level in port aggregation modes. In a first port aggregation mode, a sequence of bytes in a data payload are allocated in circular order among the ports for transmission over corresponding serial buses. In one example, and with reference to the system 600 illustrated in FIG. 6, the first byte of a data payload in a write command may be allocated to Port-A 612a for transmission over serial bus 610a, the second byte of the data payload may be allocated to Port-B 612b for transmission over serial bus 610b, the third byte of the data payload may be allocated to Port-C 612c for transmission over serial bus 610c, the fourth byte of the data payload may be allocated to Port-A 612a for transmission over serial bus 610a, and so on for the remainder of the data payload. Other payload divisions and allocations are possible. In this example, Port-A 612a may be considered the primary port while Port-B 612b and Port-C 612c are treated as secondary ports. In this port aggregation mode, transmission of the command phase may be reserved to the primary port.

In a second port aggregation mode, the bits of the command sequence a sequence of bytes in a data payload are allocated in circular order among the ports for transmission over corresponding serial buses. For example, and with reference to the system 600 illustrated in FIG. 6, the first byte of a data payload in a write command may be allocated to Port-A 612a for transmission over serial bus 610a, the second byte of the data payload may be allocated to Port-B 612b for transmission over serial bus 610b, the third byte of the data payload may be allocated to Port-C 612c for transmission over serial bus 610c, the fourth byte of the data payload may be allocated to Port-A 612a for transmission over serial bus 610a, and so on for the remainder of the data payload. Other payload divisions, allocations and interleaving are possible. In this example, Port-A 612a may be considered the primary port while Port-B 612b and Port-C 612c are treated as secondary ports. In this port aggregation mode, command phase bits may be interleaved using all active ports.

FIG. 9 illustrates byte-level interleaving in a system configured for port aggregation in accordance with certain aspects of this disclosure. A first example 900 illustrates transmission of a command field 902 with a 9-byte payload 904 when port aggregation is unavailable or disabled. The command field 902 includes a four-bit device address and a nine-bit RFFE write command configured as a three-bit command code, a five-bit address field and a parity bit (see FIG. 8). In the illustrated example, the payload 904 includes 9 data bytes.

A second example 920 illustrates transmission of a command field 922 followed by a byte-interleaved transmission of a payload 924 when 2-port aggregation is enabled. The second example 920 may be used in a system that corresponds to the system 500 illustrated in FIG. 5, for example. The command field 922 includes a four-bit device address and a nine-bit RFFE write command configured as a three-bit command code, a five-bit address field and a parity bit. In the illustrated example, the payload 924 includes 9 data bytes that are transmitted in data signals over three lines provided by two serial buses in accordance with the two-port mapping 700 illustrated in FIG. 7. The two serial buses may correspond to serial buses 510a and 510b in FIG. 5 and, for the purposes of this example, may be referred to as serial bus A and serial bus B. The 9 data bytes in the payload 924 are allocated in circular order among the data line (SDATA-A 932) of serial bus A, the clock line (SCLK-B 934) of serial bus B and the data line (SDATA-B 936) of serial bus B.

The command field 922 is transmitted over serial bus A. Serial bus A may be designated or configured to be the primary serial bus. In some implementations, the command field 922 may also be transmitted over the serial bus B. Port aggregation may be initiated at the receiver when the receiver identifies that the device address in the command field 922 corresponds to an address associated with port aggregation. The receiver may ignore the serial bus B for the remainder of the command field 922 after detecting the address associated with port aggregation. The receiver may configure deinterleaving circuits or modules after identifying the address associated with port aggregation.

In this second example 920, data is received over SDATA-A 932 of serial bus A and both SCLK-B 934 and SDATA-B 936 of the serial bus B in accordance with timing derived from a clock signal received over the clock line of serial bus A. Three data bytes are transmitted concurrently. In the illustrated example, the first data byte (Byte-1) in the payload 924 is transmitted over SDATA-A 932, the second data byte (Byte-2) in the payload 924 is transmitted over SCLK-B 934, and the third data byte (Byte-3) in the payload 924 is transmitted over SDATA-B 936. Transmission of the 9-byte payload 924 is accomplished in three byte-length timeslots. Other allocations of bytes among the available aggregated data lines may be used in other implementations.

Throughput of the 2-port aggregated interface is greater than the throughput obtained using a single serial bus. Transmission of the command fields 902, 922 can be expected to consume the same duration of time 906, 926. The duration of time 908 needed to transmit a 9-byte payload 904 over a single serial bus corresponds to nine byte timeslots. The duration of time 928 used to transmit a 9-byte payload 924 through the 2-port aggregated interface corresponds to three byte timeslots. The resultant 66.67% decrease in payload duration is however diluted by the unchanged time required to transmit the command field 922.

A third example 940 illustrates transmission of a command field 942 followed by a byte-interleaved transmission of a payload 944 when 3-port aggregation is enabled. The third example 940 may be used in a system that corresponds to the system 600 illustrated in FIG. 6, for example. The command field 942 includes a four-bit device address and a nine-bit RFFE write command configured as a three-bit command code, a five-bit address field and a parity bit. In the illustrated example, the payload 944 includes 9 data bytes that are transmitted in data signals over five lines provided by three serial buses in accordance with the three-port mapping 720 illustrated in FIG. 7. The three serial buses may correspond to serial buses 610a, 610b and 610c in FIG. 6 and, for the purposes of this example, may be referred to as serial bus A, serial bus B, and serial bus C. The 9 data bytes in the payload 944 are allocated in circular order among the data line (SDATA-A 952) of serial bus A, the clock line (SCLK-B 954) of serial bus B, the data line (SDATA-B 956) of serial bus B, the clock line (SCLK-C 958) of serial bus C, and the data line (SDATA-C 960) of serial bus C.

The command field 942 is transmitted over serial bus A. In some implementations, the command field 942 is also transmitted over serial bus B and/or serial bus C. Port aggregation may be initiated at the receiver when the receiver identifies that the device address in the command field 942 corresponds to an address associated with port aggregation. The receiver may ignore serial bus B and/or serial bus C for the remainder of the command field 942 after detecting the address associated with port aggregation. The receiver may configure deinterleaving circuits or modules after identifying the address associated with port aggregation.

In this third example 940, data is transmitted over SDATA-A 952 of serial bus A, SCLK-B 954 and SDATA-B 956 of serial bus B, and SCLK-C 958 and SDATA-C 960 of serial bus C in accordance with timing derived from a clock signal received over the clock line of the primary serial bus. Five data bytes are transmitted concurrently. In the illustrated example, the first data byte (Byte-1) in the payload 944 is transmitted over SDATA-A 952, the second data byte (Byte-2) in the payload 944 is transmitted over SCLK-B 954, the third data byte (Byte-3) in the payload 944 is transmitted over SDATA-B 956, the fourth data byte (Byte-4) in the payload 944 is transmitted over SCLK-C 958, and the fifth data byte (Byte-5) in the payload 944 is transmitted over SDATA-C 960. Transmission of the 9-byte payload 944 is accomplished in two byte timeslots, which provides for transmission of 10 bytes. In the illustrated example, the tenth byte 962 is undefined, populated with null values or used for other purposes. Other allocations and mappings of bytes among the available aggregated data lines may be used in other implementations.

Throughput of the 3-port aggregated interface is greater than the throughput obtained using a single serial bus. Transmission of the command fields 902, 942 can be expected to consume the same duration of time 906, 946. The duration of time 908 needed to transmit a 9-byte payload 904 over a single serial bus corresponds to 9 byte timeslots. The duration of time 948 used to transmit a 9-byte payload 944 through the 3-port aggregated interface corresponds to 2 byte timeslots. The resultant 77.78% decrease in payload duration is however diluted by the unchanged time required to transmit the command field 942.

According to certain aspects of this disclosure, bit-level interleaving may be performed when two or more serial buses are operated in a port aggregation mode. FIG. 10 illustrates first examples of bit-level interleaved write transactions in a system configured for port aggregation in accordance with certain aspects of this disclosure. A datagram 1000 may be transmitted over a single serial bus when port aggregation is unavailable or disabled. The datagram 1000 includes a command field and a one-byte payload 1006. The command field includes a four-bit device address 1002 and an RFFE write command 1004 that includes a three-bit command code, a five-bit address field and a parity bit (see FIG. 8). In the illustrated example, the payload 1006 is transmitted by the host device and includes one data byte with parity.

Another example illustrates transmission of a datagram 1020 over a pair of serial buses when 2-port aggregation is enabled in a system configured in accordance with the system 500 illustrated in FIG. 5. The datagram 1020 includes a command field and a payload. The command field includes a four-bit device address 1022 and a nine-bit RFFE write command configured as a three-bit command code, a five-bit address field and a parity bit. In the illustrated example, the payload is transmitted by the host device and includes one 8-bit data byte and a parity bit. The datagram 1020 is configured to be encoded in data signals transmitted over three lines provided by two serial buses in accordance with the two-port mapping 700 illustrated in FIG. 7. The two serial buses may correspond to serial buses 510a and 510b in FIG. 5 and, for the purposes of this example, may be referred to as serial bus A and serial bus B. Various bits in the datagram 1020 are allocated in circular order among the data line (SDATA-A 1032) of serial bus A, the clock line (SCLK-B 1034) of serial bus B and the data line (SDATA-B 1036) of serial bus B.

According to certain aspects of this disclosure, the device address 1022 is transmitted without interleaving over SDATA-A 1032, with the remaining bits of the datagram 1020 being bit-interleaved for transmission over the combination of SDATA-A 1032, SCLK-B 1034 and SDATA-B 1036. Serial bus A may be designated or configured to be the primary serial bus for this transaction. In some implementations, the device address 1022 may also be transmitted over the serial bus B. Port aggregation may be initiated at the receiver when the receiver identifies that the device address 1022 corresponds to an address associated with port aggregation. The receiver may configure deinterleaving circuits or modules after identifying the address associated with port aggregation.

Data may be transmitted over SDATA-A 1032 of serial bus A and both SCLK-B 1034 and SDATA-B 1036 of serial bus B in accordance with timing derived from a clock signal received over the clock line of serial bus A. Three bits are transmitted concurrently. In the illustrated example, each of the bitstreams transmitted over SDATA-A 1032, SCLK-B 1034 and SDATA-B 1036 includes command bits, register address bits and payload bits. Other allocations of bits among the available aggregated data lines may be used in other implementations. Transmission of the datagram 1020 is accomplished in 11 bit transmission slots, where a bit transmission slot represents a time interval during which 3 bits are transmitted concurrently over SDATA-A 1032, SCLK-B 1034 and SDATA-B 1036, and where a bit transmission slot may correspond to the period of the clock signal transmitted over the serial bus.

Another example illustrates transmission of a datagram 1040 over three serial buses when 3-port aggregation is enabled in a system configured in accordance with the system 600 illustrated in FIG. 6. The datagram 1040 includes a command field and a payload. The command field includes a four-bit device address 1042 and a nine-bit RFFE write command configured as a three-bit command code, a five-bit address field and a parity bit. In the illustrated example, the payload is transmitted by the host device and includes one 8-bit data byte and a parity bit. The datagram 1040 is configured to be encoded in data signals transmitted over five lines provided by three serial buses in accordance with the three-port mapping 720 illustrated in FIG. 7. The three serial buses may correspond to serial buses 610a, 610b and 610c in FIG. 6 and, for the purposes of this example, may be referred to as serial bus A, serial bus B and serial bus C. Various bits in the datagram 1040 are allocated in circular order among the data line (SDATA-A 1052) of serial bus A, the clock line (SCLK-B 1054) of serial bus B, the data line (SDATA-B 1056) of serial bus B, the clock line (SCLK-C 1058) of serial bus C and the data line (SDATA-C 1060) of serial bus C.

According to certain aspects of this disclosure, the device address 1042 is transmitted without interleaving over SDATA-A 1052, with the remaining bits of the datagram 1040 being bit-interleaved for transmission over the combination of SDATA-A 1052, SCLK-B 1054, SDATA-B 1056, SCLK-C 1058, and SDATA-C 1060. Unused bit transmission slots may be left undefined, populated with null values or used for other purposes. Serial bus A may be designated or configured to be the primary serial bus for this transaction. In some implementations, the device address 1042 may also be transmitted over serial bus B and/or serial bus C. Port aggregation may be initiated at the receiver when the receiver identifies that the device address 1042 corresponds to an address associated with port aggregation. The receiver may configure deinterleaving circuits or modules after identifying the address associated with port aggregation.

Data may be transmitted over SDATA-A 1052, SCLK-B 1054, SDATA-B 1056, SCLK-C 1058, and SDATA-C 1060 in accordance with timing derived from a clock signal received over the clock line of serial bus A. Five bits are transmitted concurrently. In the illustrated example, the bitstreams transmitted over SDATA-A 1052, SCLK-B 1054, SDATA-B 1056, SCLK-C 1058, and SDATA-C 1060 include some combination of command bits, register address bits and payload bits. Other allocations of bits among the available aggregated data lines may be used in other implementations. Transmission of the datagram 1040 is accomplished in 9 bit transmission slots, where a bit transmission slot represents a time interval during which 5 bits are transmitted concurrently over SDATA-A 1052, SCLK-B 1054, SDATA-B 1056, SCLK-C 1058, and SDATA-C 1060, and where a bit transmission slot may correspond to the period of the clock signal transmitted over the serial bus.

FIG. 11 illustrates first examples of bit-level interleaved read transactions in a system configured for port aggregation in accordance with certain aspects of this disclosure. One example illustrates transmission of a datagram 1100 over a single serial bus when port aggregation is unavailable or disabled. The datagram 1100 includes a command field and a one-byte payload 1106. The command field includes a four-bit device address 1102 and an RFFE read command 1104 that includes a three-bit command code, a five-bit address field and a parity bit (see FIG. 8). In the illustrated example, the payload 1106 is transmitted by a subordinate device and includes one data byte with parity. Bus Park signaling is provided after the command field has been transmitted to allow for line turnaround. The subordinate device can begin transmitting the payload 1106 after the bus park signaling has been completed.

Another example illustrates transmission of a datagram 1120 over a pair of serial buses when 2-port aggregation is enabled in a system configured in accordance with the system 500 illustrated in FIG. 5. The datagram 1120 includes a command field and a payload. The command field includes a four-bit device address 1122 and a nine-bit RFFE read command configured as a three-bit command code, a five-bit address field and a parity bit. In the illustrated example, the payload is transmitted by a subordinate device and includes one 8-bit data byte and a parity bit. Bus Park signaling is provided after the command field has been transmitted to allow for line turnaround. The subordinate device can begin transmitting the payload after the bus park signaling has been completed. The datagram 1120 is configured to be encoded in data signals transmitted over three lines provided by two serial buses in accordance with the two-port mapping 700 illustrated in FIG. 7. The two serial buses may correspond to serial buses 510a and 510b in FIG. 5 and, for the purposes of this example, may be referred to as serial bus A and serial bus B. Various bits in the datagram 1120 are allocated in circular order among the data line (SDATA-A 1132) of serial bus A, the clock line (SCLK-B 1134) of serial bus B and the data line (SDATA-B 1136) of serial bus B.

According to certain aspects of this disclosure, the device address 1122 is transmitted without interleaving over SDATA-A 1132, with the remaining bits of the datagram 1120 being bit-interleaved for transmission over the combination of SDATA-A 1132, SCLK-B 1134 and SDATA-B 1136. Serial bus A may be designated or configured to be the primary serial bus for this transaction. In some implementations, the device address 1122 may also be transmitted over the serial bus B. Port aggregation may be initiated at the receiver when the receiver identifies that the device address 1122 corresponds to an address associated with port aggregation. The receiver may configure deinterleaving circuits or modules after identifying the address associated with port aggregation.

Data may be transmitted over SDATA-A 1132 of serial bus A and both SCLK-B 1134 and SDATA-B 1136 of serial bus B in accordance with timing derived from a clock signal received over the clock line of serial bus A. Three bits are transmitted concurrently. In the illustrated example, each of the bitstreams transmitted over SDATA-A 1132, SCLK-B 1134 and SDATA-B 1136 includes command bits, register address bits and payload bits. Other allocations of bits among the available aggregated data lines may be used in other implementations. Transmission of the datagram 1120 is accomplished in 12 bit transmission slots, where a bit transmission slot represents a time interval during which 3 bits are transmitted concurrently over SDATA-A 1132, SCLK-B 1134 and SDATA-B 1136, and where a bit transmission slot may correspond to the period of the clock signal transmitted over the serial bus.

Another example illustrates transmission of a datagram 1140 over three serial buses when 3-port aggregation is enabled in a system configured in accordance with the system 600 illustrated in FIG. 6. The datagram 1140 includes a command field and a payload. The command field includes a four-bit device address 1142 and a nine-bit RFFE read command configured as a three-bit command code, a five-bit address field and a parity bit. In the illustrated example, the payload is transmitted by a subordinate device and includes one 8-bit data byte and a parity bit. Bus Park signaling is provided after the command field has been transmitted to allow for line turnaround. The subordinate device can begin transmitting the payload after the bus park signaling has been completed. The datagram 1140 is configured to be encoded in data signals transmitted over five lines provided by three serial buses in accordance with the three-port mapping 720 illustrated in FIG. 7. The three serial buses may correspond to serial buses 610a, 610b and 610c in FIG. 6 and, for the purposes of this example, may be referred to as serial bus A, serial bus B and serial bus C. Various bits in the datagram 1140 are allocated in circular order among the data line (SDATA-A 1152) of serial bus A, the clock line (SCLK-B 1154) of serial bus B, the data line (SDATA-B 1156) of serial bus B, the clock line (SCLK-C 1158) of serial bus C and the data line (SDATA-C 1160) of serial bus C.

According to certain aspects of this disclosure, the device address 1142 is transmitted without interleaving over SDATA-A 1152, with the remaining bits of the datagram 1140 being bit-interleaved for transmission over the combination of SDATA-A 1152, SCLK-B 1154, SDATA-B 1156, SCLK-C 1158, and SDATA-C 1160. Unused bit transmission slots may be left undefined, populated with null values or used for other purposes. Serial bus A may be designated or configured to be the primary serial bus for this transaction. In some implementations, the device address 1142 may also be transmitted over serial bus B and/or serial bus C. Port aggregation may be initiated at the receiver when the receiver identifies that the device address 1142 corresponds to an address associated with port aggregation. The receiver may configure deinterleaving circuits or modules after identifying the address associated with port aggregation.

Data may be transmitted over SDATA-A 1152, SCLK-B 1154, SDATA-B 1156, SCLK-C 1158, and SDATA-C 1160 in accordance with timing derived from a clock signal received over the clock line of serial bus A. Five bits are transmitted concurrently. In the illustrated example, the bitstreams transmitted over SDATA-A 1152, SCLK-B 1154, SDATA-B 1156, SCLK-C 1158, and SDATA-C 1160 include some combination of command bits, register address bits and payload bits. Other allocations of bits among the available aggregated data lines may be used in other implementations. Transmission of the datagram 1140 is accomplished in 10 bit transmission slots, where a bit transmission slot represents a time interval during which 5 bits are transmitted concurrently over SDATA-A 1152, SCLK-B 1154, SDATA-B 1156, SCLK-C 1158, and SDATA-C 1160, and where a bit transmission slot may correspond to the period of the clock signal transmitted over the serial bus.

FIG. 12 illustrates second examples of bit-level interleaved write transactions in a system configured for port aggregation in accordance with certain aspects of this disclosure. In these examples, the write transaction includes an extended register write command. One example illustrates transmission of a datagram 1200 over a single serial bus when port aggregation is unavailable or disabled. The datagram 1200 includes a command field, a register address field 1206 and a payload 1208. The command field includes a four-bit device address 1202 and an RFFE extended register write command 1204.

The RFFE extended register write command 1204 is configured with a four-bit command code, a four-bit byte count and a parity bit. The byte count indicates the number of data bytes carried in the payload 1208. The register address field 1206 indicates a starting address associated with the write command. The register address field 1206 is transmitted after the command field, and is followed by the payload 1208 and a termination field such as bus park signaling. In this example, the payload 1208 is transmitted by the host device and includes two bytes of data.

Another example illustrates transmission of a datagram 1220 over a pair of serial buses when 2-port aggregation is enabled in a system configured in accordance with the system 500 illustrated in FIG. 5. The datagram 1220 includes a command field, a register address field and a payload. The command field includes a four-bit device address 1222 and an RFFE extended register write command. The RFFE extended register write command is configured with a four-bit command code, a four-bit byte count and a parity bit. The byte count indicates the number of data bytes carried in the payload. The register address field 1206 indicates a starting address associated with the write command. The register address field is transmitted after the command field, followed by the data payload and a termination field such as bus park signaling. In this example, the data payload is transmitted by the host device and includes two bytes of data.

The datagram 1220 is configured to be encoded in data signals transmitted over three lines provided by two serial buses in accordance with the two-port mapping 700 illustrated in FIG. 7. The two serial buses may correspond to serial buses 510a and 510b in FIG. 5 and, for the purposes of this example, may be referred to as serial bus A and serial bus B. Various bits in the datagram 1220 are allocated in circular order among the data line (SDATA-A 1232) of serial bus A, the clock line (SCLK-B 1234) of serial bus B and the data line (SDATA-B 1236) of serial bus B.

According to certain aspects of this disclosure, the device address 1222 is transmitted without interleaving over SDATA-A 1232, with the remaining bits of the datagram 1220 being bit-interleaved for transmission over the combination of SDATA-A 1232, SCLK-B 1234 and SDATA-B 1236. Serial bus A may be designated or configured to be the primary serial bus for this transaction. In some implementations, the device address 1222 may also be transmitted over the serial bus B. Port aggregation may be initiated at the receiver when the receiver identifies that the device address 1222 corresponds to an address associated with port aggregation. The receiver may configure deinterleaving circuits or modules after identifying the address associated with port aggregation.

Data may be transmitted over SDATA-A 1232 of serial bus A and both SCLK-B 1234 and SDATA-B 1236 of serial bus B in accordance with timing derived from a clock signal received over the clock line of serial bus A. Three bits are transmitted concurrently. In the illustrated example, each of the bitstreams transmitted over SDATA-A 1232, SCLK-B 1234 and SDATA-B 1236 includes command bits, register address bits and payload bits. Other allocations of bits among the available aggregated data lines may be used in other implementations. Transmission of the datagram 1220 is accomplished in 17 bit transmission slots, where a bit transmission slot represents a time interval during which 3 bits are transmitted concurrently over SDATA-A 1232, SCLK-B 1234 and SDATA-B 1236, and where a bit transmission slot may correspond to the period of the clock signal transmitted over the serial bus.

Another example illustrates transmission of a datagram 1240 over three serial buses when 3-port aggregation is enabled in a system configured in accordance with the system 600 illustrated in FIG. 6. The datagram 1240 includes a command field, a register address field and a payload. The command field includes a four-bit device address 1242, a register address field and an RFFE extended register write command. The RFFE extended register write command is configured with a four bit, all-zero write code and a four-bit byte count. The byte count indicates the number of data bytes carried in the payload. The register address field indicates a starting address associated with the write command. The register address field is transmitted after the command field, followed by the data payload and a termination field such as bus park signaling. In this example, the data payload is transmitted by the host device and includes two bytes of data.

The datagram 1240 is configured to be encoded in data signals transmitted over five lines provided by three serial buses in accordance with the three-port mapping 720 illustrated in FIG. 7. The three serial buses may correspond to serial buses 610a, 610b and 610c in FIG. 6 and, for the purposes of this example, may be referred to as serial bus A, serial bus B and serial bus C. Various bits in the datagram 1240 are allocated in circular order among the data line (SDATA-A 1252) of serial bus A, the clock line (SCLK-B 1254) of serial bus B, the data line (SDATA-B 1256) of serial bus B, the clock line (SCLK-C 1258) of serial bus C and the data line (SDATA-C 1260) of serial bus C.

According to certain aspects of this disclosure, the device address 1242 is transmitted without interleaving over SDATA-A 1252, with the remaining bits of the datagram 1240 being bit-interleaved for transmission over the combination of SDATA-A 1252, SCLK-B 1254, SDATA-B 1256, SCLK-C 1258 and SDATA-C 1260. Unused bit transmission slots may be left undefined, populated with null values or used for other purposes. Serial bus A may be designated or configured to be the primary serial bus for this transaction. In some implementations, the device address 1242 may also be transmitted over serial bus B and/or serial bus C. Port aggregation may be initiated at the receiver when the receiver identifies that the device address 1242 corresponds to an address associated with port aggregation. The receiver may configure deinterleaving circuits or modules after identifying the address associated with port aggregation.

Data may be transmitted over SDATA-A 1252, SCLK-B 1254, SDATA-B 1256, SCLK-C 1258 and SDATA-C 1260 in accordance with timing derived from a clock signal received over the clock line of serial bus A. Five bits are transmitted concurrently. In the illustrated example, the bitstreams transmitted over SDATA-A 1252, SCLK-B 1254, SDATA-B 1256, SCLK-C 1258, and SDATA-C 1260 include some combination of command bits, register address bits and payload bits. Other allocations of bits among the available aggregated data lines may be used in other implementations. Transmission of the datagram 1240 is accomplished in 13 bit transmission slots, where a bit transmission slot represents a time interval during which 5 bits are transmitted concurrently over each of SDATA-A 1252, SCLK-B 1254, SDATA-B 1256, SCLK-C 1258, and SDATA-C 1260, and where a bit transmission slot may correspond to the period of the clock signal transmitted over the serial bus.

FIG. 13 illustrates second examples of bit-level interleaved read transactions in a system configured for port aggregation in accordance with certain aspects of this disclosure. In these examples, the read transaction includes an extended register read command. One example illustrates transmission of a datagram 1300 over a single serial bus when port aggregation is unavailable or disabled. The datagram 1300 includes a command field, a register address field 1306 and a payload 1308. The command field includes a four-bit device address 1302 and an RFFE extended register read command 1304.

The RFFE extended register read command 1304 is configured with a four-bit command code, a four-bit byte count and a parity bit. The byte count indicates the number of data bytes carried in the payload 1308. The register address field 1306 indicates a starting address associated with the read command. The register address field 1306 is transmitted after the command field, and is followed by the payload 1308 and a termination field such as bus park signaling. In this example, the payload 1308 is transmitted by the subordinate device and includes two bytes of data. Bus Park signaling is provided between the register address field 1306 and the payload 1308 to facilitate bus turnaround, during which the host ceases transmissions over the data line and the subordinate device begins transmitting over the data line.

Another example illustrates transmission of a datagram 1320 over a pair of serial buses when 2-port aggregation is enabled in a system configured in accordance with the system 500 illustrated in FIG. 5. The datagram 1320 includes a command field, a register address field and a payload. The command field includes a four-bit device address 1322 and an RFFE extended register read command. The RFFE extended register read command is configured with a four-bit command code, a four-bit byte count and a parity bit. The byte count indicates the number of data bytes carried in the payload. The register address field 1306 indicates a starting address associated with the RFFE extended register read command. The register address field is transmitted after the command field, followed by the data payload and a termination field such as bus park signaling. In this example, the data payload is transmitted by the host device and includes two bytes of data. Bus Park signaling is provided on each serial bus between transmission of the register address field and the payload. The bus park signaling facilitates bus turnaround, during which the host ceases transmissions over the data line and the subordinate device begins transmitting over the data line.

The datagram 1320 is configured to be encoded in data signals transmitted over three lines provided by two serial buses in accordance with the two-port mapping 700 illustrated in FIG. 7. The two serial buses may correspond to serial buses 510a and 510b in FIG. 5 and, for the purposes of this example, may be referred to as serial bus A and serial bus B. Various bits in the datagram 1320 are allocated in circular order among the data line (SDATA-A 1332) of serial bus A, the clock line (SCLK-B 1334) of serial bus B and the data line (SDATA-B 1336) of serial bus B.

According to certain aspects of this disclosure, the device address 1322 is transmitted without interleaving over SDATA-A 1332, with the remaining bits of the datagram 1320 being bit-interleaved for transmission over the combination of SDATA-A 1332, SCLK-B 1334 and SDATA-B 1336. Serial bus A may be designated or configured to be the primary serial bus for this transaction. In some implementations, the device address 1322 may also be transmitted over the serial bus B. Port aggregation may be initiated at the receiver when the receiver identifies that the device address 1322 corresponds to an address associated with port aggregation. The receiver may configure deinterleaving circuits or modules after identifying the address associated with port aggregation.

Data may be transmitted over SDATA-A 1332 of serial bus A and both SCLK-B 1334 and SDATA-B 1336 of serial bus B in accordance with timing derived from a clock signal received over the clock line of serial bus A. Three bits are transmitted concurrently. In the illustrated example, each of the bitstreams transmitted over SDATA-A 1332, SCLK-B 1334 and SDATA-B 1336 includes command bits, register address bits and payload bits. Other allocations of bits among the available aggregated data lines may be used in other implementations. Transmission of the datagram 1320 is accomplished in 17 bit transmission slots, where a bit transmission slot represents a time interval during which 3 bits are transmitted concurrently over SDATA-A 1332, SCLK-B 1334 and SDATA-B 1336, and where a bit transmission slot may correspond to the period of the clock signal transmitted over the serial bus.

Another example illustrates transmission of a datagram 1340 over three serial buses when 3-port aggregation is enabled in a system configured in accordance with the system 600 illustrated in FIG. 6. The datagram 1340 includes a command field, a register address field and a payload. The command field includes a four-bit device address 1342, a register address field and an RFFE extended register read command. The RFFE extended register read command is configured with a four bit, all-zero read code and a four-bit byte count. The byte count indicates the number of data bytes carried in the payload. The register address field indicates a starting address associated with the RFFE extended register read command. The register address field is transmitted after the command field, followed by the data payload and a termination field such as bus park signaling. In this example, the data payload is transmitted by the host device and includes two bytes of data. Bus Park signaling is provided on each serial bus between transmission of the register address field and the payload. The bus park signaling facilitates bus turnaround, during which the host ceases transmissions over the data line and the subordinate device begins transmitting over the data line.

The datagram 1340 is configured to be encoded in data signals transmitted over five lines provided by three serial buses in accordance with the three-port mapping 720 illustrated in FIG. 7. The three serial buses may correspond to serial buses 610a, 610b and 610c in FIG. 6 and, for the purposes of this example, may be referred to as serial bus A, serial bus B and serial bus C. Various bits in the datagram 1340 are allocated in circular order among the data line (SDATA-A 1352) of serial bus A, the clock line (SCLK-B 1354) of serial bus B, the data line (SDATA-B 1356) of serial bus B, the clock line (SCLK-C 1358) of serial bus C and the data line (SDATA-C 1360) of serial bus C.

According to certain aspects of this disclosure, the device address 1342 is transmitted without interleaving over SDATA-A 1352, with the remaining bits of the datagram 1340 being bit-interleaved for transmission over the combination of SDATA-A 1352, SCLK-B 1354, SDATA-B 1356, SCLK-C 1358, and SDATA-C 1360. Unused bit transmission slots may be left undefined, populated with null values or used for other purposes. Serial bus A may be designated or configured to be the primary serial bus for this transaction. In some implementations, the device address 1342 may also be transmitted over serial bus B and/or serial bus C. Port aggregation may be initiated at the receiver when the receiver identifies that the device address 1342 corresponds to an address associated with port aggregation. The receiver may configure deinterleaving circuits or modules after identifying the address associated with port aggregation.

Data may be transmitted over SDATA-A 1352, SCLK-B 1354, SDATA-B 1356, SCLK-C 1358, and SDATA-C 1360 in accordance with timing derived from a clock signal received over the clock line of serial bus A. Five bits are transmitted concurrently. In the illustrated example, the bitstreams transmitted over SDATA-A 1352, SCLK-B 1354, SDATA-B 1356, SCLK-C 1358, and SDATA-C 1360 include some combination of command bits, register address bits and payload bits. Other allocations of bits among the available aggregated data lines may be used in other implementations. Transmission of the datagram 1340 is accomplished in 13 bit transmission slots, where a bit transmission slot represents a time interval during which 5 bits are transmitted concurrently over each of SDATA-A 1352, SCLK-B 1354, SDATA-B 1356, SCLK-C 1358, and SDATA-C 1360, and where a bit transmission slot may correspond to the period of the clock signal transmitted over the serial bus.

According to certain aspects of this disclosure, bit-level interleaving in some port aggregation modes may be performed using the data lines of two or more serial buses. In some implementations, the same clock signal can be transmitted on the clock lines of the serial buses when these port aggregation modes are active. In some implementations, the clock signal transmitted on the clock line of a designated or selected primary serial buses may control transmission when certain port aggregation modes are active.

Figure 14:
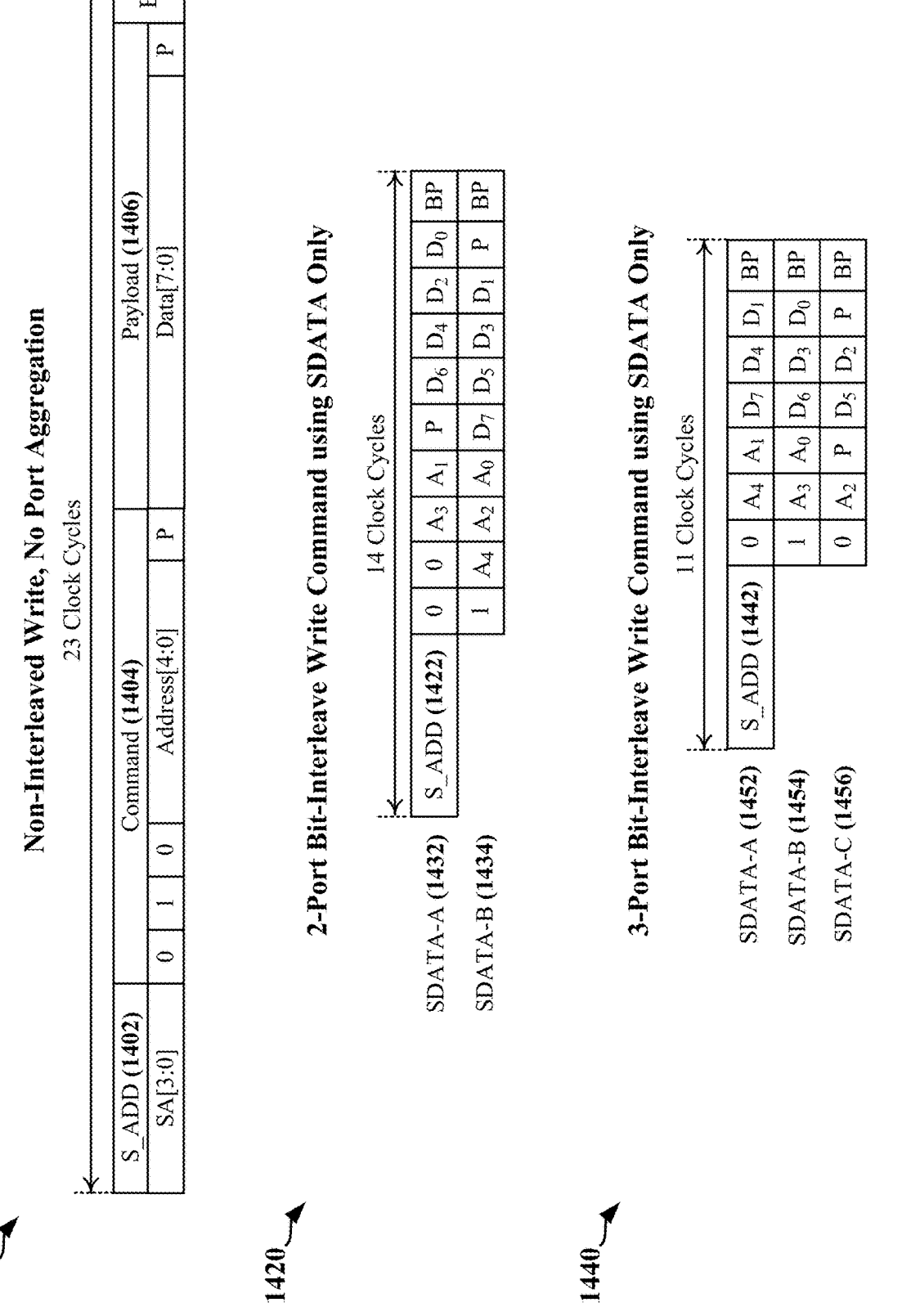
FIG. 14 illustrates first examples of bit-level interleaved write transactions in a system configured for data line aggregation in accordance with certain aspects of this disclosure.

FIG. 14 illustrates first examples of bit-level interleaved write transactions in a system configured for data line aggregation in accordance with certain aspects of this disclosure. The datagram 1400 may be transmitted over a single serial bus when port aggregation is unavailable or disabled. The datagram 1400 includes a command field and a one-byte payload 1406. The command field includes a four-bit device address 1402 and an RFFE write command 1404 that includes a three-bit command code, a five-bit address field and a parity bit. In the illustrated example, the payload 1406 is transmitted by the host device and includes one data byte with parity.

Another example illustrates transmission of a datagram 1420 over a pair of serial buses when 2-port aggregation is enabled in a system configured in accordance with the system 500 illustrated in FIG. 5. The datagram 1420 includes a command field and a payload. The command field includes a four-bit device address 1422 and an RFFE write command configured as a three-bit command code, a five-bit address field and a parity bit. In the illustrated example, the payload is transmitted by the host device and includes one 8-bit data byte and a parity bit. The datagram 1420 is configured to be encoded in data signals transmitted over two data lines of a pair of serial buses. The two serial buses may correspond to serial buses 510a and 510b in FIG. 5 and, for the purposes of this example, may be referred to as serial bus A and serial bus B. Various bits in the datagram 1420 are allocated in circular order among the data line (SDATA-A 1432) of serial bus A and the data line (SDATA-B 1434) of serial bus B.

According to certain aspects of this disclosure, the device address 1422 is transmitted without interleaving over SDATA-A 1432, with the remaining bits of the datagram 1420 being bit-interleaved for transmission over the combination of SDATA-A 1432 and SDATA-B 1434. Serial bus A may be designated or configured to be the primary serial bus for this transaction. In some implementations, the device address 1422 may also be transmitted over the serial bus B. Port aggregation may be initiated at the receiver when the receiver identifies that the device address 1422 corresponds to an address associated with port aggregation. The receiver may configure deinterleaving circuits or modules after identifying the address associated with port aggregation.

Data may be transmitted over SDATA-A 1432 of serial bus A and SDATA-B 1434 of serial bus B in accordance with timing derived from a clock signal received over the clock line of serial bus A. Two bits are transmitted concurrently. In the illustrated example, each of the bitstreams transmitted over SDATA-A 1432 and SDATA-B 1434 include command bits, register address bits and payload bits. Other allocations of bits among the available aggregated data lines may be used in other implementations. Transmission of the datagram 1420 is accomplished in 14 bit transmission slots, where a bit transmission slot represents a time interval during which 2 bits are transmitted concurrently over SDATA-A 1432 and SDATA-B 1434, and where a bit transmission slot may correspond to the period of the clock signal transmitted over the serial bus.

Another example illustrates transmission of a datagram 1440 over three serial buses when 3-port aggregation is enabled in a system configured in accordance with the system 600 illustrated in FIG. 6. The datagram 1440 includes a command field and a payload. The command field includes a four-bit device address 1442 and an RFFE write command configured as a three-bit command code, a five-bit address field and a parity bit. In the illustrated example, the payload is transmitted by the host device and includes one 8-bit data byte and a parity bit. The datagram 1440 is configured to be encoded in data signals transmitted over three data lines provided by three serial buses. The three serial buses may correspond to serial buses 610a, 610b and 610c in FIG. 6 and, for the purposes of this example, may be referred to as serial bus A, serial bus B and serial bus C. Various bits in the datagram 1440 are allocated in circular order among the data line (SDATA-A 1452) of serial bus A, the data line (SDATA-B 1454) of serial bus B and the data line (SDATA-C 1456) of serial bus C.

According to certain aspects of this disclosure, the device address 1442 is transmitted without interleaving over SDATA-A 1452, with the remaining bits of the datagram 1440 being bit-interleaved for transmission over the combination of SDATA-A 1452, SDATA-B 1454 and SDATA-C 1456. Unused bit transmission slots may be left undefined, populated with null values or used for other purposes. Serial bus A may be designated or configured to be the primary serial bus for this transaction. In some implementations, the device address 1442 may also be transmitted over serial bus B and/or serial bus C. Port aggregation may be initiated at the receiver when the receiver identifies that the device address 1442 corresponds to an address associated with port aggregation. The receiver may configure deinterleaving circuits or modules after identifying the address associated with port aggregation.

Data may be transmitted over SDATA-A 1452, SDATA-B 1454 and SDATA-C 1456 in accordance with timing derived from a clock signal received over the clock line of serial bus A. Three bits are transmitted concurrently. In the illustrated example, the bitstreams transmitted over SDATA-A 1452, SDATA-B 1454 and SDATA-C 1456 include some combination of command bits, register address bits and payload bits. Other allocations of bits among the available aggregated data lines may be used in other implementations. Transmission of the datagram 1440 is accomplished in 11 bit transmission slots, where a bit transmission slot represents a time interval during which 3 bits are transmitted concurrently over SDATA-A 1452, SDATA-B 1454 and SDATA-C 1456, and where a bit transmission slot may correspond to the period of the clock signal transmitted over the serial bus.

Figure 15:
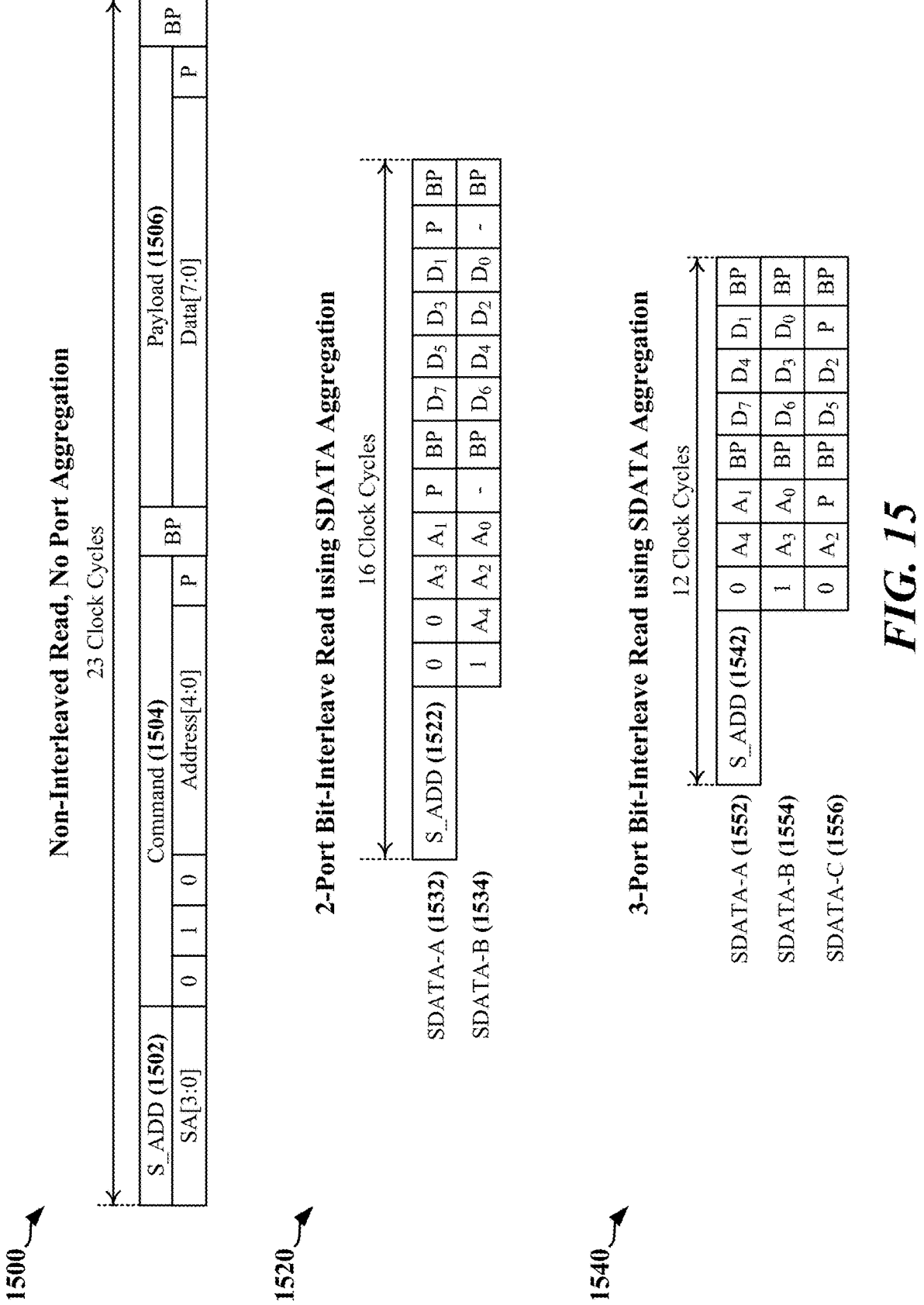
FIG. 15 illustrates first examples of bit-level interleaved read transactions in a system configured for data line aggregation in accordance with certain aspects of this disclosure.

FIG. 15 illustrates first examples of bit-level interleaved read transactions in a system configured for data line aggregation in accordance with certain aspects of this disclosure. The datagram 1500 may be transmitted over a single serial bus when port aggregation is unavailable or disabled. The datagram 1500 includes a command field and a one-byte payload 1506. The command field includes a four-bit device address 1502 and an RFFE read command 1504 that includes a three-bit command code, a five-bit address field and a parity bit. In the illustrated example, the payload 1506 is transmitted by a subordinate device and includes one data byte with parity. Bus Park signaling is provided after the command field has been transmitted to allow for line turnaround. The subordinate device can begin transmitting the payload 1506 after the bus park signaling has been completed.

Another example illustrates transmission of a datagram 1520 over a pair of serial buses when 2-port aggregation is enabled in a system configured in accordance with the system 500 illustrated in FIG. 5. The datagram 1520 includes a command field and a payload. The command field includes a four-bit device address 1522 and an RFFE read command configured as a three-bit command code, a five-bit address field and a parity bit. In the illustrated example, the payload is transmitted by a subordinate device and includes one 8-bit data byte and a parity bit. Bus Park signaling is provided after the command field has been transmitted to allow for line turnaround. The subordinate device can begin transmitting the payload after the bus park signaling has been completed. The datagram 1520 is configured to be encoded in data signals transmitted over two data lines provided by two serial buses. The two serial buses may correspond to serial buses 510a and 510b in FIG. 5 and, for the purposes of this example, may be referred to as serial bus A and serial bus B. Various bits in the datagram 1520 are allocated in circular order among the data line (SDATA-A 1532) of serial bus A and the data line (SDATA-B 1534) of serial bus B.

According to certain aspects of this disclosure, the device address 1522 is transmitted without interleaving over SDATA-A 1532, with the remaining bits of the datagram 1520 being bit-interleaved for transmission over the combination of SDATA-A 1532 and SDATA-B 1534. Serial bus A may be designated or configured to be the primary serial bus for this transaction. In some implementations, the device address 1522 may also be transmitted over the serial bus B. Port aggregation may be initiated at the receiver when the receiver identifies that the device address 1522 corresponds to an address associated with port aggregation. The receiver may configure deinterleaving circuits or modules after identifying the address associated with port aggregation.

Data may be transmitted over SDATA-A 1532 of serial bus A and SDATA-B 1534 of serial bus B in accordance with timing derived from a clock signal received over the clock line of serial bus A. Two bits are transmitted concurrently. In the illustrated example, each of the bitstreams transmitted over SDATA-A 1532 and SDATA-B 1534 includes command bits, register address bits and payload bits. Other allocations of bits among the available aggregated data lines may be used in other implementations. Transmission of the datagram 1520 is accomplished in 16 bit transmission slots, where a bit transmission slot represents a time interval during which 2 bits are transmitted concurrently over SDATA-A 1532 and SDATA-B 1534, and where a bit transmission slot may correspond to the period of the clock signal transmitted over the serial bus.

Another example illustrates transmission of a datagram 1540 over three serial buses when 3-port aggregation is enabled in a system configured in accordance with the system 600 illustrated in FIG. 6. The datagram 1540 includes a command field and a payload. The command field includes a four-bit device address 1542 and an RFFE read command configured as a three-bit command code, a five-bit address field and a parity bit. In the illustrated example, the payload is transmitted by a subordinate device and includes one 8-bit data byte and a parity bit. Bus Park signaling is provided after the command field has been transmitted to allow for line turnaround. The subordinate device can begin transmitting the payload after the bus park signaling has been completed.

The datagram 1540 is configured to be encoded in data signals transmitted over three data lines provided by three serial buses. The three serial buses may correspond to serial buses 610a, 610b and 610c in FIG. 6 and, for the purposes of this example, may be referred to as serial bus A, serial bus B and serial bus C. Various bits in the datagram 1540 are allocated in circular order among the data line (SDATA-A 1552) of serial bus A, the data line (SDATA-B 1554) of serial bus B and the data line (SDATA-C 1556) of serial bus C.

According to certain aspects of this disclosure, the device address 1542 is transmitted without interleaving over SDATA-A 1552, with the remaining bits of the datagram 1540 being bit-interleaved for transmission over the combination of SDATA-A 1552, SDATA-B 1554 and SDATA-C 1556. Unused bit transmission slots may be left undefined, populated with null values or used for other purposes. Serial bus A may be designated or configured to be the primary serial bus for this transaction. In some implementations, the device address 1542 may also be transmitted over serial bus B and/or serial bus C. Port aggregation may be initiated at the receiver when the receiver identifies that the device address 1542 corresponds to an address associated with port aggregation. The receiver may configure deinterleaving circuits or modules after identifying the address associated with port aggregation.

Data may be transmitted over SDATA-A 1552, SDATA-B 1554 and SDATA-C 1556 in accordance with timing derived from a clock signal received over the clock line of serial bus A. Three bits are transmitted concurrently. In the illustrated example, the bitstreams transmitted over SDATA-A 1552, SDATA-B 1554 and SDATA-C 1556 include some combination of command bits, register address bits and payload bits. Other allocations of bits among the available aggregated data lines may be used in other implementations. Transmission of the datagram 1540 is accomplished in 12 bit transmission slots, where a bit transmission slot represents a time interval during which 3 bits are transmitted concurrently over SDATA-A 1552, SDATA-B 1554 and SDATA-C 1556, and where a bit transmission slot may correspond to the period of the clock signal transmitted over the serial bus.

Figure 16:
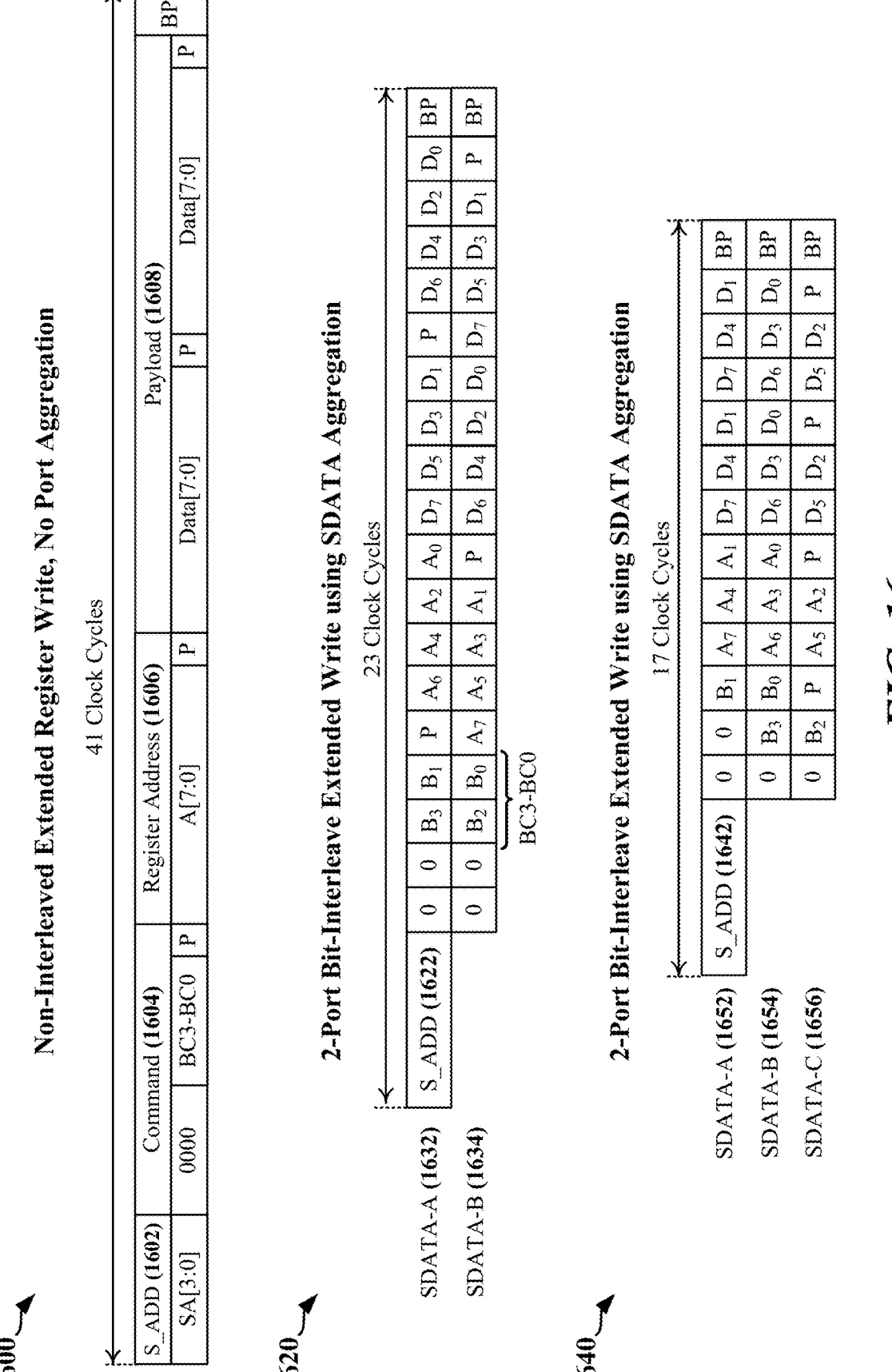
FIG. 16 illustrates second examples of bit-level interleaved write transactions in a system configured for data line aggregation in accordance with certain aspects of this disclosure.

FIG. 16 illustrates second examples of bit-level interleaved write transactions in a system configured for data line aggregation in accordance with certain aspects of this disclosure. In these examples, the write transaction includes an extended register write command. The datagram 1600 may be transmitted over a single serial bus when port aggregation is unavailable or disabled. The datagram 1600 includes a command field, a register address field 1606 and a payload 1608. The command field includes a four-bit device address 1602 and an RFFE extended register write command 1604.

The RFFE extended register write command 1604 is configured with a four-bit command code, a four-bit byte count and a parity bit. The byte count indicates the number of data bytes carried in the payload 1608. The register address field 1606 indicates a starting address associated with the write command. The register address field 1606 is transmitted after the command field, and is followed by the payload 1608 and a termination field such as bus park signaling. In this example, the payload 1608 is transmitted by the host device and includes two bytes of data.

Another example illustrates transmission of a datagram 1620 over a pair of serial buses when 2-port aggregation is enabled in a system configured in accordance with the system 500 illustrated in FIG. 5. The datagram 1620 includes a command field, a register address field and a payload. The command field includes a four-bit device address 1622 and an RFFE extended register write command. The RFFE extended register write command is configured with a four-bit command code, a four-bit byte count and a parity bit. The byte count indicates the number of data bytes carried in the payload. The register address field 1606 indicates a starting address associated with the write command. The register address field is transmitted after the command field, followed by the data payload and a termination field such as bus park signaling. In this example, the data payload is transmitted by the host device and includes two bytes of data.

The datagram 1620 is configured to be encoded in data signals transmitted over two data lines provided by two serial buses. The two serial buses may correspond to serial buses 510a and 510b in FIG. 5 and, for the purposes of this example, may be referred to as serial bus A and serial bus B. Various bits in the datagram 1620 are allocated in circular order among the data line (SDATA-A 1632) of serial bus A and the data line (SDATA-B 1634) of serial bus B.

According to certain aspects of this disclosure, the device address 1622 is transmitted without interleaving over SDATA-A 1632, with the remaining bits of the datagram 1620 being bit-interleaved for transmission over the combination of SDATA-A 1632 and SDATA-B 1634. Serial bus A may be designated or configured to be the primary serial bus for this transaction. In some implementations, the device address 1622 may also be transmitted over the serial bus B. Port aggregation may be initiated at the receiver when the receiver identifies that the device address 1622 corresponds to an address associated with port aggregation. The receiver may configure deinterleaving circuits or modules after identifying the address associated with port aggregation.

Data may be transmitted over SDATA-A 1632 of serial bus A and SDATA-B 1634 of serial bus B in accordance with timing derived from a clock signal received over the clock line of serial bus A. Two bits are transmitted concurrently. In the illustrated example, each of the bitstreams transmitted over SDATA-A 1632 and SDATA-B 1634 includes command bits, register address bits and payload bits. Other allocations of bits among the available aggregated data lines may be used in other implementations. Transmission of the datagram 1620 is accomplished in 23-bit transmission slots, where a bit transmission slot represents a time interval during which 2 bits are transmitted concurrently over SDATA-A 1632 and SDATA-B 1634, and where a bit transmission slot may correspond to the period of the clock signal transmitted over the serial bus.

Another example illustrates transmission of a datagram 1640 over three serial buses when 3-port aggregation is enabled in a system configured in accordance with the system 600 illustrated in FIG. 6. The datagram 1640 includes a command field, a register address field and a payload. The command field includes a four-bit device address 1642, a register address field and an RFFE extended register write command. The RFFE extended register write command is configured with a four bit, all-zero write code and a four-bit byte count. The byte count indicates the number of data bytes carried in the payload. The register address field indicates a starting address associated with the write command. The register address field is transmitted after the command field, followed by the data payload and a termination field such as bus park signaling. In this example, the data payload is transmitted by the host device and includes two bytes of data.

The datagram 1640 is configured to be encoded in data signals transmitted over three data lines provided by three serial buses. The three serial buses may correspond to serial buses 610a, 610b and 610c in FIG. 6 and, for the purposes of this example, may be referred to as serial bus A, serial bus B and serial bus C. Various bits in the datagram 1640 are allocated in circular order among the data line (SDATA-A 1652) of serial bus A, the data line (SDATA-B 1654) of serial bus B and the data line (SDATA-C 1656) of serial bus C.

According to certain aspects of this disclosure, the device address 1642 is transmitted without interleaving over SDATA-A 1652, with the remaining bits of the datagram 1640 being bit-interleaved for transmission over the combination of SDATA-A 1652, SDATA-B 1654 and SDATA-C 1656. Unused bit transmission slots may be left undefined, populated with null values or used for other purposes. Serial bus A may be designated or configured to be the primary serial bus for this transaction. In some implementations, the device address 1642 may also be transmitted over serial bus B and/or serial bus C. Port aggregation may be initiated at the receiver when the receiver identifies that the device address 1642 corresponds to an address associated with port aggregation. The receiver may configure deinterleaving circuits or modules after identifying the address associated with port aggregation.

Data may be transmitted over SDATA-A 1652, SDATA-B 1654 and SDATA-C 1656 in accordance with timing derived from a clock signal received over the clock line of serial bus A. Three bits are transmitted concurrently. In the illustrated example, the bitstreams transmitted over SDATA-A 1652, SDATA-B 1654 and SDATA-C 1656 include some combination of command bits, register address bits and payload bits. Other allocations of bits among the available aggregated data lines may be used in other implementations. Transmission of the datagram 1640 is accomplished in 17 bit transmission slots, where a bit transmission slot represents a time interval during which 3 bits are transmitted concurrently over each of SDATA-A 1652, SDATA-B 1654 and SDATA-C 1656, and where a bit transmission slot may correspond to the period of the clock signal transmitted over the serial bus.

Figure 17:
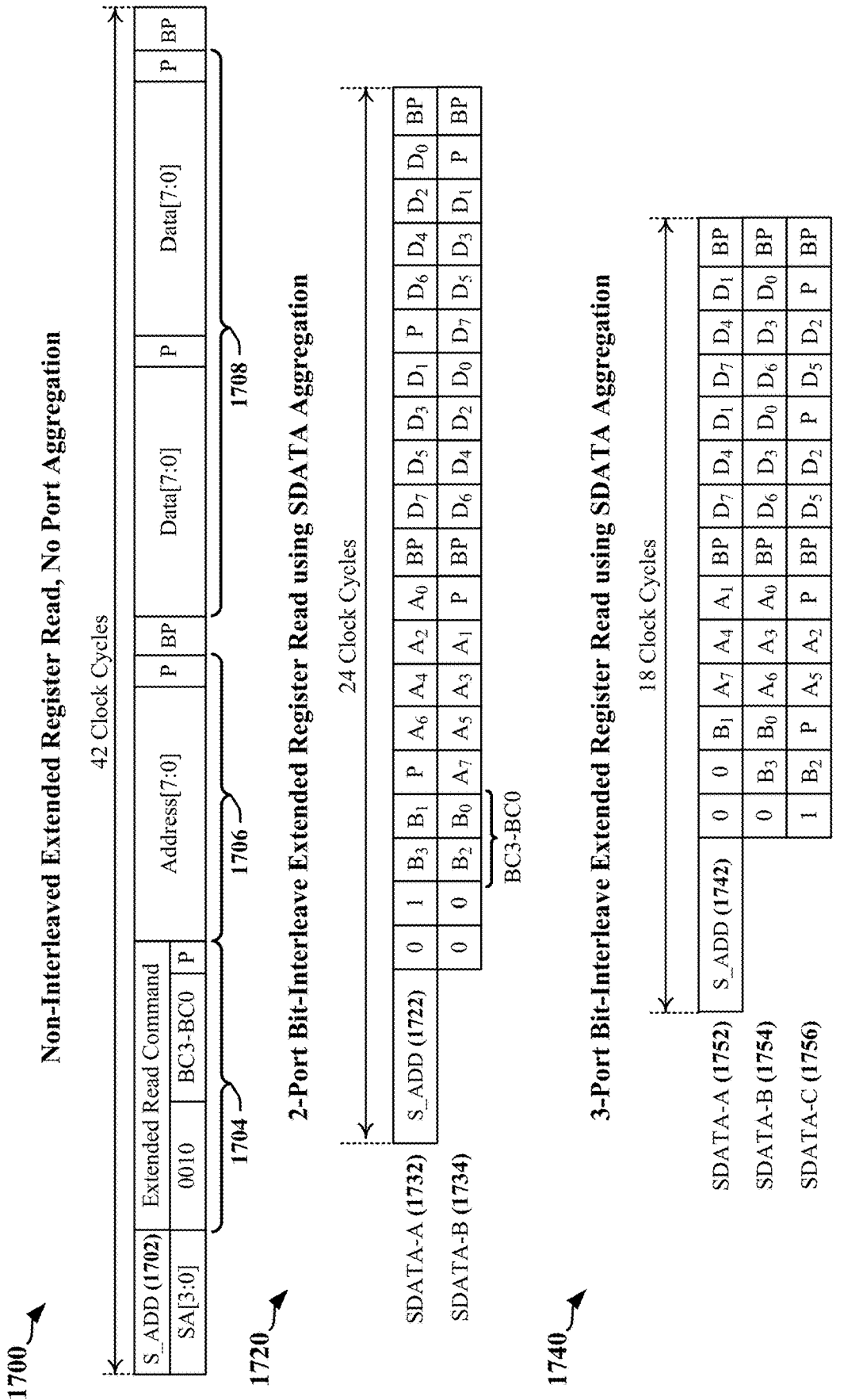
FIG. 17 illustrates second examples of bit-level interleaved read transactions in a system configured for data line aggregation in accordance with certain aspects of this disclosure.

FIG. 17 illustrates second examples of bit-level interleaved read transactions in a system configured for data line aggregation in accordance with certain aspects of this disclosure. The read transactions include an extended register read command. A datagram 1700 may be transmitted over a single serial bus when port aggregation is unavailable or disabled. The datagram 1700 includes a command field, a register address field 1706 and a payload 1708. The command field includes a four-bit device address 1702 and an RFFE extended register read command 1704.

The RFFE extended register read command 1704 is configured with a four-bit command code, a four-bit byte count and a parity bit. The byte count indicates the number of data bytes carried in the payload 1708. The register address field 1706 indicates a starting address associated with the read command. The register address field 1706 is transmitted after the command field, and is followed by the payload 1708 and a termination field such as bus park signaling. In this example, the payload 1708 is transmitted by the subordinate device and includes two bytes of data. Bus Park signaling is provided between the register address field 1706 and the payload 1708 to facilitate bus turnaround, during which the host ceases transmissions over the data line and the subordinate device begins transmitting over the data line.

Another example illustrates transmission of a datagram 1720 over a pair of serial buses when 2-port aggregation is enabled in a system configured in accordance with the system 500 illustrated in FIG. 5. The datagram 1720 includes a command field, a register address field and a payload. The command field includes a four-bit device address 1722 and an RFFE extended register read command. The RFFE extended register read command is configured with a four-bit command code, a four-bit byte count and a parity bit. The byte count indicates the number of data bytes carried in the payload. The register address field 1706 indicates a starting address associated with the RFFE extended register read command. The register address field is transmitted after the command field, followed by the data payload and a termination field such as bus park signaling. In this example, the data payload is transmitted by the host device and includes two bytes of data. Bus Park signaling is provided on each serial bus between transmission of the register address field and the payload. The bus park signaling facilitates bus turnaround, during which the host ceases transmissions over the data line and the subordinate device begins transmitting over the data line.

The datagram 1720 is configured to be encoded in data signals transmitted over two data lines provided by two serial buses. The two serial buses may correspond to serial buses 510a and 510b in FIG. 5 and, for the purposes of this example, may be referred to as serial bus A and serial bus B. Various bits in the datagram 1720 are allocated in circular order among the data line (SDATA-A 1732) of serial bus A and the data line (SDATA-B 1734) of serial bus B.

According to certain aspects of this disclosure, the device address 1722 is transmitted without interleaving over SDATA-A 1732, with the remaining bits of the datagram 1720 being bit-interleaved for transmission over the combination of SDATA-A 1732 and SDATA-B 1734. Serial bus A may be designated or configured to be the primary serial bus for this transaction. In some implementations, the device address 1722 may also be transmitted over the serial bus B. Port aggregation may be initiated at the receiver when the receiver identifies that the device address 1722 corresponds to an address associated with port aggregation. The receiver may configure deinterleaving circuits or modules after identifying the address associated with port aggregation.

Data may be transmitted over SDATA-A 1732 of serial bus A and SDATA-B 1734 of serial bus B in accordance with timing derived from a clock signal received over the clock line of serial bus A. Two bits are transmitted concurrently. In the illustrated example, each of the bitstreams transmitted over SDATA-A 1732 and SDATA-B 1734 includes command bits, register address bits and payload bits. Other allocations of bits among the available aggregated data lines may be used in other implementations. Transmission of the datagram 1720 is accomplished in 24 bit transmission slots, where a bit transmission slot represents a time interval during which 2 bits are transmitted concurrently over SDATA-A 1732 and SDATA-B 1734, and where a bit transmission slot may correspond to the period of the clock signal transmitted over the serial bus.

Another example illustrates transmission of a datagram 1740 over three serial buses when 3-port aggregation is enabled in a system configured in accordance with the system 600 illustrated in FIG. 6. The datagram 1740 includes a command field, a register address field and a payload. The command field includes a four-bit device address 1742, a register address field and an RFFE extended register read command. The RFFE extended register read command is configured with a four bit, all-zero read code and a four-bit byte count. The byte count indicates the number of data bytes carried in the payload. The register address field indicates a starting address associated with the RFFE extended register read command. The register address field is transmitted after the command field, followed by the data payload and a termination field such as bus park signaling. In this example, the data payload is transmitted by the host device and includes two bytes of data. Bus Park signaling is provided on each serial bus between transmission of the register address field and the payload. The bus park signaling facilitates bus turnaround, during which the host ceases transmissions over the data line and the subordinate device begins transmitting over the data line.

The datagram 1740 is configured to be encoded in data signals transmitted over three data lines provided by three serial buses. The three serial buses may correspond to serial buses 610a, 610b and 610c in FIG. 6 and, for the purposes of this example, may be referred to as serial bus A, serial bus B and serial bus C. Various bits in the datagram 1740 are allocated in circular order among the data line (SDATA-A 1752) of serial bus A, the data line (SDATA-B 1754) of serial bus B and the data line (SDATA-C 1756) of serial bus C.

According to certain aspects of this disclosure, the device address 1742 is transmitted without interleaving over SDATA-A 1752, with the remaining bits of the datagram 1740 being bit-interleaved for transmission over the combination of SDATA-A 1752, SDATA-B 1754 and SDATA-C 1756. Unused bit transmission slots may be left undefined, populated with null values or used for other purposes. Serial bus A may be designated or configured to be the primary serial bus for this transaction. In some implementations, the device address 1742 may also be transmitted over serial bus B and/or serial bus C. Port aggregation may be initiated at the receiver when the receiver identifies that the device address 1742 corresponds to an address associated with port aggregation. The receiver may configure deinterleaving circuits or modules after identifying the address associated with port aggregation.

Data may be transmitted over SDATA-A 1752, SDATA-B 1754 and SDATA-C 1756 in accordance with timing derived from a clock signal received over the clock line of serial bus A. Three bits are transmitted concurrently. In the illustrated example, the bitstreams transmitted over SDATA-A 1752, SDATA-B 1754 and SDATA-C 1756 include some combination of command bits, register address bits and payload bits. Other allocations of bits among the available aggregated data lines may be used in other implementations. Transmission of the datagram 1740 is accomplished in 18 bit transmission slots, where a bit transmission slot represents a time interval during which 3 bits are transmitted concurrently over each of SDATA-A 1752, SDATA-B 1754 and SDATA-C 1756, and where a bit transmission slot may correspond to the period of the clock signal transmitted over the serial bus.

The use of port aggregation can produce significant raw throughput gains when applied to serial buses operated in accordance with RFFE, SPMI, I3C and other bus control protocols. The throughput gain for N aggregated ports when secondary clock lines serve as aggregated data lines may be calculated as $Gain_{thru}=(2\times N)-1$. Throughput gains can be accomplished without increasing the frequency of the serial bus clock signal. For example, the use of 2-port aggregation with a 52 MHz serial bus clock signal can yield effective throughputs that are equivalent to the throughput achieved with clocks signal frequencies in the range of 69 MHz-75 MHz. The ability to use a 52 MHz serial bus clock signal can ensure compatibility with legacy devices and can permit deployment of port aggregation schemes in systems with devices that are rated for a maximum of 52 MHz operation.

Figure 18:
FIG. 18 illustrates effective throughput gains for some examples of RFFE transactions transmitted using port aggregation in accordance with certain aspects of this disclosure.

FIG. 18 illustrates effective throughput gains for some examples of RFFE transactions transmitted using port aggregation in accordance with certain aspects of this disclosure. The table 1800 compares clock cycles used to transmit datagrams over a single serial bus with clock cycles used to transmit the datagrams when different types of port aggregation are used.

According to certain aspects of the disclosure, subordinate devices may be configured for port aggregation during system initialization, after a power on event, in response to a request asserted by a device joining the serial bus and/or in response to a request or command received from an application. In one example, the host device configures registers in the subordinate devices that define settings that control the operation of ports, protocol handlers and port aggregation circuits including multiplexers, demultiplexers and other logic circuits. Multiple sets of settings may be configured to enable a subordinate device to support multiple port aggregation modes.

According to certain aspects of the disclosure, a system may be configured to support subordinate devices that can aggregate data through different numbers of ports. A system adapted or configured according to certain aspects of the disclosure may support multiple port aggregation capabilities and modes. Supported port aggregation modes may include some combination of byte-level interleaving, bit-level interleaving, full port aggregation where both the clock and data lines in a secondary serial bus are available for data transmission and partial port aggregation where data transmission is reserved for the data line in a secondary serial bus. In some implementations, subordinate devices may be dynamically configured or reconfigured by a host system for certain port aggregation modes. In some implementations, a subordinate device may be configured to select a port aggregation mode when responding to commands directed to a device address associated with the subordinate device. In one aspect, a subordinate device may be associated with multiple device addresses, and may select between port aggregation modes and/or legacy modes of operation based on the device address included in a command.

In some implementations, a host device may assign device addresses to subordinate devices during system initialization, in response to a request asserted by a device joining the serial bus and/or in response to a request or command received from an application. In some implementations, a host device in a system initiating a port aggregation transaction in accordance with aspects of this disclosure transmits a device address and command code through all available ports. The subordinate devices coupled to the host device through one or more of the serial buses initially process the command according to bus control protocols. A subordinate device that has a device address that is different from the device address received from the bus causes its bus interface to be idle and waiting for a new transaction. A subordinate device that has a device address that matches the device address received from the bus responds to the command received from the host device in a manner selected based on the matched device address. When the matched device address is associated with a port aggregation mode, the addressed subordinate device completes the transaction using multiple serial buses. In one example, the addressed subordinate device may transmit or receive data using a data line in its primary serial bus and the clock and data lines in one or more secondary serial buses.

In accordance with certain aspects of this disclosure, different types of device addresses may be associated with port aggregation modes. In one example, a subordinate device may be configured with a device address for its primary port that is used to initiate conventional single port, non-aggregated transactions. A subordinate device that supports port aggregation may optionally be configured with at least one device address for a corresponding secondary port. The subordinate device that supports port aggregation is also configured with at least one secondary address that is associated with a port aggregation mode. The subordinate device switches to a port aggregation mode when an associated secondary address is received with a command.

In accordance with certain aspects of this disclosure, the device addresses that are associated with port aggregation modes can include group addresses. According to certain bus control protocols, a group address is used to cause multiple devices to respond to a current command. The group address is typically used with write commands. A subordinate device that is configured to respond to a group address associated with port aggregation may be further configured for automatic width scaling based on the capabilities of other subordinate devices that are expected to respond to the group address. In some implementations, automatic width scaling causes a subordinate device to implement a mode of port aggregation based on the number of ports supported by the group member that has the least number of ports.

Figure 19:
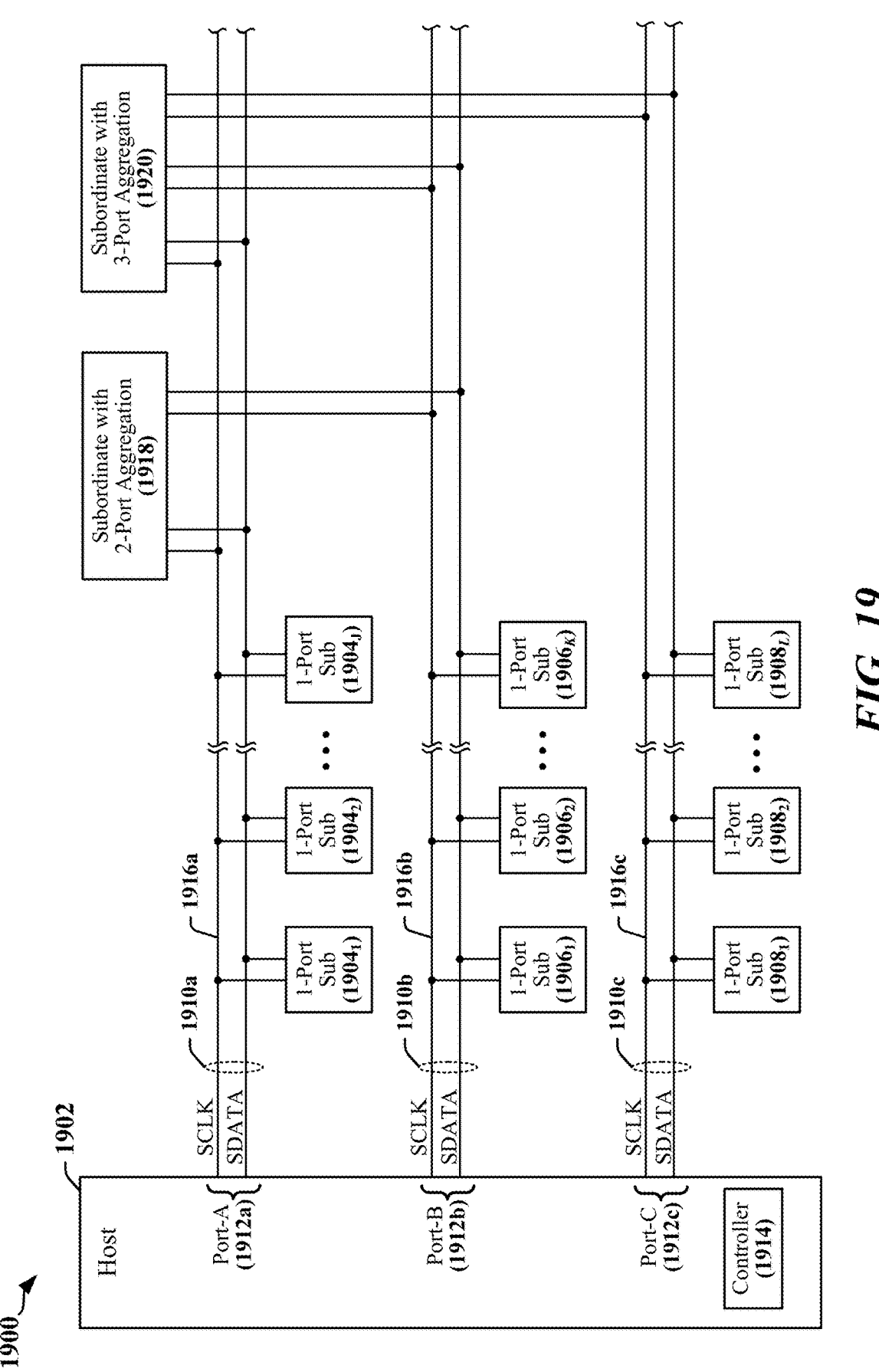
FIG. 19 illustrates an example of a system configured for group addressing and port aggregation in accordance with certain aspects disclosed herein.

FIG. 19 illustrates an example of a system 1900 configured for group addressing and port aggregation in accordance with certain aspects disclosed herein. In the illustrated example, two subordinate devices 1918, 1920 are equipped with multiple ports and configured for port aggregation. A first subordinate device 1918 has two ports and a second subordinate device 1920 has three ports. Each of the subordinate devices 1918, 1920 may be assigned one or more unique device addresses that can be used by a host device 1902 to select between a conventional single-port mode of communication and one or more port aggregation modes of communication.

In the illustrated system 1900, the subordinate devices 1918, 1920 may be assigned a common group address that is associated with a port aggregation mode of communication. In some implementations, the common group address is explicitly associated with a port aggregation mode of communication that uses two ports 1912a, 1912b. In some implementations, the common group address is associated with a flexible port aggregation mode of communication that selects the highest possible number of ports for use in port aggregation. In the latter implementations, the common group address may select a port aggregation mode of communication that uses two ports 1912a, 1912b in most operational conditions, but may select a port aggregation mode of communication that uses three ports 1912a, 1912b, 1912c when the first subordinate device 1918 is offline or previously disabled by command of the host device 1902.

The illustrated system 1900 includes a 3-port host device 1902 that is coupled to three serial buses 1910a, 1910b, 1910c. A number (J) of 1-port subordinate devices $1904_1$-$1904_J$ are equipped with, or are configured to use a single serial interface to communicate with the host device 1902 over a first serial bus 1910a, a number (K) of 1-port subordinate devices $1906_1$-$1906_K$ are equipped with, or are configured to use a single serial interface to communicate with the host device 1902 over a second serial bus 1910b, and a number (L) of 1-port subordinate devices $1908_1$-$1908_L$ are equipped with, or are configured to use a single serial interface to communicate with the host device 1902 over a third serial bus 1910c. The first subordinate device 1918 is coupled to two serial buses 1910a, 1910b through two serial interfaces and may be configured to communicate with the host device 1902 using 2-port aggregation in accordance with certain aspects of this disclosure. The second subordinate device 1920 is coupled to the three serial buses 1910a, 1910b, 1910c through three serial interfaces and may be configured to communicate with the host device 1902 using 3-port aggregation in accordance with certain aspects of this disclosure. In some instances, the first subordinate device 1918 and the second subordinate device 1920 may operate their respective serial interfaces independently and may maintain two or more independent communication links using the three serial buses 1910a, 1910b, 1910c.

The host device 1902 may correspond to the host device 502 illustrated in FIG. 5 or the host device 602 illustrated in FIG. 6 and may include a controller 1914 that configures and manages the three ports 1912a, 1912b and 1912c used to couple the host device 1902 to the three serial buses 1910a, 1910b, 1910c. Each port 1912a, 1912b and 1912c may represent or include the physical layer circuits, state machines or other control logic that enables data to be transmitted over a corresponding serial bus 1910a, 1910b, 1910c. In some examples, the controller 1914 may configure each port 1912a, 1912b, 1912c for multi-port aggregation when the host device 1902 is communicating with the first subordinate device 1918 or the second subordinate device 1920. In accordance with some aspects of this disclosure, the controller 1914 may reconfigure configure the function of one or more lines in at least one of the serial buses 1910a, 1910b, 1910c when operating in multi-port aggregation modes.

The controller 1914 may interleave portions of a data payload by allocating different portions of the data payload among the ports 1912a, 1912b, 1912c when the host device

1902 is transmitting the data payload to the first subordinate device 1918 or the second subordinate device 1920 in a port aggregation mode. The first subordinate device 1918 and/or the second subordinate device 1920 may reassemble the data payload from data received through at least two while operating in a port aggregation mode. A controller in the 3-port subordinate device 1920 may reassemble the data payload from data received from the host device 1902 through at least two ports while operating in a port aggregation mode.

According to certain aspects of this disclosure, data may be transmitted over some SCLK lines when multi-port devices are operated in a port aggregation mode. One of the serial buses may be designated as the primary serial bus that provides a clock signal on SCLK and the other serial buses may be designated as secondary buses. For example, in the system 1900 illustrated in FIG. 19, serial bus 1910a may be designated, negotiated or selected to be the primary port while serial buses 1910b, 1910c are operated as secondary ports. In this example, a clock signal is transmitted over SCLK 1916a of serial bus 1910a in port aggregation modes and transmission of clock signals over SCLK 1916b and SCLK 1916c are discontinued when a port aggregation mode is initiated. Data signals can be transmitted over SCLK 1916b and SCLK 1916c in port aggregation modes.

In accordance with certain aspects of this disclosure, a multi-port device 1918 or 1920 can communicate with the host device 1902 using a default port during system initialization or after a reset. The default port may correspond to the primary port of the multi-port device 1918 or 1920 in some implementations.

Examples of Processing Circuits and Methods

Figure 20:
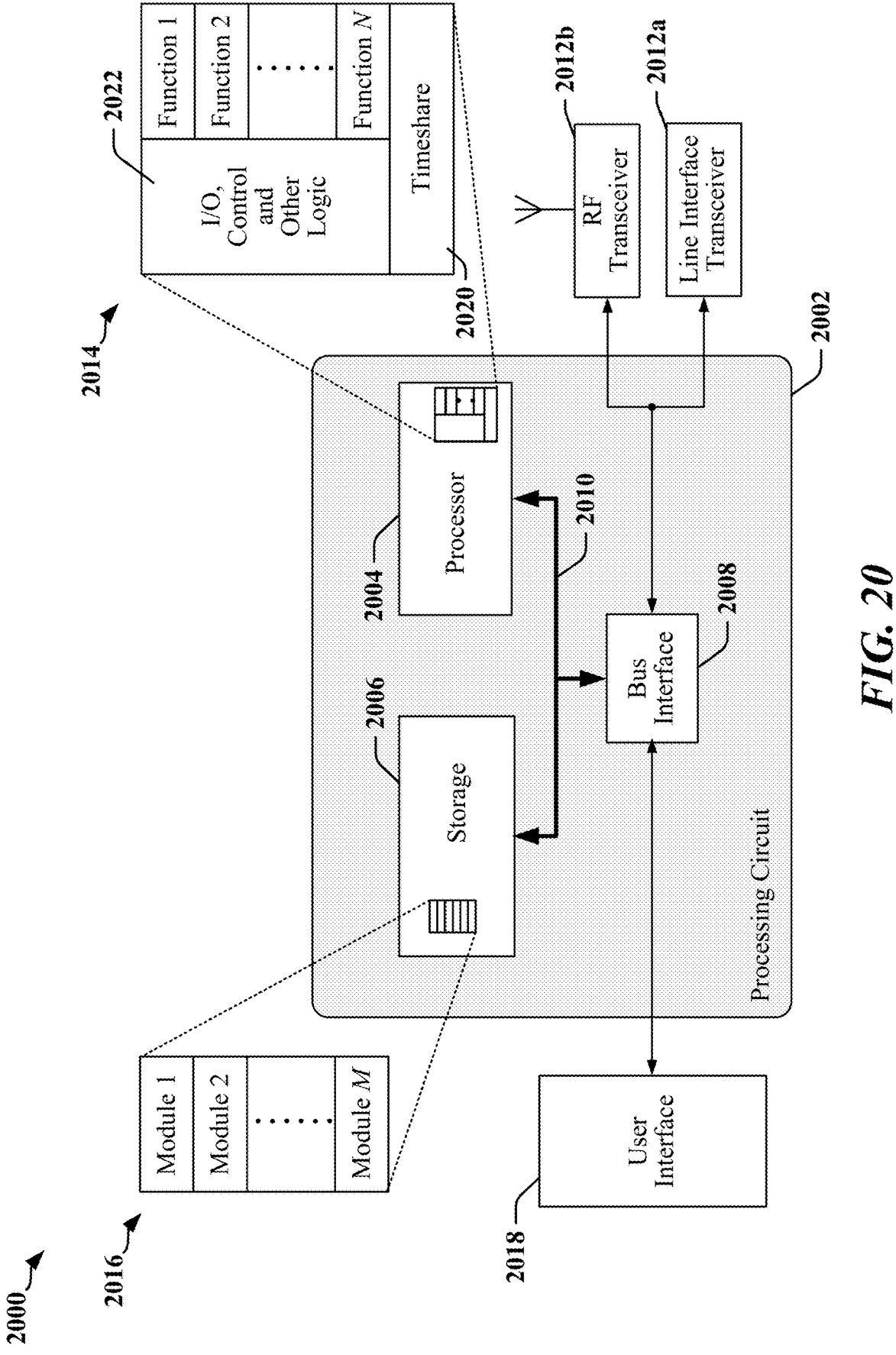
FIG. 20 illustrates one example of an apparatus employing a processing circuit that may be adapted according to certain aspects disclosed herein.

FIG. 20 is a diagram illustrating an example of a hardware implementation for an apparatus 2000. In some examples, the apparatus 2000 may perform one or more functions disclosed herein. In accordance with various aspects of the disclosure, an element, or any portion of an element, or any combination of elements as disclosed herein may be implemented using a processing circuit 2002. The processing circuit 2002 may include one or more processors 2004 that are controlled by some combination of hardware and software modules. Examples of processors 2004 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 2004 may include specialized processors that perform specific functions, and that may be configured, augmented or controlled by one of the software modules 2016. The one or more processors 2004 may be configured through a combination of software modules 2016 loaded during initialization, and further configured by loading or unloading one or more software modules 2016 during operation.

In the illustrated example, the processing circuit 2002 may be implemented with a bus architecture, represented generally by the bus 2010. The bus 2010 may include any number of interconnecting buses and bridges depending on the specific application of the processing circuit 2002 and the overall design constraints. The bus 2010 links together various circuits including the one or more processors 2004, and storage 2006. Storage 2006 may include memory devices and mass storage devices, and may be referred to herein as computer-readable media and/or processor-readable media. The bus 2010 may also link various other circuits such as timing sources, timers, peripherals, voltage regulators, and power management circuits. A bus interface 2008 may provide an interface between the bus 2010 and one or more transceivers 2012a, 2012b. A transceiver 2012a, 2012b may be provided for each networking technology supported by the processing circuit. In some instances, multiple networking technologies may share some or all of the circuitry or processing modules found in a transceiver 2012a, 2012b. Each transceiver 2012a, 2012b provides a means for communicating with various other apparatus over a transmission medium. In one example, a transceiver 2012a may be used to couple the apparatus 2000 to a multi-wire bus. In another example, a transceiver 2012b may be used to connect the apparatus 2000 to a radio access network. Depending upon the nature of the apparatus 2000, a user interface 2018 (e.g., keypad, display, speaker, microphone, joystick) may also be provided, and may be communicatively coupled to the bus 2010 directly or through the bus interface 2008.

A processor 2004 may be responsible for managing the bus 2010 and for general processing that may include the execution of software stored in a computer-readable medium that may include the storage 2006. In this respect, the processing circuit 2002, including the processor 2004, may be used to implement any of the methods, functions and techniques disclosed herein. The storage 2006 may be used for storing data that is manipulated by the processor 2004 when executing software, and the software may be configured to implement any one of the methods disclosed herein.

One or more processors 2004 in the processing circuit 2002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 2006 or in an external computer-readable medium. The external computer-readable medium and/or storage 2006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 2006 may also include, by way of example, a carrier wave, a transmission line, and any other suitable medium for transmitting software and/or instructions that may be accessed and read by a computer. Computer-readable medium and/or the storage 2006 may reside in the processing circuit 2002, in the processor 2004, external to the processing circuit 2002, or be distributed across multiple entities including the processing circuit 2002. The computer-readable medium and/or storage 2006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 2006 may maintain software maintained and/or organized in loadable code segments, modules, applications, programs, etc., which may be referred to herein as software modules 2016. Each of the software modules 2016 may include instructions and data that, when installed or loaded on the processing circuit 2002 and executed by the one or more processors 2004, contribute to a run-time image 2014 that controls the operation of the one or more processors 2004. When executed, certain instructions may cause the processing circuit 2002 to perform functions in accordance with certain methods, algorithms and processes described herein.

Some of the software modules 2016 may be loaded during initialization of the processing circuit 2002, and these software modules 2016 may configure the processing circuit 2002 to enable performance of the various functions disclosed herein. For example, some software modules 2016 may configure internal devices and/or logic circuits 2022 of the processor 2004, and may manage access to external devices such as a transceiver 2012a, 2012b, the bus interface 2008, the user interface 2018, timers, mathematical coprocessors, and so on. The software modules 2016 may include a control program and/or an operating system that interacts with interrupt handlers and device drivers, and that controls access to various resources provided by the processing circuit 2002. The resources may include memory, processing time, access to a transceiver 2012a, 2012b, the user interface 2018, and so on.

One or more processors 2004 of the processing circuit 2002 may be multifunctional, whereby some of the software modules 2016 are loaded and configured to perform different functions or different instances of the same function. The one or more processors 2004 may additionally be adapted to manage background tasks initiated in response to inputs from the user interface 2018, the transceiver 2012a, 2012b, and device drivers, for example. To support the performance of multiple functions, the one or more processors 2004 may be configured to provide a multitasking environment, whereby each of a plurality of functions is implemented as a set of tasks serviced by the one or more processors 2004 as needed or desired. In one example, the multitasking environment may be implemented using a timesharing program 2020 that passes control of a processor 2004 between different tasks, whereby each task returns control of the one or more processors 2004 to the timesharing program 2020 upon completion of any outstanding operations and/or in response to an input such as an interrupt. When a task has control of the one or more processors 2004, the processing circuit is effectively specialized for the purposes addressed by the function associated with the controlling task. The timesharing program 2020 may include an operating system, a main loop that transfers control on a round-robin basis, a function that allocates control of the one or more processors 2004 in accordance with a prioritization of the functions, and/or an interrupt driven main loop that responds to external events by providing control of the one or more processors 2004 to a handling function.

The processing circuit 2002 may be configured to perform one or more of the functions disclosed herein. For example, the processing circuit 2002 may be configured to operate as a master device coupled to a serial bus. The processing circuit 2002 may be configured to initiate a pulse on a wire coupling the processing circuit 2002 to a subordinate device, present a high impedance to the wire after initiating the pulse and determine whether a subordinate device has terminated the pulse early, indicating a first encoded value. When the subordinate device has not terminated the pulse, processing circuit 2002 may be configured to terminate the pulse after a duration of time sufficient to indicate a second encoded value. In one example, the first encoded value is assigned binary 1 and the second encoded value is assigned binary 0. In another example, the first encoded value is assigned binary 0 and the second encoded value is assigned binary 1. The processing circuit 2002 may be configured to determine the encoded value or may employ a separate PWM decoder.

FIG. 21 is a flowchart 2100 of a method of data communication in a system configured for port aggregation. A host device and one or more subordinate devices may be coupled through at least two serial buses. At block 2102, a first port that is coupled to a first serial bus may be configured to engage in a first transaction conducted over a first line and a second line of the first serial bus. At block 2104, a second port that is coupled to a second serial bus and the first port may be configured to engage in a second transaction using the second line of the first serial bus and a second line of the second serial bus in accordance with timing provided by a clock signal transmitted over a first line of the first serial bus. In some implementations, the second transaction is initiated by a datagram configured in accordance with an RFFE protocol.

In one example, the method is performed by a host device and the host device may transmit the clock signal over the first line of the first serial bus while engaging in the second transaction. In another example, the method is performed by a subordinate device and the subordinate device may receive a command over the first serial bus, and engage in the second transaction in response to the command received over the first serial bus.

In certain examples, a first data byte in a data payload of the second transaction may be transmitted or received over the second line of the first serial bus, and a second data byte of the data payload may be transmitted or received over the second line of the second serial bus concurrently with transmission of the first data byte. In some implementations, a third data byte of the data payload may be transmitted or received over the first line of the second serial bus concurrently with transmission of the first data byte. The first, second and/or third data bytes may be transmitted or received based on the type of a command transmitted in the second transaction. In some implementations, a third port that is coupled to a third serial bus may be configured to engage in the second transaction using a second line of the third serial bus and in accordance with timing provided by the clock signal transmitted over the first line of the first serial bus. The third port may be engaged when a fourth data byte of the data payload is transmitted or received over the over the second line of the third serial bus concurrently with transmission of the first data byte. In some instances, a fifth data byte of the data payload is transmitted or received over the over the first line of the third serial bus concurrently with transmission of the first data byte.

In certain examples, a first bit in a first data byte of a data payload of the second transaction is transmitted or received over the second line of the first serial bus and a second bit in the first data byte of the data payload is transmitted or received over the second line of the second serial bus concurrently with transmission of the first bit in the first data byte. In some implementations, a third bit in the first data byte of the data payload is transmitted or received over the first line of the second serial bus concurrently with transmission of the first bit in the first data byte. In some implementations, a third port that is coupled to a third serial bus may be configured to engage in the second transaction using a first and/or second line of the third serial bus in accordance with timing provided by the clock signal transmitted over the first line of the first serial bus. In one example, a fourth bit in the first data byte of the data payload may be transmitted or received over the second line of the third serial bus concurrently with transmission of the first bit in the first data byte. In some instances, a fifth bit in the first data byte of the data payload may be transmitted or received over the first line of the third serial bus concurrently with transmission of the first bit in the first data byte.

In some implementations, transmissions associated with the first transaction are limited to the first serial bus when the first transaction is initiated with a command directed to a first device address. Portions of a data payload may be transmitted or received over the first serial bus and the second serial bus when the second transaction is initiated with a command directed to a second device address. The second device address may be associated with or include a group address.

In some examples, the second port may be used to engage in a third transaction in which data is transmitted over the second line of the second serial bus in accordance with timing provided by a clock signal transmitted over the first line of the second serial bus. In one example, the third transaction may be conducted at least partially concurrently with the first transaction. In some examples, the first port or the second port is operable in accordance with an RFFE, I3C, SPMI protocol.

Figure 22:
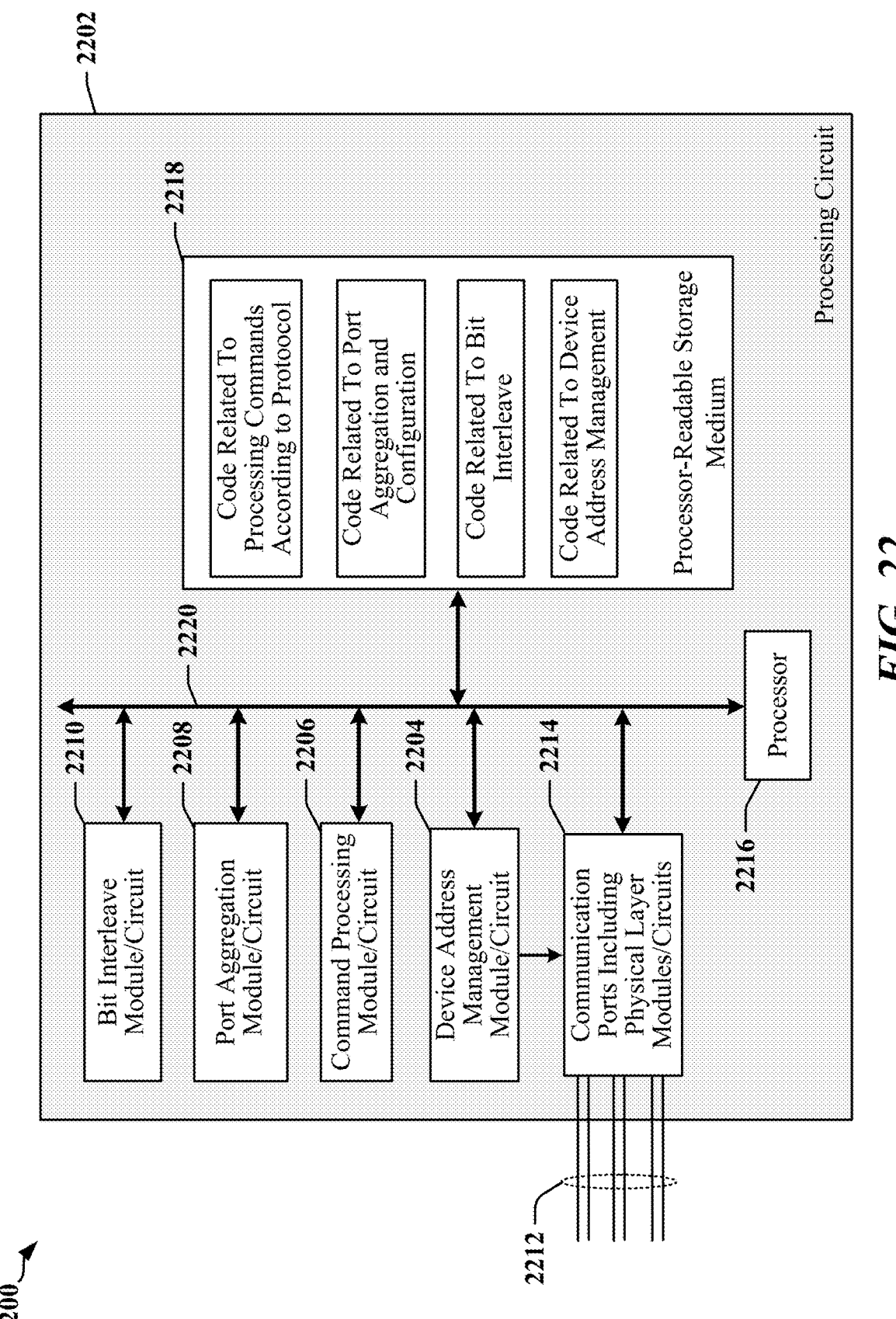
FIG. 22 illustrates an example of a hardware implementation for an apparatus adapted in accordance with certain aspects disclosed herein.

FIG. 22 is a diagram illustrating an example of a hardware implementation for an apparatus 2200 employing a processing circuit 2202. The processing circuit typically has a controller or processor 2216 that may include one or more microprocessors, microcontrollers, digital signal processors, sequencers and/or state machines. The processing circuit 2202 may be implemented with a bus architecture, represented generally by the bus 2220. The bus 2220 may include any number of interconnecting buses and bridges depending on the specific application of the processing circuit 2202 and the overall design constraints. The bus 2220 links together various circuits including one or more processors and/or hardware modules, represented by the controller or processor 2216, the modules or circuits 2204, 2206, 2208 and 2210 and the processor-readable storage medium 2218. One or more physical layer circuits and/or modules 2214 may be provided to support communication over a corresponding number of serial buses 2212. Each of the physical layer circuits and/or modules 2214 may be associated with or may include circuits and modules that implement a configurable interface to an application processor. The configurable interface may be referred to as a port. The bus 2220 may also link various other circuits such as timing sources, peripherals, voltage regulators, and power management circuits, which are well known in the art, and therefore, will not be described any further.

The processor 2216 is responsible for general processing, including the execution of software, code and/or instructions stored on the processor-readable storage medium 2218. The processor-readable storage medium 2218 may include a non-transitory storage medium. The software, when executed by the processor 2216, causes the processing circuit 2202 to perform the various functions described herein, and for any particular apparatus. The processor-readable storage medium 2218 may be used for storing data that is manipulated by the processor 2216 when executing software. The processing circuit 2202 further includes at least one of the modules 2204, 2206, 2208 and 2210. The modules 2204, 2206, 2208 and 2210 may be software modules running in the processor 2216, resident/stored in the processor-readable storage medium 2218, one or more hardware modules coupled to the processor 2216, or some combination thereof. The modules 2204, 2206, 2208 and 2210 may include microcontroller instructions, state machine configuration parameters, or some combination thereof.

In one configuration, the apparatus 2200 includes modules and/or circuits 2204 adapted to monitor one or more of the serial buses 2212 to detect commands directed to a device address associated with the apparatus 2200. The apparatus 2200 may be associated with multiple device addresses, including group addresses. The apparatus 2200 further includes modules and/or circuits 2206 configured to respond to manage the response to commands received from one or more of the serial buses 2212 when the commands are directed to a device address associated with the apparatus 2200. The apparatus 2200 further includes modules and/or circuits 2208 adapted to configure one or more ports to support a port aggregation mode of operation when a device address associated with port aggregation is received from a primary serial bus in the serial buses 2212. The apparatus 2200 further includes modules and/or circuits 2210 adapted to implement bit interleave across multiple ports in certain port aggregation modes of operation.

In one example, the apparatus 2200 includes a first port having a first physical interface circuit configured to couple the apparatus 2200 to a first serial bus that has a first line and a second line, a second port having a second physical interface circuit configured to couple the apparatus 2200 to a second serial bus that has a first line and a second line and a controller or processor 2216. The controller or processor 2216 may be configured to use the first port to engage in a first transaction restricted to transmissions over the first serial bus and use the first port and the second port to engage in a second transaction in which data is transmitted over the second line of the first serial bus and the second line of the second serial bus in accordance with timing provided by a clock signal transmitted over the first line of the first serial bus.

In one example, the apparatus 2200 is configured to operate as a host device that provides the clock signal transmitted over the first line of the first serial bus. In another example, the apparatus 2200 is configured to operate as a subordinate device that engages in the second transaction in response to a command received over the first serial bus.

In some implementations, the second transaction includes transmission or reception of a data payload, and the controller or processor 2216 is further configured to cause a first data byte of the data payload to be transmitted or received over the second line of the first serial bus, and cause a second data byte of the data payload to be transmitted or received over the second line of the second serial bus concurrently with transmission of the first data byte. In some implementations, the controller or processor 2216 is further configured to suppress transmittal of clock information over the first line of the second serial bus and to cause a third data byte of the data payload to be transmitted or received over the first line of the second serial bus concurrently with transmission of the first data. The apparatus 2200 may also have a third port having a third physical interface circuit configured to couple the apparatus 2200 to a third serial bus that has a first line and a second line. The controller or processor 2216 may be further configured to configure the third port to engage in the second transaction by transmitting a portion of the data payload over the first line of the third serial bus and/or over the second line of the third serial bus in accordance with the timing provided by the clock signal transmitted over the first line of the first serial bus. The controller or processor 2216 may be further configured to cause a fourth data byte of the data payload to be transmitted or received over the second line of the second serial bus concurrently with transmission of the first data byte. The controller or processor 2216 may be further configured to suppress transmittal of clock information over the first line of the third serial bus cause a fifth data byte of the data payload to be transmitted or received over the first line of the third serial bus concurrently with transmission of the first data byte.

In some implementations, the second transaction includes a data payload. The controller or processor 2216 may be further configured to cause a first bit in a first data byte of the data payload to be transmitted or received over the second line of the first serial bus, and cause a second bit in the first data byte of the data payload to be transmitted or received over the second line of the second serial bus concurrently with transmission of the first bit in the first data byte. In some implementations, the controller or processor 2216 is further configured to suppress transmittal of a clock signal over the first line of the second serial bus and cause a third bit in the first data byte of the data payload to be transmitted or received over the first line of the second serial bus concurrently with transmission of the first bit in the first data byte. The apparatus 2200 may have a third port that includes a third physical interface circuit configured to couple the apparatus 2200 to a third serial bus that has a first line and a second line. The controller or processor 2216 may be further configured to configure the third port to engage in the second transaction by transmitting a portion of the data payload over the first line of the third serial bus and/or over the second line of the third serial bus in accordance with the timing provided by the clock signal transmitted over the first line of the first serial bus. In some implementations, the controller or processor 2216 is further configured to cause a fourth bit in the first data byte of the data payload to be transmitted or received over the second line of the third serial bus concurrently with transmission of the first bit in the first data byte. In some implementations, the controller or processor 2216 is further configured to suppress transmittal of a clock signal over the first line of the third serial bus, and cause a fifth bit in the first data byte of the data payload to be transmitted or received over the first line of the third serial bus concurrently with transmission of the first bit in the first data byte.

In some implementations, transmissions associated with the first transaction are limited to the first serial bus when the first transaction is initiated with a command directed to a first device address. Portions of a data payload may be transmitted or received over the first serial bus and the second serial bus when the second transaction is initiated with a command directed to a second device address. In one example, the second device address is a group address.

In some examples, the second transaction is initiated by a datagram configured in accordance with an RFFE protocol.

In some examples, the controller or processor 2216 may be further configured to use the second port to engage in a third transaction in which data is transmitted over the second line of the second serial bus in accordance with timing provided by a clock signal transmitted over the first line of the second serial bus. In one example, the third transaction may be conducted at least partially concurrently with the first transaction. In some examples, the first port or the second port is operable in accordance with an RFFE, I3C, SPMI protocol.

In certain implementations, the apparatus 2200 may be embodied in a system configured for data communication. The system may include a host device coupled to a first serial bus that has a first line and a second line and a second serial bus that has a first line and a second line, and a first subordinate device coupled to the first serial bus and the second serial bus. In a first mode of operation, a transaction conducted by the host device is restricted to transmissions over the first serial bus. In a second mode of operation, data is transmitted between the host device and the first subordinate device over the second line of the first serial bus and the second line of the second serial bus in accordance with timing provided by a clock signal transmitted over the first line of the first serial bus.

In some implementations, in the second mode of operation a first data byte of a data payload is transmitted over the second line of the first serial bus and a second data byte of the data payload is transmitted over the second line of the second serial bus concurrently with transmission of the first data byte. In some instances, in the second mode of operation a third data byte of the data payload may be transmitted over the first line of the second serial bus concurrently with transmission of the first data byte.

In some implementations, the host device and the first subordinate device may be further coupled to a third serial bus that has a first line and a second line, In the second mode of operation, a third data byte of the data payload may be transmitted over the second line of the third serial bus concurrently with transmission of the first data byte.

In some implementations, the second transaction includes a data payload. A first bit in a first data byte of a data payload may be transmitted over the second line of the first serial bus, and a second bit in the first data byte of the data payload may be transmitted over the second line of the second serial bus concurrently with transmission of the first bit in the first data byte.

In some implementations, the host device and the first subordinate device are further coupled to a third serial bus that has a first line and a second line. In the second mode of operation, a third bit in the first data byte of the data payload is transmitted over the second line of the third serial bus concurrently with transmission of the first bit in the first data byte.

In some implementations, a second subordinate device is coupled to the first serial bus and the second serial bus and further coupled to the host device through a third serial bus that has a first line and a second line. In a third mode of operation, data is transmitted by the host device over the second line of the first serial bus and the second line of the second serial bus while maintaining the first line of the third serial bus and the second line of the third serial bus in an idle state when the data transmitted in the third mode is associated with a command addressed to a group of subordinate devices that includes the first subordinate device and the second subordinate device.

The processor-readable storage medium 2218 stores code and data. The code may be executed by the processor 2216, a state machine or sequencer. The code, when executed by the processor 2216, causes the processing circuit 2202 to configure a first port that is coupled to a first serial bus to engage in a first transaction conducted over a first line and a second line of the first serial bus, and configure a second port that is coupled to a second serial bus and the first port to engage in a second transaction using the second line of the first serial bus and a second line of the second serial bus in accordance with timing provided by a clock signal transmitted over a first line of the first serial bus.

The code may further cause the processing circuit 2202 to transmit the clock signal over the first line of the first serial bus while engaging in the second transaction. The code may further cause the processing circuit 2202 to receive a command over the first serial bus, and engage in the second transaction in response to the command received over the first serial bus.

In some examples, the code may further cause the processing circuit 2202 to transmit or receive a first data byte in a data payload of the second transaction over the second line of the first serial bus; and transmitting or receiving a second data byte of the data payload over the second line of the second serial bus concurrently with transmission of the first data byte. The code may further cause the processing circuit 2202 to configure a third port that is coupled to a third serial bus to engage in the second transaction using a second line of the third serial bus and in accordance with timing provided by the clock signal transmitted over the first line of the first serial bus, and to transmit or receive a third data byte of the data payload over the second line of the third serial bus concurrently with transmission of the first data byte.

In some examples, the code may further cause the processing circuit 2202 to transmit or receive a first bit in a first data byte of a data payload of the second transaction over the second line of the first serial bus; and transmitting or receiving a second bit in the first data byte of the data payload over the second line of the second serial bus concurrently with transmission of the first bit in the first data byte. The code may further cause the processing circuit 2202 to configure a third port that is coupled to a third serial bus to engage in the second transaction using a second line of the third serial bus in accordance with timing provided by the clock signal transmitted over the first line of the first serial bus, and to transmit or receive a third bit in the first data byte of the data payload over the second line of the third serial bus concurrently with transmission of the first bit in the first data byte.

In some examples, transmissions associated with the first transaction are limited to the first serial bus when the first transaction is initiated with a command directed to a first device address. In some examples, portions of a data payload are transmitted or received over the first serial bus and the second serial bus when the second transaction is initiated with a command directed to a second device address. The second device address may include a group address. In various examples, the second transaction is initiated by a datagram configured in accordance with an RFFE protocol.

In some examples, the code may further cause the processor 2216, a state machine or sequencer to use the second port to engage in a third transaction in which data is transmitted over the second line of the second serial bus in accordance with timing provided by a clock signal transmitted over the first line of the second serial bus. In one example, the third transaction may be conducted at least partially concurrently with the first transaction. In some examples, the first port or the second port is operable in accordance with an RFFE, I3C, SPMI protocol.

Some implementation examples are described in the following numbered clauses:

1. A multi-port data communication apparatus, comprising: a first port comprising a first physical interface circuit configured to couple the multi-port data communication apparatus to a first serial bus that has a first line and a second line; a second port comprising a second physical interface circuit configured to couple the multi-port data communication apparatus to a second serial bus that has a first line and a second line; and a controller configured to: use the first port to engage in a first transaction restricted to transmissions over the first serial bus; and use the first port and the second port to engage in a second transaction in which data is transmitted over the second line of the first serial bus and the second line of the second serial bus in accordance with timing provided by a clock signal transmitted over the first line of the first serial bus.

2. The multi-port data communication apparatus as described in clause 1, wherein the multi-port data communication apparatus is configured to operate as a host device that provides the clock signal transmitted over the first line of the first serial bus.

3. The multi-port data communication apparatus as described in clause 1, wherein the multi-port data communication apparatus is configured to operate as a subordinate device that engages in the second transaction in response to a command received over the first serial bus.

4. The multi-port data communication apparatus as described in any of clauses 1-3, wherein the second transaction includes transmission or reception of a data payload, and wherein the controller is further configured to: cause a first data byte of the data payload to be transmitted or received over the second line of the first serial bus; and cause a second data byte of the data payload to be transmitted or received over the second line of the second serial bus concurrently with transmission of the first data byte.

5. The multi-port data communication apparatus as described in clause 4, wherein the controller is further configured to: suppress transmittal of clock information over the first line of the second serial bus; and cause a third data byte of the data payload to be transmitted or received over the first line of the second serial bus concurrently with transmission of the first data byte.

6. The multi-port data communication apparatus as described in clause 5, further comprising: a third port comprising a third physical interface circuit configured to couple the multi-port data communication apparatus to a third serial bus that has a first line and a second line, wherein the controller is further configured to cause a fourth data byte of the data payload to be transmitted or received over the second line of the third serial bus concurrently with transmission of the first data byte and in accordance with the timing provided by the clock signal transmitted over the first line of the first serial bus.

7. The multi-port data communication apparatus as described in clause 6, wherein the controller is further configured to: suppress transmittal of a clock signal over the first line of the third serial bus; and cause a fifth data byte of the data payload to be transmitted or received over the first line of the third serial bus concurrently with transmission of the first data byte.

8. The multi-port data communication apparatus as described in any of clauses 1-3, wherein the second transaction includes a data payload, and wherein the controller is further configured to: cause a first bit in a first data byte of the data payload to be transmitted or received over the second line of the first serial bus; and cause a second bit in the first data byte of the data payload to be transmitted or received over the second line of the second serial bus concurrently with transmission of the first bit in the first data byte.

9. The multi-port data communication apparatus as described in clause 8, wherein the controller is further configured to: suppress transmittal of a clock signal over the first line of the second serial bus; and cause a third bit in the first data byte of the data payload to be transmitted or received over the first line of the second serial bus concurrently with transmission of the first bit in the first data byte.

10. The multi-port data communication apparatus as described in clause 9, further comprising: a third port comprising a third physical interface circuit configured to couple the multi-port data communication apparatus to a third serial bus that has a first line and a second line, wherein the controller is further configured to cause a fourth bit in the first data byte of the data payload to be transmitted or received over the second line of the third serial bus concurrently with transmission of the first bit in the first data byte.

11. The multi-port data communication apparatus as described in clause 10, wherein the controller is further configured to: suppress transmittal of a clock signal over the first line of the third serial bus; and cause a fifth bit in the first data byte of the data payload to be transmitted or received over the first line of the third serial bus concurrently with transmission of the first bit in the first data byte.

12. The multi-port data communication apparatus as described in any of clauses 1-11, wherein transmissions associated with the first transaction are limited to the first serial bus when the first transaction is initiated with a command directed to a first device address, and wherein portions of a data payload are transmitted or received over the first serial bus and the second serial bus when the second transaction is initiated with a command directed to a second device address.

13. The multi-port data communication apparatus as described in clause 12, wherein the second device address comprises a group address.

14. The multi-port data communication apparatus as described in any of clauses 1-13, wherein the controller is further configured to: use the second port to engage in a third transaction in which data is transmitted over the second line of the second serial bus in accordance with timing provided by a clock signal transmitted over the first line of the second serial bus.

15. A system configured for data communication, comprising: a host device coupled to a first serial bus that has a first line and a second line and a second serial bus that has a first line and a second line; and a first subordinate device coupled to the first serial bus and the second serial bus, wherein in a first mode of operation, a transaction conducted by the host device is restricted to transmissions over the first serial bus, and wherein in a second mode of operation, data is transmitted between the host device and the first subordinate device over the second line of the first serial bus and the second line of the second serial bus in accordance with timing provided by a clock signal transmitted over the first line of the first serial bus.

16. The system as described in clause 15, wherein in the second mode of operation a first data byte of a data payload is transmitted over the second line of the first serial bus and a second data byte of the data payload is transmitted over the second line of the second serial bus concurrently with transmission of the first data byte.

17. The system as described in clause 16, wherein in the second mode of operation a third data byte of the data payload is transmitted over the first line of the second serial bus concurrently with transmission of the first data byte.

18. The system as described in clause 16, wherein the host device and the first subordinate device are further coupled to a third serial bus that has a first line and a second line, wherein in the second mode of operation, a fourth data byte of the data payload is transmitted over the second line of the third serial bus concurrently with transmission of the first data byte.

19. The system as described in clause 15, wherein the second transaction includes a data payload, wherein a first bit in a first data byte of a data payload is transmitted over the second line of the first serial bus, and wherein a second bit in the first data byte of the data payload is transmitted over the second line of the second serial bus concurrently with transmission of the first bit in the first data byte.

20. The system as described in clause 19, wherein the host device and the first subordinate device are further coupled to a third serial bus that has a first line and a second line, wherein in the second mode of operation, a third bit in the first data byte of the data payload is transmitted over the second line of the third serial bus concurrently with transmission of the first bit in the first data byte.

21. The system as described in any of clauses 15-20, further comprising: a second subordinate device coupled to the first serial bus and the second serial bus and further coupled to the host device through a third serial bus that has a first line and a second line, wherein in a third mode of operation, data is transmitted by the host device over the second line of the first serial bus and the second line of the second serial bus while maintaining the first line of the third serial bus and the second line of the third serial bus in an idle state when the data transmitted in the third mode of operation is associated with a command addressed to a group of subordinate devices that includes the first subordinate device and the second subordinate device.

22. A method of data communication, comprising: configuring a first port that is coupled to a first serial bus to engage in a first transaction conducted over a first line and a second line of the first serial bus; and configuring a second port that is coupled to a second serial bus and the first port to engage in a second transaction using the second line of the first serial bus and a second line of the second serial bus in accordance with timing provided by a clock signal transmitted over the first line of the first serial bus.

23. The method as described in clause 22, further comprising: transmitting the clock signal over the first line of the first serial bus while engaging in the second transaction.

24. The method as described in clause 22 or clause 23, further comprising: receiving a command over the first serial bus; and engaging in the second transaction in response to the command received over the first serial bus.

25. The method as described in any of clauses 22-24, further comprising: transmitting or receiving a first data byte in a data payload of the second transaction over the second line of the first serial bus; and transmitting or receiving a second data byte of the data payload over the second line of the second serial bus concurrently with transmission of the first data byte.

26. The method as described in clause 25, further comprising: configuring a third port that is coupled to a third serial bus to engage in the second transaction using a second line of the third serial bus and in accordance with timing provided by the clock signal transmitted over the first line of the first serial bus; and transmitting or receiving a third data byte of the data payload over the second line of the third serial bus concurrently with transmission of the first data byte.

27. The method as described in any of clauses 22-24, further comprising: transmitting or receiving a first bit in a first data byte of a data payload of the second transaction over the second line of the first serial bus; and transmitting or receiving a second bit in the first data byte of the data payload over the second line of the second serial bus concurrently with transmission of the first bit in the first data byte.

28. The method as described in clause 27, further comprising: configuring a third port that is coupled to a third serial bus to engage in the second transaction using a second line of the third serial bus in accordance with timing provided by the clock signal transmitted over the first line of the first serial bus; and transmitting or receiving a third bit in the first data byte of the data payload over the second line of the third serial bus concurrently with transmission of the first bit in the first data byte.

29. The method as described in any of clauses 22-28, wherein transmissions associated with the first transaction are limited to the first serial bus when the first transaction is initiated with a command directed to a first device address, and wherein portions of a data payload are transmitted or received over the first serial bus and the second serial bus when the second transaction is initiated with a command directed to a second device address.

30. The method as described in clause 29, wherein the second device address comprises a group address.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A multi-port data communication apparatus, comprising a first serial bus, a second serial bus and a first device, the first device including:
a first port comprising a first physical interface circuit configured to couple the first device to the first serial bus, the first serial bus having a first line and a second line;
a second port comprising a second physical interface circuit configured to couple the first device to the second serial bus, the second serial bus having a first line and a second line; and
a controller configured to:
use the first port to engage in a first transaction restricted to transmissions over the first serial bus, wherein a clock signal is transmitted over the first line of the first serial bus and controls transmission of data over the second line of the first serial bus during the first transaction;
use the first port and the second port to engage in a second transaction in which a clock signal is transmitted over the first line of the second serial bus and controls transmission of data over the second line of the first serial bus and over the second line of the second serial bus; and
suppress transmittal of clock information over the first line of the first serial bus during the second transaction.

2. The multi-port data communication apparatus of claim 1, wherein the first device is configured to operate as a host device that provides the clock signal transmitted over the first line of the first serial bus.

3. The multi-port data communication apparatus of claim 1, wherein the first device is configured to operate as a subordinate device that engages in the second transaction in response to a command received over the first serial bus.

4. The multi-port data communication apparatus of claim 1, wherein the second transaction includes transmission or reception of a data payload, and wherein the controller is further configured to:
cause a first data byte of the data payload to be transmitted or received over the second line of the first serial bus; and
cause a second data byte of the data payload to be transmitted or received over the second line of the second serial bus concurrently with transmission of the first data byte.

5. The multi-port data communication apparatus of claim 4, wherein the controller is further configured to:
cause a third data byte of the data payload to be transmitted or received over the first line of the first serial bus concurrently with transmission of the first data byte during the second transaction.

6. The multi-port data communication apparatus of claim 5, further comprising:
a third port comprising a third physical interface circuit configured to couple the first device to a third serial bus that has a first line and a second line, wherein the controller is further configured to cause a fourth data byte of the data payload to be transmitted or received over the second line of the third serial bus concurrently with transmission of the first data byte and in accordance with timing provided by the clock signal transmitted over the first line of the second serial bus.

7. The multi-port data communication apparatus of claim 6, wherein the controller is further configured to:
  suppress transmittal of a clock signal over the first line of the third serial bus; and
  cause a fifth data byte of the data payload to be transmitted or received over the first line of the third serial bus concurrently with transmission of the first data byte.

8. The multi-port data communication apparatus of claim 1, wherein the second transaction includes a data payload, and wherein the controller is further configured to:
  cause a first bit in a first data byte of the data payload to be transmitted or received over the second line of the first serial bus; and
  cause a second bit in the first data byte of the data payload to be transmitted or received over the second line of the second serial bus concurrently with transmission of the first bit in the first data byte.

9. The multi-port data communication apparatus of claim 8, wherein the controller is further configured to:
  cause a third bit in the first data byte of the data payload to be transmitted or received over the first line of the first serial bus concurrently with transmission of the first data byte during the second transaction.

10. The multi-port data communication apparatus of claim 9, further comprising a third serial bus, wherein the first device further includes:
  a third port comprising a third physical interface circuit configured to couple the first device to the third serial bus, the third serial bus having a first line and a second line, wherein the controller is further configured to cause a fourth bit in the first data byte of the data payload to be transmitted or received over the second line of the third serial bus concurrently with transmission of the first bit in the first data byte when engaging in the second transaction.

11. The multi-port data communication apparatus of claim 10, wherein the controller is further configured to:
  suppress transmittal of a clock signal over the first line of the third serial bus; and
  cause a fifth bit in the first data byte of the data payload to be transmitted or received over the first line of the third serial bus concurrently with transmission of the first bit in the first data byte.

12. The multi-port data communication apparatus of claim 1, wherein transmissions associated with the first transaction are limited to the first serial bus when the first transaction is initiated with a command directed to a first device address, and wherein portions of a data payload are transmitted or received over the first serial bus and the second serial bus when the second transaction is initiated with a command directed to a second device address.

13. The multi-port data communication apparatus of claim 12, wherein the second device address comprises a group address.

14. The multi-port data communication apparatus of claim 1, wherein the controller is further configured to:
  use the second port to engage in a third transaction in which data is transmitted solely over the second line of the second serial bus in accordance with timing provided by a clock signal transmitted over the first line of the second serial bus.

15. A system configured for data communication, comprising:
  a host device coupled to a first serial bus that has a first line and a second line and further coupled to a second serial bus that has a first line and a second line; and a first subordinate device coupled to the first serial bus and the second serial bus,
  wherein in a first mode of operation, a transaction conducted by the host device is restricted to transmissions over the first serial bus,
  wherein a clock signal is transmitted over the first line of the first serial bus and controls transmission of data over the second line of the first serial bus in the first mode of operation, and
  wherein in a second mode of operation, transmittal of clock information over the first line of the first serial bus is suppressed and a clock signal that is transmitted over the first line of the second serial bus controls transmission of data between the host device and the first subordinate device over the second line of the first serial bus and the second line of the second serial bus.

16. The system of claim 15, wherein in the second mode of operation a first data byte of a data payload is transmitted over the second line of the first serial bus and a second data byte of the data payload is transmitted over the second line of the second serial bus concurrently with transmission of the first data byte.

17. The system of claim 16, wherein in the second mode of operation a third data byte of the data payload is transmitted over the first line of the second serial bus concurrently with transmission of the first data byte.

18. The system of claim 16, wherein the host device and the first subordinate device are further coupled to a third serial bus that has a first line and a second line,
  wherein in the second mode of operation, a third data byte of the data payload is transmitted over the second line of the third serial bus concurrently with transmission of the first data byte.

19. The system of claim 15, wherein in the second mode of operation a first bit in a first data byte of a data payload is transmitted over the second line of the first serial bus, and wherein a second bit in the first data byte of the data payload is transmitted over the second line of the second serial bus concurrently with transmission of the first bit in the first data byte.

20. The system of claim 19, wherein the host device and the first subordinate device are further coupled to a third serial bus that has a first line and a second line, wherein in the second mode of operation, a third bit in the first data byte of the data payload is transmitted over the second line of the third serial bus concurrently with transmission of the first bit in the first data byte.

21. The system of claim 15, further comprising:
  a second subordinate device coupled to the first serial bus and the second serial bus and further coupled to the host device through a third serial bus that has a first line and a second line,
  wherein in a third mode of operation, data is transmitted by the host device over the second line of the first serial bus and the second line of the second serial bus while maintaining the first line of the third serial bus and the second line of the third serial bus in an idle state when the data transmitted in the third mode of operation is associated with a command addressed to a group of subordinate devices that includes the first subordinate device and the second subordinate device.

22. A method of data communication performed at a first device, comprising:
  configuring a first port of the first device to engage in a first transaction that is conducted using a first line and a second line of a first serial bus, wherein a clock signal is transmitted over the first line of the first serial bus and controls transmission of data over the second line of the first serial bus during the first transaction;

configuring a second port of the first device to engage in a second transaction in which a clock signal is transmitted over a first line of a second serial bus the clock signal controlling transmission of data using the second line of the first serial bus and a second line of the second serial bus; and suppressing transmission of the clock signal over the first line of the first serial bus while engaging in the second transaction.

23. The method of claim 22, further comprising:

receiving a command over the first serial bus; and engaging in the second transaction in response to the command received over the first serial bus.

24. The method of claim 22, further comprising:

transmitting or receiving a first data byte in a data payload of the second transaction over the second line of the first serial bus; and transmitting or receiving a second data byte of the data payload over the second line of the second serial bus concurrently with transmission of the first data byte.

25. The method of claim 24, further comprising:

configuring a third port of the first device to engage in the second transaction using a data line of a third serial bus in accordance with timing provided by the clock signal transmitted over the first line of the second serial bus during the second transaction; and transmitting or receiving a third data byte of the data payload over the data line of the third serial bus concurrently with transmission of the first data byte during the first transaction.

26. The method of claim 22, further comprising:

transmitting or receiving a first bit in a first data byte of a data payload of the second transaction over the second line of the first serial bus; and transmitting or receiving a second bit in the first data byte of the data payload over the second line of the second serial bus concurrently with transmission of the first bit in the first data byte.

27. The method of claim 26, further comprising:

configuring a third port of the first device to engage in the second transaction using a data line of a third serial bus in accordance with timing provided by the clock signal transmitted over the first line of the second serial bus during the second transaction; and transmitting or receiving a third bit in the first data byte of the data payload over the data line of the third serial bus concurrently with transmission of the first bit in the first data byte.

28. The method of claim 22, wherein transmissions associated with the first transaction are limited to the first serial bus when the first transaction is initiated with a command directed to a first device address, and wherein portions of a data payload are transmitted or received over the first serial bus and the second serial bus when the second transaction is initiated with a command directed to a second device address.

29. The method of claim 28, wherein the second device address comprises a group address.

* * * * *